United States Patent [19]

Teng

[11] Patent Number: 4,658,351
[45] Date of Patent: Apr. 14, 1987

[54] TASK CONTROL MEANS FOR A MULTI-TASKING DATA PROCESSING SYSTEM

[75] Inventor: Peter Y. Teng, Billerica, Mass.

[73] Assignee: Wang Laboratories, Inc., Lowell, Mass.

[21] Appl. No.: 658,951

[22] Filed: Oct. 9, 1984

[51] Int. Cl.$^4$ .............................................. G06F 9/06
[52] U.S. Cl. ..................................... 364/200; 364/300
[58] Field of Search ... 364/200 MS File, 900 MS File, 364/300 MS File

[56] References Cited

U.S. PATENT DOCUMENTS

| | | | |
|---|---|---|---|
| 4,488,258 | 12/1984 | Struger et al. | 364/900 |
| 4,513,391 | 4/1985 | Maddock | 364/900 |
| 4,532,584 | 7/1985 | Federico et al. | 364/140 |
| 4,539,653 | 9/1985 | Barlett et al. | 364/900 |

Primary Examiner—Archie E. Williams
Assistant Examiner—William G. Niessen
Attorney, Agent, or Firm—Michael H. Shanahan; Gary D. Clapp

[57] ABSTRACT

A task control method and apparatus for controlling the interactive, concurrent execution of a plurality of general purpose data processing tasks in a data processing system. The system includes a memory for storing active tasks, a mass storage means for storing inactive tasks and a general purpose CPU. Upon request by a user or by an active task, a task loader transfers a presently inactive task from the mass storage means to the memory to be available for execution. A memory manager assigns a task node space in the memory and a task manager creates a task control block for the task to be activated, assigns a task control block identification to the task control block, and writes the task control block identification into the task's task node space to link the task to the task's task control block. The task manager includes a plurality of task queues, each queue corresponding to a relative priority level for execution of the tasks, and each task control block is stored in a task queue corresponding to the task's priority level. The sequence of the task control blocks in each task queue is dependent upon the status of execution of the corresponding task. Tasks are executed in a sequence depending upon the relative priorities of the task queues and upon the sequential locations of the task control blocks in a task queue.

12 Claims, 13 Drawing Figures

TASK CONTROL MEANS FOR A MULTI-TASKING DATA PROCESSING SYSTEM

CROSS REFERENCE TO RELATED APPLICATIONS

The present patent application is related to the following U.S. patent applications, also assigned to the assignee of the present patent application: U.S. patent application Ser. No. 655,280 filed Sept. 27, 1984 and U.S. patent application Ser. Nos. 658,952, 658,953, 659,192 and 659,203, all filed on Oct. 9, 1984.

BACKGROUND OF THE INVENTION

1. Field of the Invention

The present invention relates to a data processing system and, in particular, a system particularly designed for the processing of data in document form.

2. Prior Art

Data processing systems of the prior art have generally fallen into one of two classes, the first being general purpose systems designed to perform a wide variety of tasks and the second being specialized systems optimized for a limited range of related tasks.

A recurring problem with the first class of data processing systems is that many such systems, while having a wide range of applications, may not be as efficient for certain tasks as more specialized system. The second class of systems, however, are generally not easily expandable for tasks other than those for which they were originally designed, even when the additional tasks may be related to the original tasks.

SUMMARY OF THE INVENTION

The present invention provides a solution to the above described problems of the prior art, and other problems, by providing a data processing system with features which allows the system to efficiently perform relatively specialized, related tasks, such as document processing, while being readily expandable for other tasks.

In the present embodiment, the system incorporates a task control means including a task loader for transferring tasks from a storage means to a system memory means and a task manager responsive to operation of the system for controlling execution of tasks, and a document manager for loading document information in the form of document data structures from the storage means to the system memory and managing access to the document data structures by the tasks. The task manager incorporates task control blocks, which are used to manage the execution of tasks, while the document manager incorporates document control blocks which are used to manage access to the document data structures by the tasks.

There is a task control block for each active task in the system, and each task control block includes an identification field for storing information identifying the corresponding task, a status field for storing information identifying the status of execution of the corresponding task, a priority field for storing information identifying the relative priority of execution of the corresponding task, and a stack pointer field for storing information identifying the location of a stack mechanism usable by the corresponding task. The task control blocks reside in a task manager queue mechanism, with the task control blocks being linked by pointers in the preferred sequence of their execution.

There is a document control block for each document data file in the system and the document files and document control blocks are designed to represent and relate to the structure of documents. Each document file includes at least one page, and each page including at least one area, wherein each area contains at least one type of information. Each area including, in an area containing text information, at least one column for containing text information. Each column including at least one line, and each line including a string of at least one text character, a reference to attributes applying to the characters of the string, and references to external data items associated with the line.

The document file structure includes, for each document file, at least one page block, each page block comprising fields describing the logical dimensions of the page, fields describing the position of a cursor on the page, the cursor position indicating the logical position within the data contained in the page of an operation being performed on the data, a field indicating cursor type, a field describing page layout, and field containing a pointer to an area block. Each file structure includes at least one area block, each area block comprising a field for containing a pointer to a next area, fields containing information defining the type of area, fields defining the logical position of the area with the page, fields defining the margins of the area, fields defining the position of text appearing in the area, fields defining the relationship of the area to other areas of the page, and a field for a pointer to a column block. The structure further includes at least one column block, comprising a field identifying the format of the text appearing in the area, and at least one field for a pointer to a link block. The structure includes at least one line block, each line block comprising at least one field containing a string of at least one text character, a reference to attributes applying to the characters of the string, and references to external data items associated with the line.

The system also includes a screen manager for creating visual display screens representing data, generally residing in the document structures described above. The screen manager includes means responsive to active tasks for creating a screen manager control structure containing information relating each screen to a corresponding task, and, for each screen, information describing certain properties of the screen, and information relating the screen to the data residing in the document structure to be displayed therein. The screen manager also includes means responsive to the corresponding tasks and corresponding screen manager control structures to access and display the corresponding data.

Each screen is described, in the screen manager control structure, by a virtual screen descriptor block and includes at least one viewport onto a portion of the data structure being operated upon by an associated task. Each virtual screen descriptor block includes a field identifying the associated screen, a field identifying the associated task, fields describing the associated screen, a field containing a pointer to a first viewport associated with the screen, a field containing an array of numbers identifying all viewports associated with the screen, and a field for containing a pointer to a next virtual screen descriptor block associated with a screen.

Each viewport is described by a viewport descriptor block including a field containing a pointer to a page containing the data to be displayed within the viewport, fields describing the logical location and dimensions of the viewport relative to the data to be displayed therein, fields describing the location of a cursor within the viewport, the position of the viewport being associated with the operation of the associated task upon the data, and a field for containing a pointer to a next viewport descriptor block of a viewport associated with the screen.

Other advantages and features of the present invention will be understood by those of ordinary skill in the art after referring to the following detailed description of preferred embodiment and drawings, wherein:

DESCRIPTION OF A PREFERRED EMBODIMENT

The following description presents the structure and operation of a data processing system incorporating the present invention. The structure and operation of the system will be first presented on an overall level, followed by descriptions of certain aspects of the system on a more detailed level. Finally, further detailed information and descriptions of certain of the system functions and structures will be presented in the form of appendices.

Before beginning the descriptions of the system, it should be noted that the reference numbering system used herein is constructed to clarify the following descriptions in the manner in which the references appearing in the text are related to the drawings and the elements shown therein. Each reference number is comprised of either three or four digits, wherein the two rightmost digits refer to a specific element appearing in a drawing and the one or two left digits refer to the figure in which the element first appears. For example, the reference 303 refers to the 3rd element first appearing in FIG. 3, while the reference 1033 would refer to the 33rd element first appearing in FIG. 10. Once a reference number has been assigned to an element, that reference number will be used throughout the following portions of the descriptions, including the following figures.

Figure 10A:
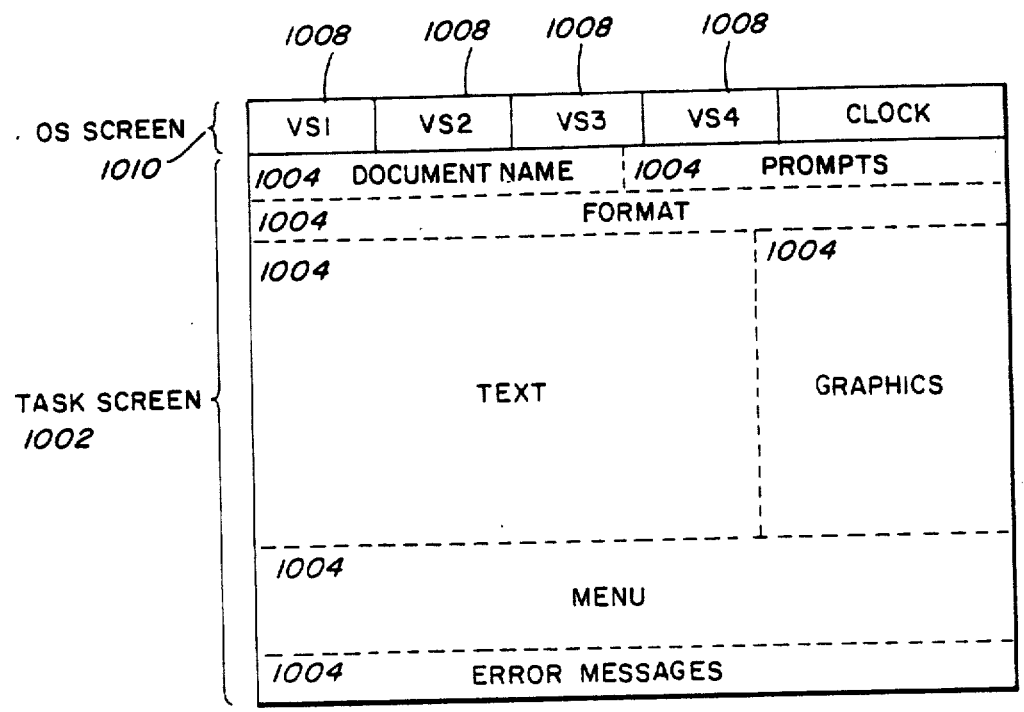
Figure 10B:
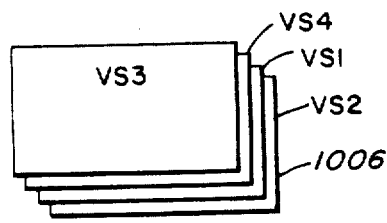
Figure 11:
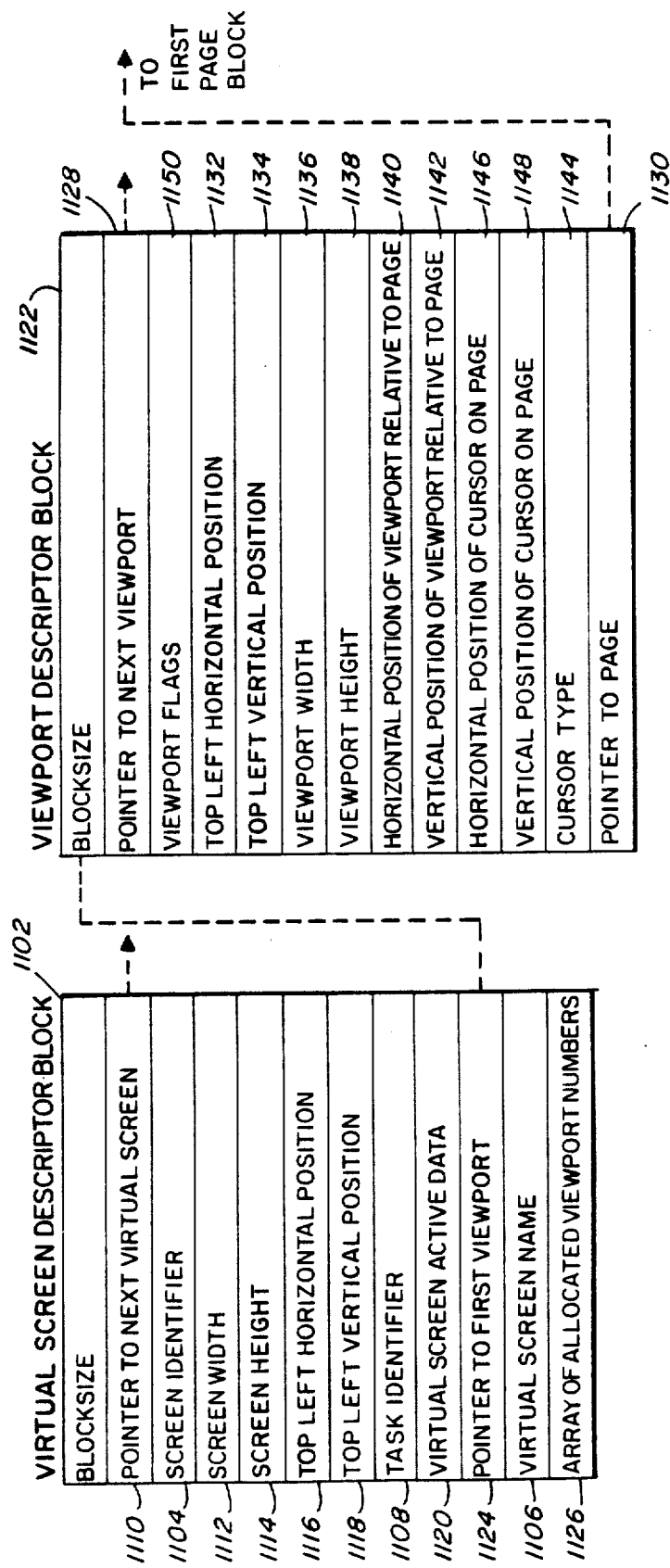
FIG. 11 is a diagrammic representation of the screen manager data structure; and, FIG. 12 is a diagrammic representation of the operation of the screen manager of the system of FIG. 1.

For example, element 1033 first appears in FIG. 10 and, if it also appears in FIG. 11, will be indicated in FIG. 11 by the reference 1033.

1. Overall System Structure and Operation (FIGS. 1 and 2)

Figure 1:
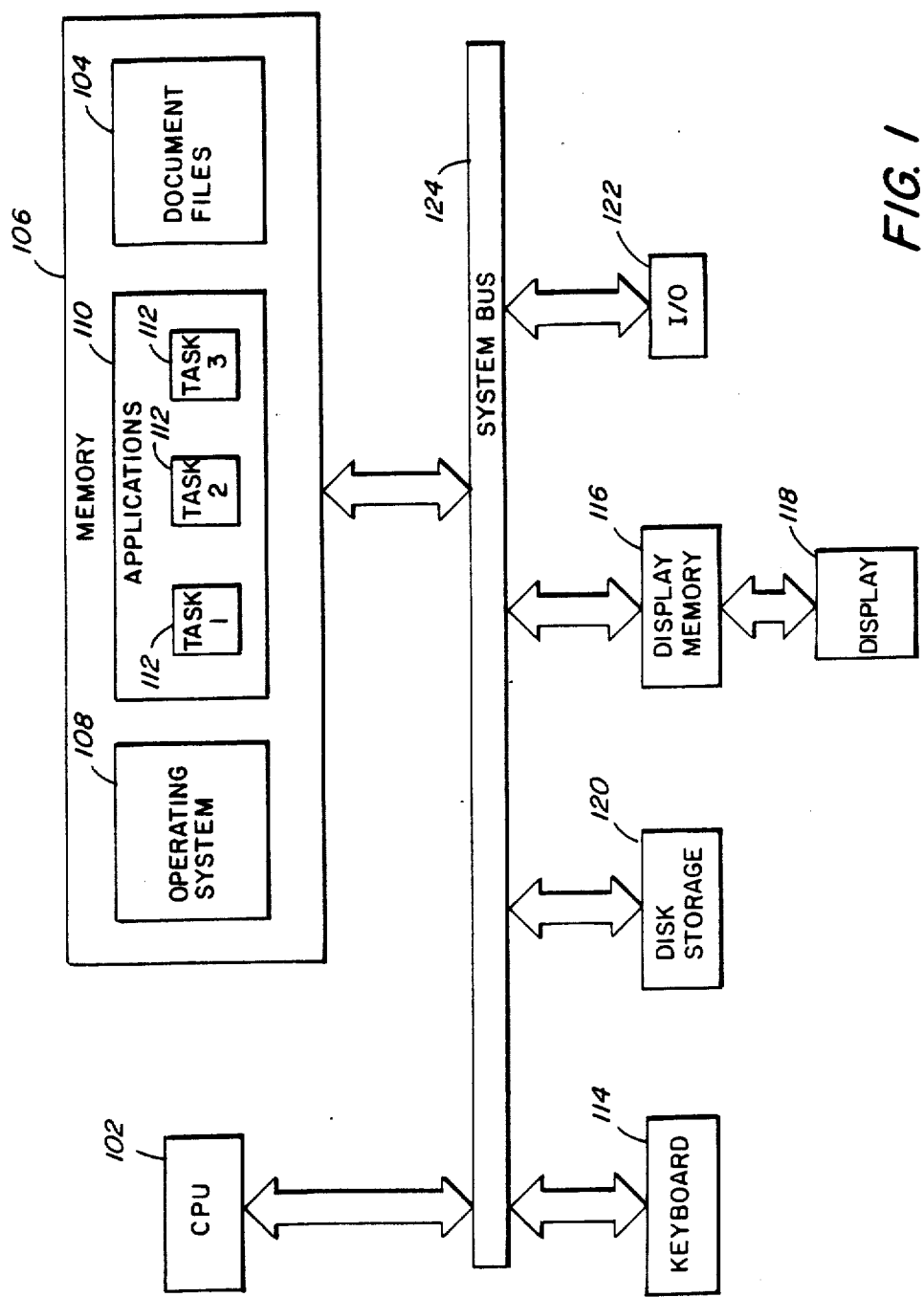
FIG. 1 is a block diagram of a system incorporating the present invention.

Referring to FIG. 1, a block diagram representation of a system incorporating the present invention is shown. The system, as described further below, is in the present embodiment a single user, multi-tasking system primarily dedicated to the performance of office functions, such as the generation, filing and printing of documents and other related office functions. As indicated therein, the system includes a Central Processing Unit (CPU) 102 for performing operations upon and related to Document Files (DFs) 104 residing in Memory 106. The operations of CPU 102, and other elements of the system, described below, are controlled by sequences of instructions, or routines, also residing in Memory 106. These routines are grouped into two broad classes, the first being Operating System (OS) routines 108 which direct the overall operations of the system and control certain commonly used or shared functions. The second group of routines are comprised of Applications 110, which are routines for controlling particular user operations upon the document files, for example, word processing and mailing list printings. As indicated in FIG. 1, Applications 110 reside in Memory 106 as one or more Tasks 112, wherein a Task 112 represents a series of operations to be performed by the system under control or direction of a user of the system.

Other elements of the system may include a Keyboard (KYBD) 114, through which a user enters instructions, commands and data to the system, and a Display Memory (DSPM) 116 and Display 118 through which the user is provided with visual representations of the system operations. Yet other elements may include a Disc Storage unit (Disc) 120 for storing, for example, document files and applications routines and an Input/Output device (I/O) 122 through which the system may communicate with other systems or devices. The elements of the system described above are interconnected and communicate through a System Bus 124.

Figure 2:
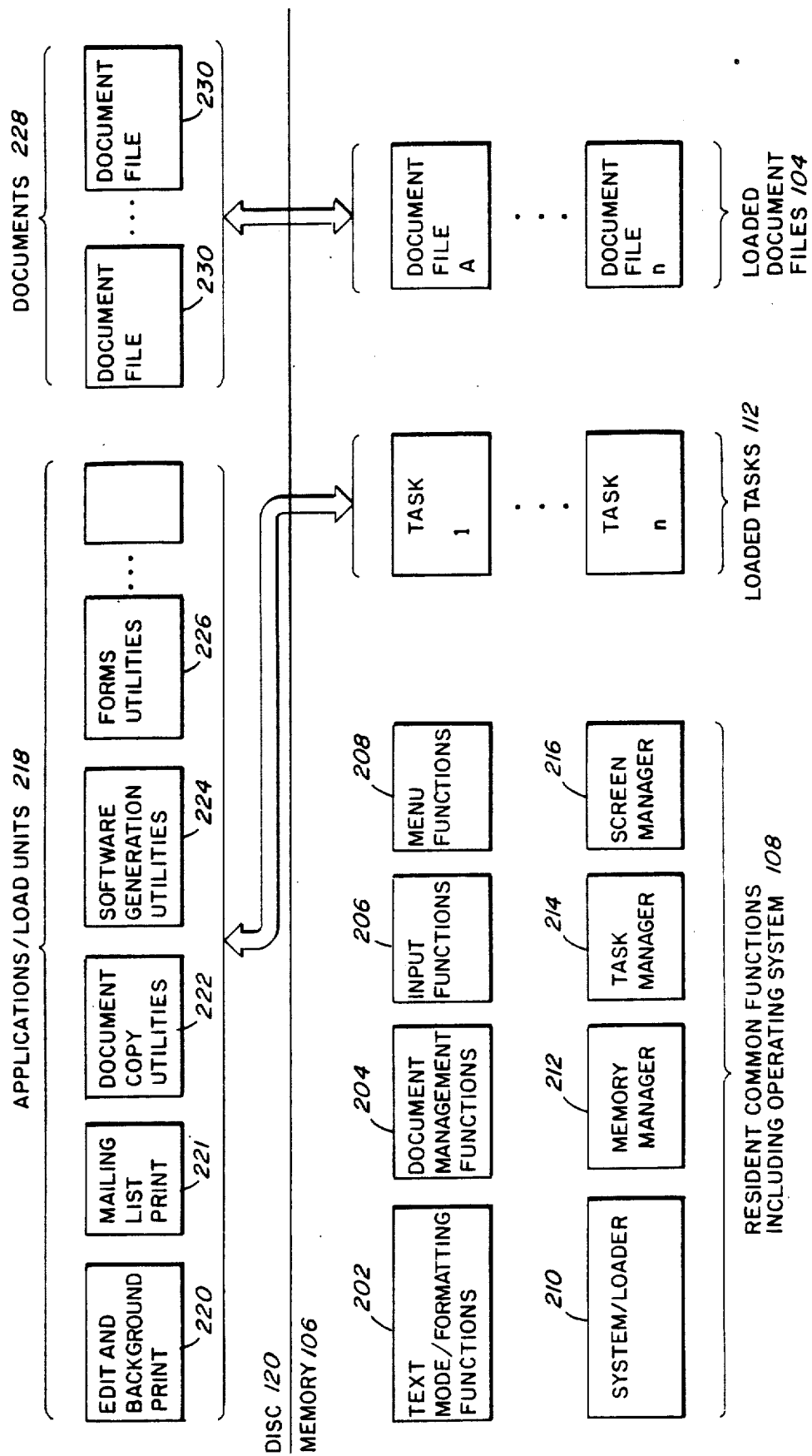
FIG. 2 is a diagrammic representation of the residence of control functions and data structures in the system of FIG. 1.

Referring to FIG. 2, a diagrammic representation of the physical residence of the Operating System (OS) 108 routines, Applications 110/Task 112 routines and Document Files 104 in the present system is shown. As described above, the controlling routines and data reside in the system memory space, which is comprised, as indicated in FIGS. 1 and 2, of Disc 120 and Memory 106.

Referring first to the OS 108 class of routines, these routines include both routines for directing the overall operation of the system and certain functions which are commonly used or shared by the various Tasks 112. In contrast to Applications 110/Tasks 112, these routines are, after system initialization, permanently resident in Memory 106. These common or shared functions, described in greater detail in the following descriptions, include, for example:

Test Mode/Formatting Functions 202 containing common text/document manipulation operations, Document Management Functions 204 which control access to Document Files 104, the communication of Document Files 104 between Disc 120 and Memory 106 and the creating, deleting, indexing, opening, closing, reading, writing, and updating of documents, Input Functions 206 which in part provide the interface between the user, through KYBD 114, and other functions controlling system operations, Menu Functions 208 which provides a menu type interface, displayed through Display 118, through which a user may select and control certain system operations and receive messages and prompts from the system, System/Loader Function 210 which in part controls the loading of Applications 110/Tasks 112 into Memory 106 from Disc 120, Memory Manager Functions 212 which control the allocation and use the the available space in Memory 106.

Task Manager Functions 214 which control the sequence of execution of Tasks 112 in the system, and Screen Manager Functions 216 which control and direct the generation of displays appearing on Display 118.

It should be noted that, at least in certain embodiments or applications, certain or portions of certain of the above may not reside permanently in Memory 106, but may reside in Disc 120 and may be called from Disc 120 to Memory 106 for use by other functions or tasks as required.

Referring to the Applications 110/Task 112 class of routines, as indicated above Applications 110 are not permanently resident in Memory 106 but commonly reside in Disc 120 as Applications/Load Units 218. Applications/Load Units 218 are loaded into Memory 106 as required to perform user selected operations and, when so loaded, become Tasks 112. As indicated in FIG. 2, the system is a multi-tasking system and more than one Task 112 may be resident in Memory 106 and executing at a given time. Applications/Load Units 218 may include, for example:

Edit and Background Print 220, which are separate Applications 110/Tasks 112, contain the functionality necessary to perform, for example, document generation and word processing functions, including printing of the final result, Mailing List Print 221 which, as the name implies, performs mailing list operations, Document Copy Utilities 222 which performs document manipulation operations associated with the copying and moving of documents or portions thereof, Software Generation Utilities 224 which provides certain programming or software generation facilities to a system user, for example, the generation of fonts in which to print documents, and Forms Utilities 226, the operation of which is described in U.S. patent application No. 595,079, titled "Electronic Processing With Forms" and filed Mar. 3, 1984.

Referring finally to document residing in the present system, as indicated in FIG. 2 Documents 228 primarily reside in the system in Disc 120 as Document Files 230 in disc file format. Document files 230 to be operated upon by the system, or portions thereof, are loaded into Memory 106 and reside therein in a document structure format, described further below, as Document Files 104. Again because the system is a multi-tasking system, more than one Document File 104 may reside in Memory 106 to be operated upon at any given time.

2. System Functional Structure and Operation (FIG. 3)

Figure 3:
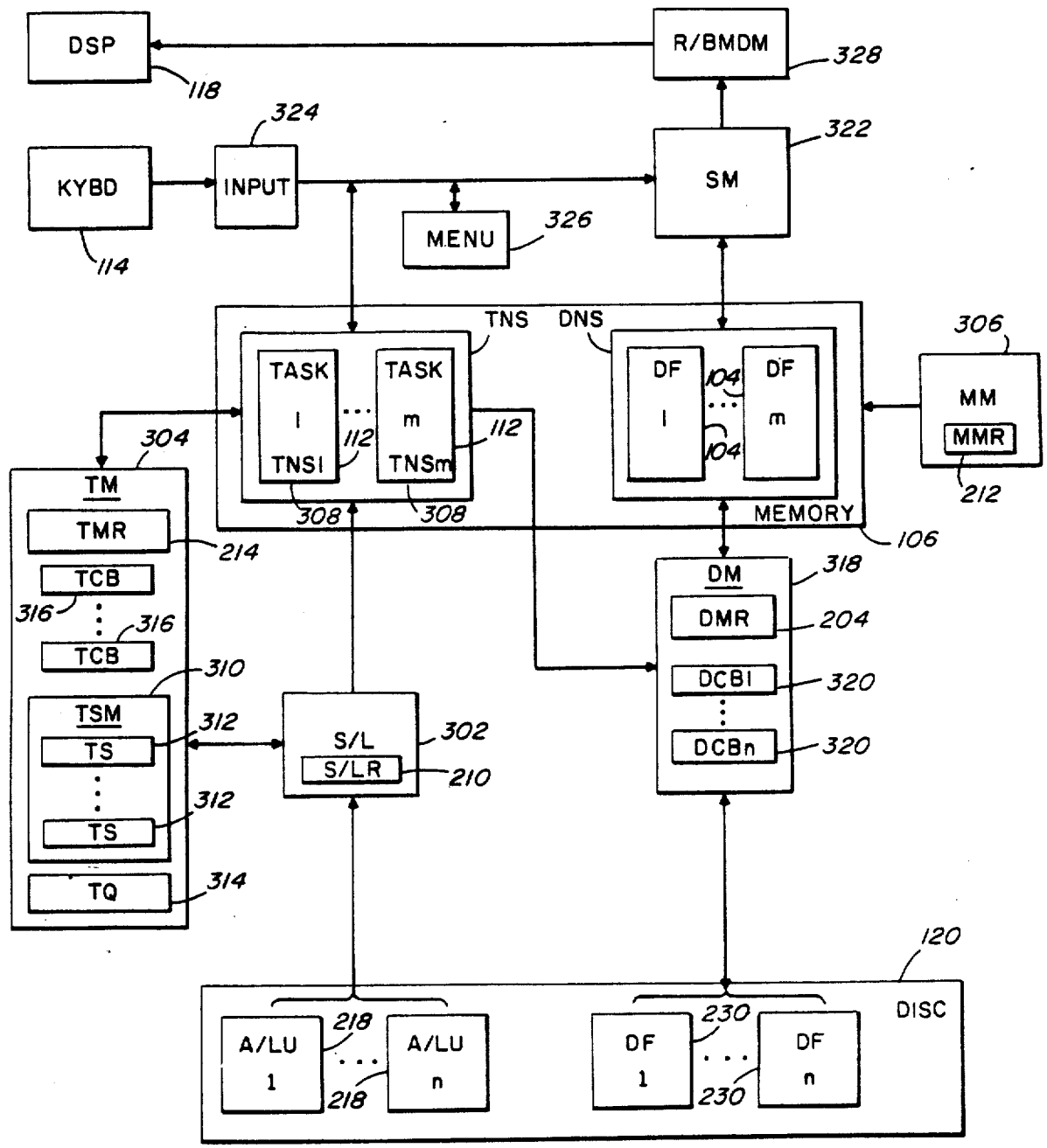
FIG. 3 is a diagrammic, functional representation of the operation of the control and data structures of the system of FIG. 1.

Referring to FIG. 3, a diagrammic representation of the functional structure and operation of the system is presented. Indicated therein is Disc 120 memory space containing one or more Application/Load Units (A/LUs) 218 and one or more Document Files (DFs) 230 in disc file format. Also indicated is that portion of Memory 106 available for storing Tasks 112 and Document Files (DFs) 104 in document structure to be operated upon.

Considering first the functional elements for loading Tasks 112 into Memory 106 and for managing execution of Tasks 112, the system includes, as previously described, a System/Loader element (S/L) 302, a Task Manager element (TM) 304 and a Memory Manager element (MM) 306. S/L 302, which includes System/Loader Routines (S/LR) 210, is the means by which A/LUs 218 are loaded into Memory 106 to become executable Tasks 112 and operates in conjunction with TM 304 and MM 306 in performing these operations. TM 304 and MM 306 include, respectively, the previously described Task Manager Routines (TMR) 214 and Memory Manager Routines (MMR) 212.

S/L 302 is responsive to either user requests, entered through KYBD 114, or requests resulting from the the operation of an already resident Task 112 to load A/LU 218s into Memory 106. In response to such request, and as described further below, S/L 302 responds to such requests by providing corresponding requests to MM 306 (not indicated in FIG. 3) to provide Task Node Spaces (TNSs) 308 to contain the new Tasks 112 and to TM 304 to create the control structures necessary to control execution of the newly loaded Tasks 112.

MM 306 responds to such requests from S/L 302 by providing such TNSs 308 while TM 304 responds by building the appropriate control structures. In this regard, it should be noted that TM 304, being the central management structure for a multi-tasking system, includes both a Task Stack Mechanism (TSM) 310 which contains a Task Stack (TS) 312 for each active Task 112 and a Task Queue (TQ) 314, which is used in determining the sequence of execution of the active Tasks 112. TM 304 also constructs, for each active Task 112, a Task Control Block (TCB) 316, described further below, which identifies and provides information pertinent to the execution of the associated Task 112.

The loading of DFs 230 or portions thereof into Memory 106 as DFs 104 to be operated upon, and access to such DFs 104 for such operations, is performed and controlled through Document Manager element (DM) 318, which includes Document Manager Routines (DMR) 204. DM 318 interacts with MM 306 to obtain the necessary space in Memory 106 and constructs and maintains, for each DF 104, a control/data structure referred to as a Document Control Block (DCB) 320, described further below, which contains information pertinent to the associated DF 104. It should be noted that, in addition to controlling the transfer of DFs 104 between Memory 106 and Disc 120, and the associated transformations in file structure, all access to DFs 104 by Tasks 112 or other system routines is generally performed through DM 318 in the manner described further below, the exception, described below, being the access of DFs 104 by Screen Manager element (SM) 322.

Referring now to the system elements effectively comprising the interface between the user and system operations, these elements include, of course, KYBD 114 and DSP 118. User inputs through KYBD 114 are provided to Input element (Input) 324, which includes keystroke handling routines. Input 324 in turn provides outputs to Tasks 112, to effect the execution thereof, to Menu element (Menu) 326, and to SM 322. Considering first Menu 326, as previously described Menu 326 includes the routines necessary to create and provide a menu type interface, displayed through Display 118, through which a user may select and control certain system operations and receive messages and prompts from the system. As required by these functions, Menu 326 also provides outputs to SM 322 to be displayed through DSP 118.

SM 322, described in further detail below and in U.S. patent application Ser. No. 655,280, titled "Screen Manager For A Data Processing System and filed Sept. 27, 1984, generates screen displays representing the operations of the system and presents such displays to the user through DSP 118 through Rasterizer/Bit Mapped Display Memory (R/BMDM) 328, which includes DSPM 116. As required by these functions, SM 322 requires access to the information contained in the document structures created as DFs 104 by DM 318, but does so through a SM 322 control structure, described in detail further below, rather than through DM 318 and DCBs 320. As also described further below. SM 322 is also provided with access to TM 304 maintained information regarding the status of certain currently active Tasks 112.

Having described the overall functional structure and operation of the system, certain elements and aspects of operation of the system will be described in further detail next below, beginning with the construction and execution of Tasks 112 and OS 108 routines.

3. Structure and Execution of Tasks 112 (FIG. 4)

Figure 4:
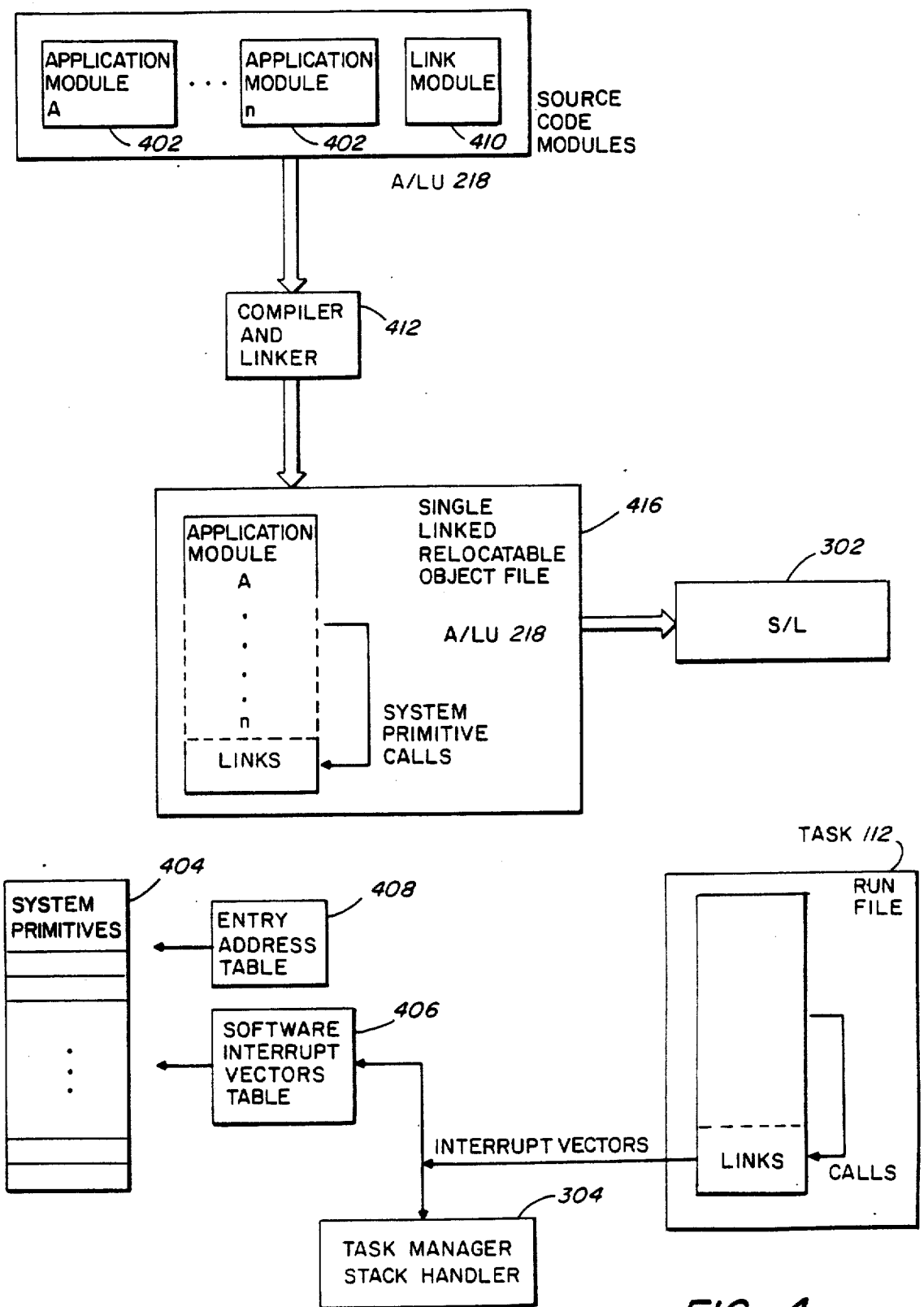
FIG. 4 is a diagrammic representation of the structure and operation of applications tasks in the system of FIG. 1.

Referring to FIG. 4, therein is represented the construction and execution of an A/LU 218. The initial structure of an A/LU 218, represented at the top of FIG. 4, is comprised of one or more source code Modules 402 created by a programmer and defining the operations to be performed by the Task 112, for example, word processing. Represented in the lower portion of FIG. 4 are the routines comprising the OS 108 and common, shared routines, referred to as "System Primitives" 404, and certain system utility routines. These System Primitive Routines 404, some of which are described in further detail in following descriptions, may be called by an A/LU 218, as a Task 112, as required to perform the operations of the A/LU 218 and may include, for example:

Document Manager Routines 204,
Memory Management Routines 212,
Semaphore Management Routines (associated with Task Manager Routines 214),
Scheduling Routines (associated with Task Manager Routines 214),
Task Management Routines 214,
Timer Service Routines (associated with Task Manager Routines 214),
Screen Management Routines 216,
File Management Routines,
Direct Interrupt Control Routines,
File Access Routines,
Menu Routines 208, and
Device Control Routines.

In order to be able to create each A/LU 218 separately and to be able to load each A/LU 218 into the system dynamically, it is necessary to decouple all System Primitive Routines 404 and certain system functions, as described above, from the A/LUs 218. It is further preferable if, in doing so, the speed of execution of system primitive calls by the A/LUs 218 were enhanced. This is done, as shown in FIG. 4, by coding all System Primitive Routine 404 entry points as interrupt vectors through a Software Interrupt Vector Table 406 residing in a reserved area of Memory 106. Essentially, and as described below, all System Primitive Routine 404 calls by A/LUs 218, that is, by Tasks 112, are executed as software interrupt calls. As an initial step in such calls, the calling Task 112, operating through the stack handling facility of TM 304, pushes all necessary arguments onto its' associated stack and, for some calls, puts its' function code into a designated register.

In addition to the above A/LU 218/Task 112 calls, certain system functions, such as system start and application program terminate, are called through software interrupts to maintain software version independency. The system also provides, as indicated in FIG. 4, an Entry Address Table 408 for other entry to System Primitive Routines 404.

Considering now the construction of a A/LU 218/Task 112 performing System Primitive Routine 404 calls through a software interrupt mechanism, the initial source code applications Modules 402 have associated with them a Link Module 410 which defines the relationships between system primitive calls and the entries in Software Interrupt Vector Table 406. Upon compilation and linking of the original source code Modules and Link Module 410, through Compiler and Linker 412, the modules are transformed into a single, linked, relocatable Object File 416 wherein the original system primitive calls are linked into the appropriate interrupt vectors taken from Link Module 410.

Object File 416 is an object code A/LU 218 and may be loaded into Memory 106 as a "run" file by S/L 302, as previously described, and all system primitive calls will, as described above, be executed as software interrupts by the Interrupt Vectors 418 resulting from such system primitive calls.

Having described the construction and structure of an A/LU 218 and Task 112, the loading of an A/LU 218 into the system to become a Task 112 will be described next below.

4. Loading of Tasks 112-Operation of System/Loader 302, Task Manager 304 and Memory Manager 306 (FIG. 5)

Figure 5:
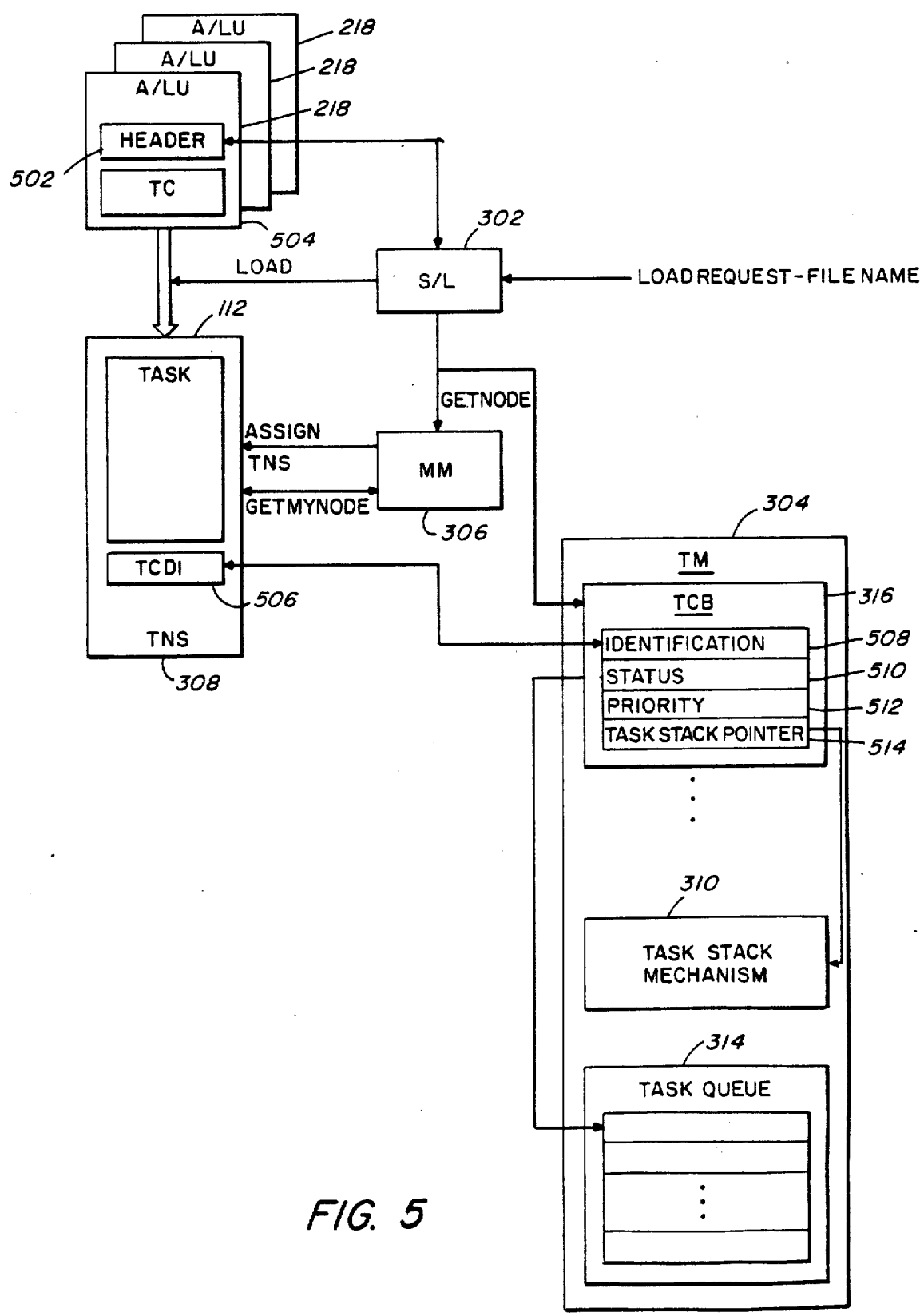
FIG. 5 is a diagrammic representation of the system loader and task manager of the system of FIG. 1.

Referring to FIG. 5, therein is represented the loading of an A/LU 218 into the system to become a Task 112, and the associated operations of S/L 302, TM 304 and MM 306. Shown therein are a plurality of A/LUs 218 resident in Disc 122, one of which is to be loaded into Memory 106 as a Task 112.

The loading of an A/LU 218 into Memory is initiated by a request for such an operation. Such requests may be initiated by a user through KYBD 114 and Input 324, or may be initiated by another active Task 112, and will include a file name identification of the requested A/LU 218. Such a request is provided to S/L 302, which identifies the corresponding A/LU 218 by means of a Header 502, containing identification information, associated with the A/LU 218 Task Code (TC) 504, or routines.

S/L 302 first generates a request to MM 306, by means of a MM 306 primitive (Getnode), for an area of Memory 106 to be assigned as the TNS 308 of the requested A/LU 218/Task 112. MM 306 will respond by assigning such a space and will identify the location of the TNS 308 to S/L 302. The TNS 308 associated with a given Task 112 is effectively that Task 112s memory space to be used as required in executing its' operations.

S/L 302 then provides a request to TM 304 for TM 304 to construct the appropriate control structures for the requested A/LU 218. TM 304 responds by constructing a TCB 316, as described previously, and returning the TCB Identification (TCDI) 506 of the newly constructed TCB 316 associated with the requested A/LU 218.

S/L 302 then writes the A/LU 218 into the assigned TNS 308 and the assigned TCDI 506 into a assigned location within the TNS 308. The A/LU 218 thereby becomes an executable Task 112 by being assigned an active TNS 308 and by being linked into TM 304 by its' associated TCDI 506, which is effectively an address, or pointer, to its' associated TCB 316 in TM 304.

Referring now to TM 304 as shown in FIG. 5, as indicated therein each TCB 316 includes a unique Identification 508 identifying that particular TCB 316, Status 510 information describing the state of execution of the associated Task 112, Priority 512 information identifying the relative priority of the associated Task 112, and a Task Stack Pointer 514 identifying the location of the associated Task 112s stack in TM 304's TSM 310. Each TCB 316 associated with a Task 112 effectively resides in TM 304's Task Queue 314 wherein the TCBs 316 are linked, or chained, in order of task execution by a series of head pointers and a tail pointer. The order of execution is determined by task priority and status and TM 304 maintains a separate Task Queue 314 for each level of priority.

The above description has described the operation of MM 306 with regard to the initial assignment of a TNS 308 when a new A/LU 218 is loaded into the system to become a Task 112. It should be noted that, as described in further detail in following descriptions, MM 306 provides means for a Task 112 to request the assignment of further Memory 106 space to its' TNS 308, specifically through the Getmynode primitive.

Further description regarding the structure and operation of TM 304 and MM 306 may be found in the attached appendices titled, respectively, "Appendix A-Task Manager" and "Appendix B-Memory Manager", incorporated herein by reference.

Having described above the structure of Tasks 112 and the loading of Tasks 112 into the system, the structure of DFs 104 upon which those tasks operate will be described next below, followed by a description of DM 318.

Figure 6:
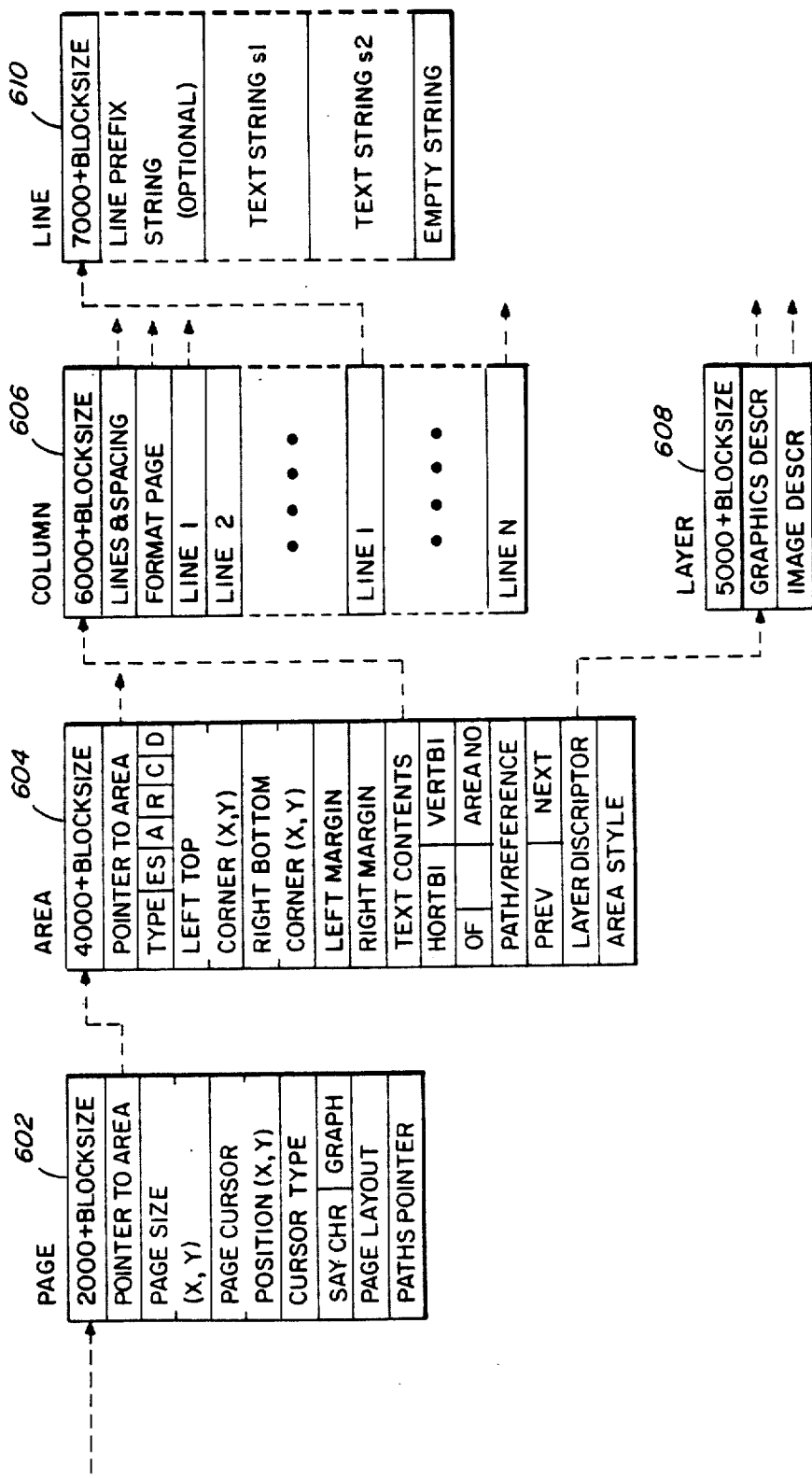
FIG. 6 is a diagrammic representation of the data structure of the system of FIG. 1.
Figure 7:
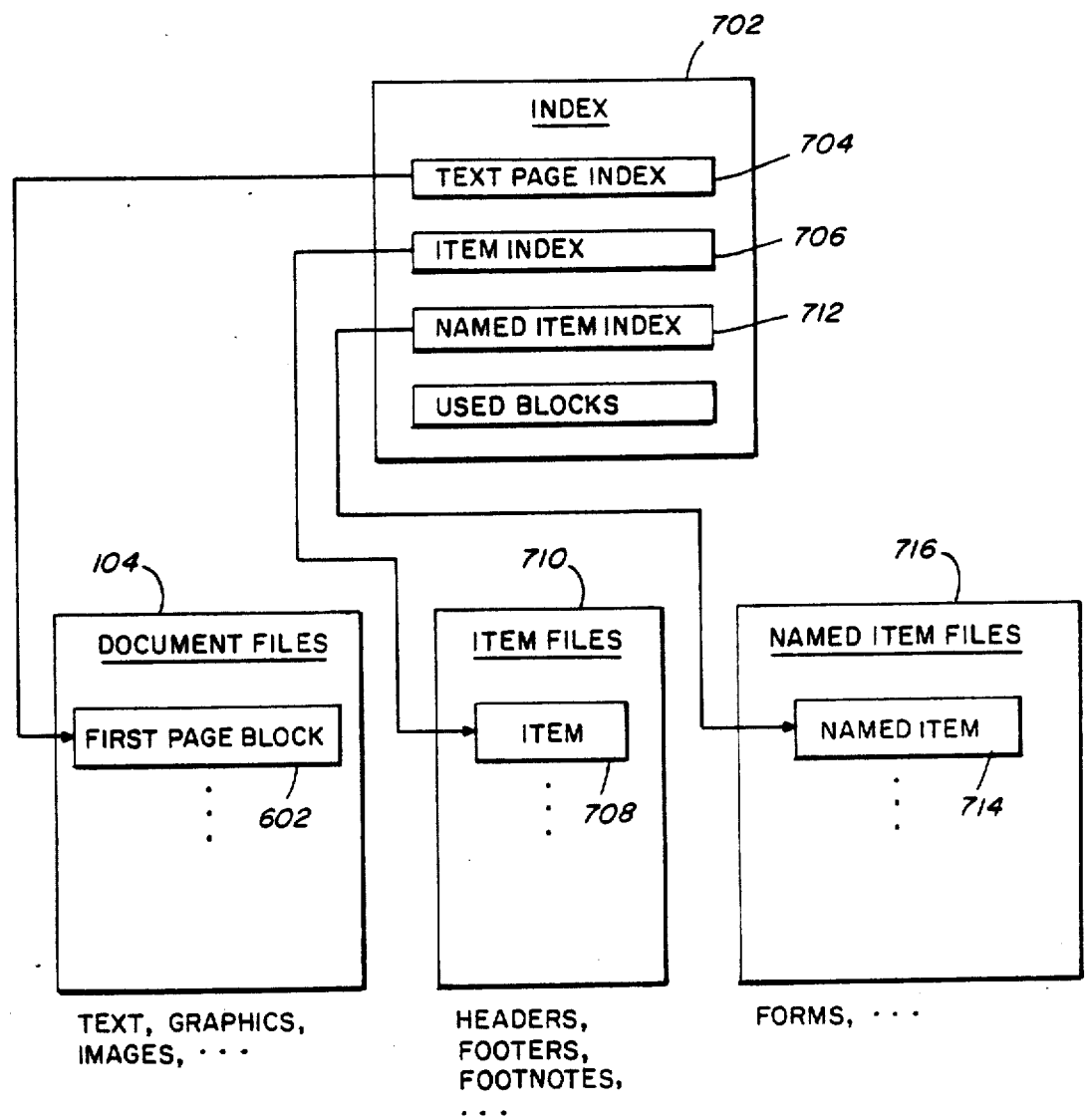
FIG. 7 is a diagrammic representation of the data file structure of the system of FIG. 1.

5. Document Files 104 Structure (FIGS. 6 and 7)

The structure of Document Files (DFs) 104 may be considered as comprised of two parts, the first being the actual document structure and the second being the file structure through which DM 318 accesses the document structure. These structures will thereby be described below, in that order and with reference to, respectively, FIGS. 6 and 7.

Before describing the document structure, the concept upon which the document structure is based must first be described. Essentially, the concept of the document structure is based upon that of an actual, physical document, which is comprised of one or more pages and wherein each such page may be regarded as comprised of one or more definable areas, each area containing a particular type of information. The information which may appear in such areas may include, for example, single column text, multiple column text, graphics, images, headers or footers, and footnotes.

A document file is comprised of a group of one or more Pages, wherein each Page is a rectangular, displayable object of general content comprised, for example, of text, graphic and image data. A Page may be a Menu, a Status line, a Prompt, or a Document Page. In this regard, a Page should not be confused with a Document Page, which is one form of a Page.

Each Page contains one or more Areas, an Area being a rectangular portion of a Page which is not subdivided and which may contain one or more Layers. A Layer, in turn, is a portion of the contents of an Area and contains a particular type of information, for example, text, graphics or images, and Layers may be superimposed to comprise the contents of an Area.

To aid in understanding the following descriptions of the operation of the present system, the following definitions are further provided. First, a Region is a rectangular portion of a Page which is further sub-divided. Finally, a Window is a rectangular portion of a Page which can be visible, for example to a user.

Referring now to FIG. 6, a partial illustration of a DF 104 data structure is shown; the data structure is further illustrated in "Appendix C-Document Data Structure". The first element of the structure is a Page Block 602 containing a pointer to the first Area of the Page, Page size information, Page Cursor information describing the location of a cursor in the Page. The cursor position information, among other functions, defines the location within the Page wherein current operations, for example, the insertion of text, will be performed. Also included is information as to cursor type, Save information, information as to whether the Page displays formatting, and information regarding Page layout. The Page block also contain Path Pointer information pointing to a Path Block which in turn defines, for example, whether the Page contains graphic or free text information and areas to receive overflow text. The second element or elements of the data structure are one or more Area Blocks 604, each of which contains information pertaining to an associated Area of the Page. An Area Block 604 contains a pointer to the next Area Block 504, if there is more than one, information defining the type of Area, information identifying the locations of the top left and bottom right corners of the Area within the Page, and information regarding the right and left margins of the Area. A Text Contents pointer identifies the location of a Column Block 606, described below and identifying the location of text appearing in the Area, and a Layer Descriptor identifies the location of a Layer Block 608 described further below and identifying the location of graphics or image data appearing in the Area. Other fields of an Area Block 604 define the relationships between the edges of the Area and other Areas (ES), the path sequences to previous and next Areas of the Page (Path/Reference, Prev., Next), style information pertaining to text in the Area (Area Style), and information pertaining to positional characteristics of text appearing in the Area (VERTB1, HORTB1).

The next elements, the Column Blocks contain information pertaining to text appearing in the Area. The first information, Lines & Spacing, defines the number of lines appearing in a column of text and the vertical spacing of the lines. The Format Page field contains a pointer to a block of format information defining the format of the associated column. The following fields, Line 1, Line 2, and so on, contain pointers to Line Blocks 610, each containing text appearing in the associated column and information pertaining to that text.

Referring to the example of a Line Block 610, the text appearing in a column is comprised of a series of text strings, each such string having common characteristics, or attributes, such as whether the characters are bold or italic or overscored or underscored. A Line Block 610 is comprised of a Line Prefix String containing information pertaining to the following text and one or more Text Strings containing the characters of the text. Each Text String is comprised of a String Header containing information regarding the characteristics or attributes of the associated string of text characters, and a string of text characters to which those attributes apply. A line may also contain a reference to an external information item which applies or is related to the Line, for example, headers, footers and footnotes, but may include other such items.

Referring finally to the Layer Blocks 608, each Layer Block 608 contains a Graphics Descriptor or an Image Descriptor, each being a pointer to an associated body of graphics or image data appearing in the Area.

While the above description of the document structure has been sufficient as regards the following descriptions of operation of the system, further information regarding the document structure will be found in the appendix titled "Appendix C-Document Data Structure", incorporated herein by reference.

Having described the document data structures used in DFs 104, the Document File Structure through which DM 318 accesses DFs 104 will be described next below.

Referring to FIG. 7, the document file structure used by DM 318 included an Index Block 702 which includes a Text Page Index field 704 containing pointers identifying the locations of the Page Blocks 602 in the associated DF 104. As described above, a Page Block 602 of a DF 104 then contains the information necessary to locate the remaining information pertaining to that Page. The Index Block 702 further contains an Item Index field 706 identifying the locations of the Item File Blocks 708 in Item File 710.

The Item File Blocks 708 of Item File 710 may be chained together in the same manner as described above with reference to the document data structure and Item File 710 contains information pertaining to headers, footers and footnotes appearing in the document contained in the associated document structure. Index Block 702 further contains a Named Item Index Field 712 which contains pointers identifying the locations of the Named Item Blocks 714 in Named Item File 716. Named Item Blocks 714 in Named Item File 716 may again be chained together in the manner described above and essentially contain document data which is identified specifically by names, for example, forms containing blank spaces to be filled in as, for example, described in U.S. patent application Ser. No. 595,079, titled "Electronic Processing With Forms" and filed Mar. 3, 1984. Further description of the document file structure may be found in the appendix titled "Appendix D-File Management System", incorporated herein by reference.

Having described the document structure used to store document data in DFs 104, and the file structure utilized by DM 318, the operation of DM 318 will be described next below.

6. Document Manager 318, Structure and Operation (FIG. 8)

Figure 8:
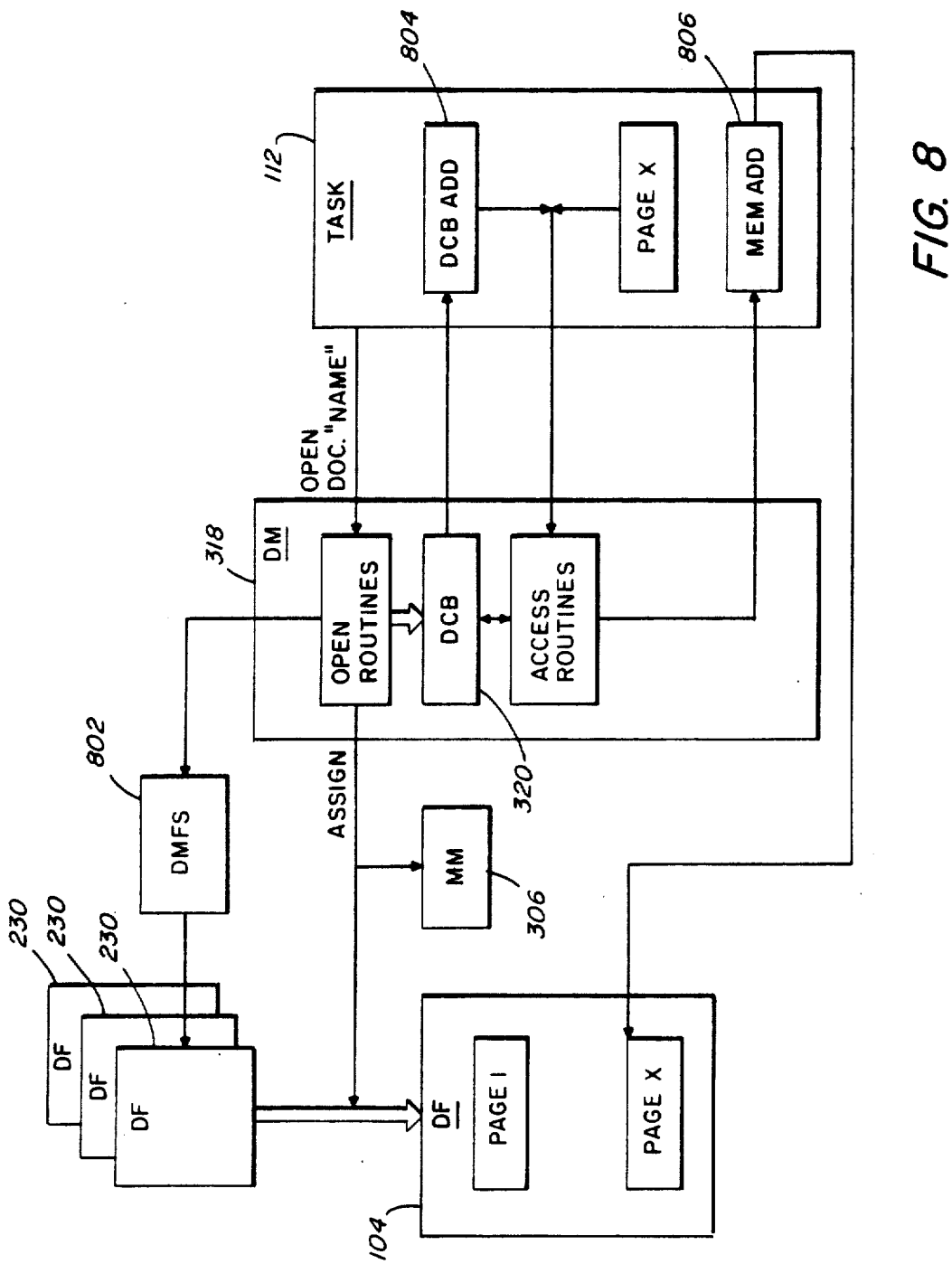
FIG. 8 is a diagrammic representation of the document manager of the system of FIG. 1.

Referring to FIG. 8, the operation of DM 318 is illustrated with respect to the loading, or opening, of a DF 104 and subsequent access to such a DF 104 by a Task 112. Further information regarding DM 318 may be found in the appendix titled "Appendix E-Document Manager" and is incorporated herein by reference.

As indicated in FIG. 8, a single DF 230 in disc file format is to be selected from a plurality of such DF 230s in Disc 120 and is to be read into Memory 106 as a DF 104 in document structure format for subsequent access by a Task 112. The loading of a DF 230 into Memory 106 may be initiated by means of a request issued by a Task 112, either as a result of a user command to do so or as a result of the operation of the Task 112. In the example illustrated in FIG. 8, the Task 112 desiring access to the document is shown as issuing the request. Such a request is essentially comprised of an open document request to the appropriate DM 318 OPEN routine, accompanied by the "Name", or file name, of the document requested.

DM 318 responds to such a request by locating the requested document in Disc 120 through the DM File Structure (DMFS) 802 and by issuing to MM 106 a request for the assignment of Memory 106 space in which to write the requested DF 104. MM 106 will respond in the manner described previously with reference to the operation of S/L 302 and the requested DF 230 will be assigned Memory 106 space in which to be written in document structure format as a DF 104. The requested DF 104 will then be actually written into Memory 106 is a separate, subsequent operation.

At this time, DM 318 generates a Document Control Block (DCB) 320 for and corresponding to the loaded DF 104 and writes the location of this corresponding DCB 320, as DCB Address (DCB ADD) 804, into an assigned location in the Task 112 requesting access to the document. As will be described further below, a DCB contains file information usable by DM 318 in maintaining the DF 104, information locating the document data within the DF 104 data structure, and information used by the Task 112 in operating upon the document data.

To obtain actual access to the document, for example, to operate upon the data contained therein, the Task 112 submits a request for such an operation to the DM 318 ACCESS routines. Such a request is comprised of an identification of the access or operation desired, the DCB ADD 804 of the DCB 320 corresponding to the DF 104, and the location within the document structure to which access is desired. Such location information takes the form of the identification of the Page containing the location, and the location within the Page. In the example presented in FIG. 8, the Task 112 has requested access to Page X of the DF 104. DM 318 then, using the access information contained in the corresponding DCB 320 and the document structure previously described with reference to FIG. 6, locates the location, or address, within Memory 106 of the requested Page X and returns this Memory Address (MEM ADD) 806 to a designated location in Task 112. Task 112 may then execute the desired operation.

Figure 9:
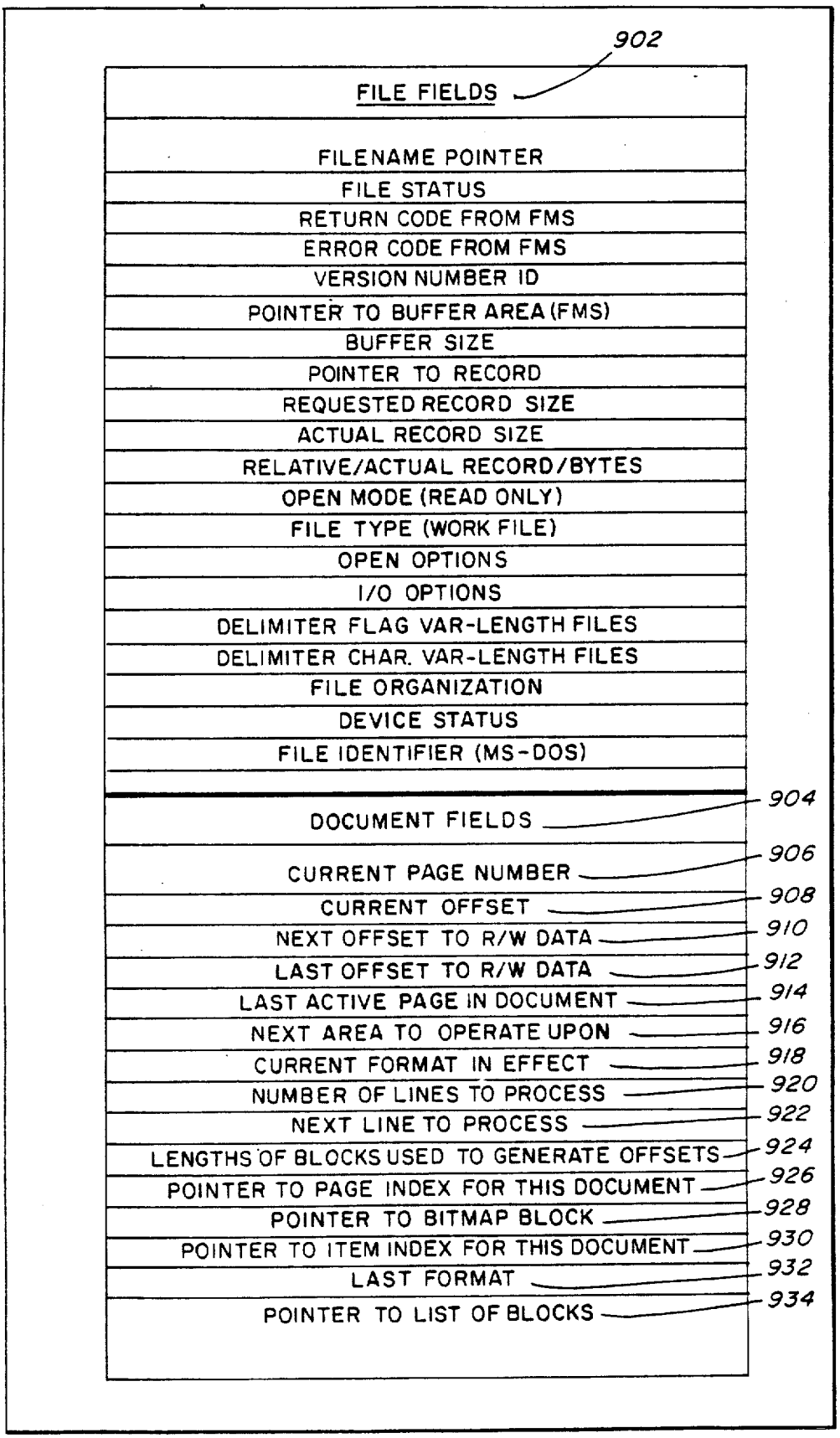
FIG. 9 is a diagrammic representation of a document control block generated by the document manager of the system of FIG. 1, FIGS. 10A and 10B are a diagrammic illustration of a display generated by the screen manager of the system of FIG. 1.

Referring to FIG. 9, therein is illustrated the structure of a DCB 320. As indicated therein, a DCB 320 is comprised to two major groups of information fields. The first, File Fields 902, is comprised of information used by DM 318 and DMFS 802 in maintaning the document record, or file, while the second group of fields, Document Fields 904, contains information used in accessing and operating upon the data contained in the DF 104 data structure.

The contents and functions of the various fields comprising File Fields 902 are described in detail in the appendix titled "Appendix D-File Management System" and, being incorporated herein by reference, will not be discussed further at this point. The contents and functions of the various fields comprising Document Fields 904 will be described further next below. During the following description, reference should be made to FIG. 6, illustrating the document data structure, and to Appendix C-Document Data Structure.

As described above, the various fields comprising Document Fields 904 contain information used, in part, in accessing and operating upon the document data contained in the document structure and, in part, link a Task 112 operating upon such data to the data in the document structure.

Referring to the Document Fields 904, Field 906 (Current Page Number) contains an identifier of the document Page currently being operated upon by a Task 112 while Field 908 (Current Offset) identifies the offset, or location, within that Page of the last operation executed by DM 318; this field may also indicated a current or next operation by DM 318.

Fields 910 and 912, respectively Next Offset To Read/Write Data, Last Offset to Read/Write Data, identify the locations of the previous the next Columns containing data which may be operated upon. Field 914 (Last Active Page) identifies the last Page in the document currently containing data, while Field 916 (Next Area To Operate Upon) identifies the next sequential Area containing data which may be operated upon. Field 918 (Current Format In Effect) identifies the format of the Column currently being operated upon while Field 932 (Last Format) identifies the format of the final Column of the document.

Field 920 (Number Of Lines To Process) indicates the number of Lines in the Column currently being operated upon while Field 922 (Next Line To Process) identifies the next of those Lines. Field 924 (Lengths Of Blocks Used to Generate Offsets) identifies the lengths of the Blocks in the document. Field 926 (Pointer To Page Index For This Document) contains a pointer to the Text Page Index 704 of the Document File Structure (see FIG. 7). Field 930 (Pointer To Item Index For This Document) is similar to Field 928 but contains a pointer to Item Index 706.

Finally, Field 928 (Pointer to Bitmap Block) contains a point to the Document File Structure field indicated the used/un-used Blocks in the document while Field 934 (Pointer to List of Blocks) similarly contains a pointer to a list of the Blocks in the document.

Having described the overall operation of DM 318 and the document structure and DCBs 318 associated with DM 318, the structure and operation of Screen Manager (SM) 322 will be described next below.

Figure 12:
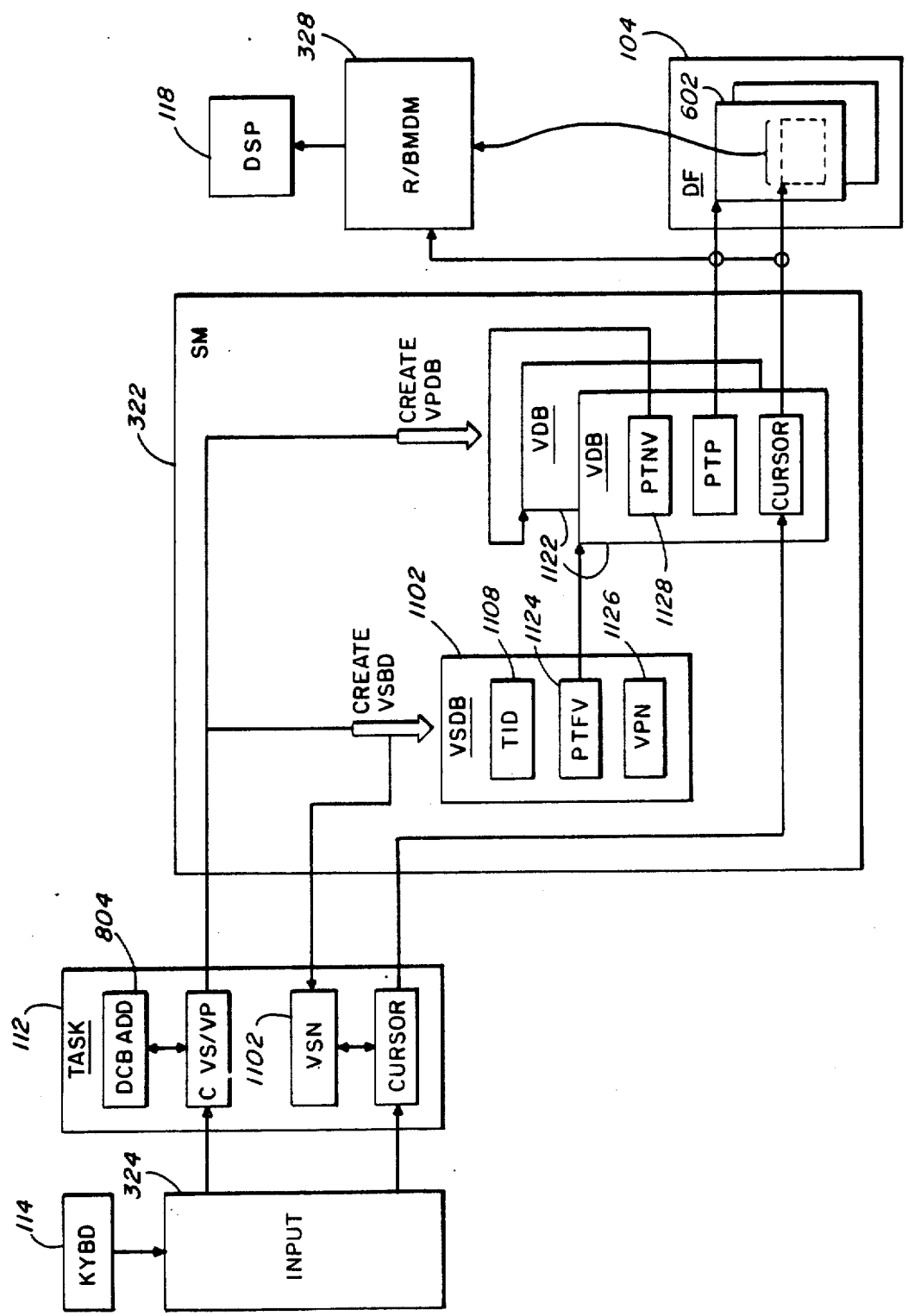

7. Screen Manager 322, Structure and Operation (FIGS. 10, 11 and 12)

As previously described, SM 322 operates with R/BMDM 328, under control of Tasks 112 or user command through Input 324, to generate visual displays representing system operations or information, the resulting displays being presented to the user through DSP 118. SM 322 defines the information to be displayed, extracts the information from DFs 104 or TM 304, and provides the information to be displayed to R/BMDM 328. In this regard, it should be noted that, as previously described and as described further below, SM 322 is the only system element which is not required to access DFs 104 through DM 318, although SM 322 utilizes the document structures constructed by DM 318 to access document data for display.

R/BMDM 328 is comprised of a rasterizer and a bit mapped display memory. The rasterizer portion of R/BMDM 328 receives information to be displayed from SM 322, rasterizes the information into bit mapped form, and stores the resulting bit mapped display information in the bit mapped memory portion of R/BMDM 328. The display information is then read from the bit mapped display memory and displayed to the user through DSP 118.

As previously described, the present system is a multi-tasking system, that is, can execute one task which interacts with the user in the foreground mode while executing one or more tasks not requiring such interaction in the background mode. As described in associated U.S. Patent Application Ser. No. 655,280, titled "Screen Manager For A Data Processing System and filed Sept. 27, 1984, the display provided by SM 322 reflects this system operation in the manner in which it generates a "windowed" display. That is, the screen display is divided into various windows, or areas, each window displaying information regarding a an associated aspect of system operation. As described below, the location, size and information content of each such window is dependent upon the associated aspect of system operation to be displayed therein.

A typical display on the physical display screen of DSP 118 is illustrated in FIG. 10A. A display from the foreground task is provided on a major portion of the physical display screen indicated as the Task Screen 1002. Under control of the operating system to be described below, the display on the task screen may be divided into a number of display Viewports 1004, each of which independently displays a different set of information. Viewports 1004 are shown separated by broken lines but such lines need not actually be displayed. As examples, on the display of FIG. 10A Viewports 1004 are provided to display the document name, prompts, word processing page format, text, graphics, a user menu, and error messages. Of course, many other types of information can be displayed in different Viewports 1004 and all of the Viewports 1004 shown in FIG. 10A need not be displayed at any one time.

The viewport technique gives each application task great flexibility in designating the data to be displayed. The flexibility is obtained with little added complication to the application task software because, once established by the application task, it is controlled by SM 322. Once the Viewports 1004 have been established, the application software need only be concerned with completing the task and modifying the data to be displayed as required by the task. As noted above, only the Task 112 with which the user is interacting at any time is permitted to control a display on the physical screen. Although background tasks are not permitted to control DSP 118, SM 322 establishes virtual screens corresponding to background applications.

Those virtual screens can be considered, as shown in FIG. 10B, to be the logical equivalent of a stack of pages including Virtual Screens 1006 VS1, VS2, VS3 and VS4. Only one of those Virtual Screens 1006 is displayed on the physical screen, that is, as Task Screen 1002. The other Virtual Screens 1006 are held by SM 322 for display when called by the operator.

In order that the system user can always be aware of the status of the Tasks 112 associated with Virtual Screens 1006 which are not displayed, SM 322 provides Virtual Screen Identifiers 1008 in a Virtual Screen portion 1010. Each Identifier 1008 may name the associated Virtual Screen 1006, or Task 112, and may also provide an indication as to the status of the associated Task 112. The SM 318 Virtual Screen portion 1010 may also include a calendar and clock display.

The present system further offers windowing at two levels. The first is at the the task level wherein a Virtual Screen 1006 may be associated with a Task 112 and the Virtual Screen 1006 associated with the current foreground Task 112 associated with Task Screen 1002. SM 322 may create as many virtual Screens 1006 as desired by the system user and may associated more than one Virtual Screen 1006 with a particular Task 112.

The second level is within the task level, whereby a particular application Task 112 can subdivide its' associated Virtual Screen 1006 into viewport windows, each displaying different information regarding that particular Task 112. Essentially, a Virtual Screen 1006 may be regarded as the visual display for its' associated Task 112 and each viewport defined therein may be regarded as a logical display window looking onto a designated area of the document being operated upon the that Task 112. In this regard, a Virtual Screen 1006 will contain at least one viewport, and may contain as many viewports as desired by the system user. Each viewport within a Virtual Screen 1006 may be individually defined as regards viewport size and position within the document and, in general, all viewports defined in a Virtual Screen 1006 will appear side by side in Task Screen 1002 wherein the associated Task 112 become the foreground task.

Referring now to FIG. 11, therein is represented the screen manager control structure through which SM 322 accesses document data contained in the document structures constructed by DM 318 and previously described with reference to FIGS. 6, 7 and 9. As indicated therein, DM 322, as described further below, constructs a Virtual Screen Descriptor Block (VSDB) 1102 for each active Task 112, the VSDB 1102 acting, for each such Task 112, to link SM 322 to both the associated Task 112 and the DF 104 being operated upon by the Task 112. It should be noted that, in the case of a Task 112 operating upon multiple DFs 104, SM 322 will construct a VSDB 1102, and associated viewport descriptor blocks, described below, for each DF 104 being operated upon by the Task 112 with the Task 112 and SM 322 being linked to each such DF 104 through the associated VSDBs 1102.

As shown in FIG. 11, each VSDB 1102 includes a Screen Identifier (SID) field 1104 identifying the particular Virtual Screen 1006, a Virtual Screen Name (VSN) field 1106 containing a name identification of the corresponding Virtual Screen 1006, and a Task Identifier (TID) field 1108 identifying the Task 112 associated with the corresponding Virtual Screen 1006. Pointer To Next Virtual Screen (PNVS) field 1110 contains a pointer to the next VSDB 1102, thereby chaining together all currently active Virtual Screen 1006 descriptor blocks for access by SM 322.

Screen Width (SW) 1112, Screen Height (SH) 1114, Top Left Horizontal Position (TLHP) 1116, and Top Left Vertical Position (TLVP) 1118 fields respectively define the width, height, and position of the corresponding Virtual Screen 1006 with respect to Task Screen 1002, that is, with respect to the appearance of the Virtual Screen 1006 on DSP 118. Virtual Screen Active Data (VSAD) field 1120 identifies that portion of the associated Virtual Screen 1006 which is presently being operated upon by the associated Task 112.

As previously described, at least one, and possibly several viewports will be associated with each Active Screen 1006. Each such viewport associated with a Virtual Screen 1006 will have associated with it a Viewport Descriptor Block (VDB) 1120, the VDB 1120 in turn being associated with the Virtual Screen 1006's VSDB 1102. As shown in FIG. 11, the VSDB 1102 of a Virtual SCreen 1006 contains a Pointer to First Viewport field 1124, which contain a pointer to the VDB 1122 of the first viewport associated with that Virtual Screen 1006. The VSDB 1102 also contains an Array Of Allocated Viewport Numbers field (AAVN) 1126, which contains entries identifying the viewports associated with the corresponding Virtual Screen 1006.

Referring now to the structure of a VDB 1122, each VDB 1122 contains a Pointer To Next Viewport field 1128 which identifies the location of the next viewport associated with the corresponding Virtual Screen 1006, thereby chaining together the VDB 1122's associated with a particular Virtual Screen 1006 for location by SM 322. The VDB 1122 further includes a Pointer To Page (PTP) field 1130 which identifies the location of the Page upon which the associated viewport is logically positioned. The Pointer to Page field 1130 pointer points to the first Page Block 602 of that Page, as previously described with reference to FIG. 6.

The VDB 1122 further contains Top Left Horizontal Position (TLHP) 1132, Top Left Vertical Position (TLVP) 1134, Viewport Width (VW) 1136 and Viewport Height (VH) 1138 fields describing the relative position and dimensions of the viewport in the associated Virtual Screen 1106.

The VDB also contains a Horizontal Position Of Viewport Relative To Page (HPVRP) field 1140 and a Vertical Position Of Viewport Relative to Page (VPVRP) field 1142 which describe the relative logical position of the associated viewport upon the Page identified by Pointer To Page field 1130. The information contained in the HPVRP 1140 and VPVRP 1142 fields, together with the information contained in the PTP field 1130, may be used by SM 322 to identify and locate the logical position, relative to the data contained therein, of the viewport within the DF 104 data structure being operated upon by the associated Task 112. These fields, in further conjunction with the information contained in VW field 1136 and VH field 1138, then allow SM 322 to located and identify the data logically contained within the associated viewport. SM 322 may thereby read the data so identified to R/BMDM 328 to be displayed in that area of Task Screen 1002 identified by the information contained in TLHP field 1132, TLVP field 1134, VW field 1136 and VH field 1138.

In addition to the above fields, VDB 1122 includes Cursor Type (CT) field 1144, Horizontal Position Of Cursor On Page (HPCP) field 1146, and Vertical Position Of Cursor On Page (HPCP) field 1148. As previously described with reference to the Cursor Type field of a Page Block 602, CT field 1144 contains information regarding an operation to be performed at the cursor location or the type of data or information involved or being operated upon.

HPCP field 1146 to VPCP field 1148 describe the position of a cursor associated with the corresponding viewport and located in the associated Page and within the viewport area in that Page. This cursor is initially located in the upper left corner of the viewport, at the position defined by TLHP field 1132 and TLVP field 1134, and is moved about within the viewport as the associated Task 112 performs operations upon that portion of the data structure corresponding to the viewport area. The cursor essentially defines the location of the data currently being operated upon by the associated Task 112.

As described further below, in addition to identifying the location of data to be operated upon within the associated DF 104, the position of the cursor as defined by HPCP field 1146 and VPCP field 1148 is monitored with regard to the position and area of the viewport as defined by the other fields of the VCB 1122. If the Task 112 operations related to the cursor move outside of the viewport area defined by the VDB 1122 fields, the position of the viewport is moved accordingly by by SM 322 by writing new viewport position information into the appropriate VDB 1122 fields. The viewport associated with a Task 112 thereby remains logically located over the DF 104 data area in which the Task 112 is operating.

Finally, it should be noted that VDB 1122 contains a Viewport Flag field 1150 containing flags describing the viewport to SM 322 and used by SM 322 in maintaining the viewport.

Having described the SM 322 structure through which SM 322 accesses data contained in DFs 104, the overall operation of SM 322 will be described next below with reference to FIG. 12.

As previously described, the creation of a Virtual Screen 1006 or a viewport within an existing Virtual Screen 1006 is generally initiated by a Task 112 in response to a user request, which may be entered by means of input through KYBD 114 and Input 324. The Task 112 will respond by providing the appropriate request for the creation of a virtual screen or viewport (C VS/VP) to SM 322, the request including the identity of the requesting Task 112, the DCB ADD 804 referring to the DCB 320 of the DF 104 in which the virtual window or viewport is to appear, and information defining the virtual screen or viewport.

SM 322 will respond to such a request by creating the appropriate VSDB 1102 and a first VDB 1122, or if the request is for an additional viewport, by creating the appropriate VDB 1122. Considering the first, more general case, SM 322 writes a Task Identifier into TID field 1108, providing a link back to the requesting Task 112, and a Pointer to First Viewport into PTFV field 1124 to link the VSDB 1102 to the associated VDB 1122. At this time, SM 322 writes a viewport number corresponding to the newly created viewport into AAVN field 1126. A previously described, this field is used by SM 322 in maintaining and administering the allocated viewports. Then, after creating the remaining VSDB 1102 fields, SM 322 writes a Virtual Screen Number 1202 back into a designated location in the Task 112 Task Node Space 308 to be used by the Task 112 in identifying the associated VSDB 1102.

SM 322 will then, if the request was either for a new virtual screen or for new viewport within an existing virtual screen, create a VDB 1122 as described above. If the request was for a new virtual screen, the VDB 1122 will be the first VDB 1122 and is thereby pointed to by PTFV 1124. If the request was for an additional viewport, the new VDB 1122 will chained into the already existing chain of VDB 1122's by means of a pointer written into the PTNV field 1128 of the last previously existing VDB 1122. It should be noted that, in the creation of the VDB 1122, the DCB ADD provided with the initial request is used to create the Pointer to Page field 1130 entry in the DVB 1122. The cursor type and position fields of the VDB 1122 are similarly created at this time.

Having created the necessary access structure, SM 322 will subsequently use the VSDB 1102 and associated VDBs 1122 to obtain and provide information to be displayed to R/BMDM 328 and DSP 118 whenever the associated Task 112 becomes the current foreground task.

It should be noted that further information regarding the structure and operation of SM 322 may be found in the appendix titled "Appendix F-Screen Manager", incorporated herein by reference.

It should also be noted that further description of elements of the system not described in detail above may be found in yet further attached appendices. For example, a description of Menu 326 and Text Mode/-Formatting Functions 202 may be found in appendices title "Appendix G-Menu" and "Appendix H-Text Mode/Formatting", incorporated herein by reference.

The invention described above may be embodied in yet other specific forms without departing from the spirit or essential characteristics thereof. Thus, the present embodiments are to be considered in all respects as illustrative and not restrictive, the scope of the invention being indicated by the appended claims rather than by the foregoing description, and all changes which come within the meaning and range of equivalency of the claims are intended to be embraced therein.

APPENDIX A-TASK MANAGER 2.1 INTRODUCTION

The 1107 Operating System (OS) provides a real-time and priority-driven scheduling scheme for multiple user tasks that can run concurrently on the Intel 80186-based 1107 system. It is general purpose, code-economical, time-efficient, and easy to use.

The 1107 OS system primitives provides to the following facilities:
multitasking support
task synchronization (i.e., semaphore management)
intertask communication
task loading
memory management
system initialization
interval timer support
system error handling

2.2 MULTITASKING SUPPORT

The 1107 OS allows several tasks to run concurrently and independently of each other by managing the resources that the tasks use in common. System primitives are used by t Scheduling of tasks is non-preemptive, meaning that a application runs until it relinquishes control either conditionally (based on whether or not an event has occurred) or unconditionally. The system runs with interrupts always enabled. Interrupt service routines interface with the system via the Event Mask, as discussed in the section on Event Processing.

Each task has a TCB (Task Control Block) associated with it. Each TCB contains a pointer field (for queuing the TCB), a task stack pointer, a unique ID, a status indicator, the task's priority, and other task-related information.

At any point in time, a task is in one of four states:
1. Running
2. Ready to run
3. Waiting for an event
4. Crashed (frozen due to a fatal error)

The status field in the TCB will indicate 'ready' if the task is running or ready to run, or 'waiting' if the task is waiting for an event or message. Any other status value indicates a particular kind of fatal error. A list of all task status values can be found in Appendix B.

A task's TCB is always on a queue, depending on its state. For example, when tasks are ready to run, their TCBs are chained together on a FIFO 'Ready Queue' as follows:

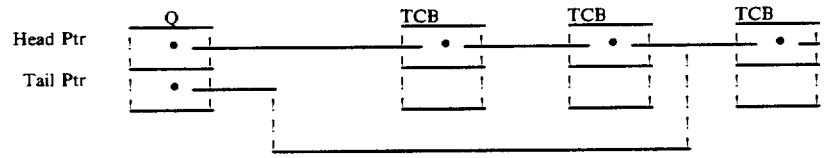

The number of task priorities is a system generation option, but only four priorities are used on the 1107. The system maintains one ready queue per priority level. Priority 1 is the highest priority. The number of ready queues, and hence the number of priorities, is found in the system variable NumberOfQueues. The task scheduler always runs the task at the head of the first non-empty ready queue. If there are no tasks to run, 1107/OS runs an idle loop until there is a task to run.

Semaphore Management

Event signalling and message passing is handled by semaphores. There are two types of semaphores: simple and message. The format is as follows:

Simple Semaphore

Count
Semaphore type (simple)
Pending task queue (FIFO queue with head and tail pointer)

Message Semaphore

Count
Semaphore type (message)
Pending task pointer
Pending message queue, ordered by message priority, with head pointer on Each semaphore is associated with a task, and resides in the task's TCB. The task is said to be the semaphore owner. Each tasks owns several semaphores. Semaphore 0 is always used as a message semaphore, and is known as the command receive semaphore. Other semaphores are available for task dependent use, but must be initialized before use by calling InitSemaphore.

The count field in the semaphore indicates whether or not an event has occurred. The count is usually initialized to zero. The count is incremented when the event occurs, and decremented when a task wishes to wait for the event. A negative count indicates a task is waiting for an event which has not yet occurred. In this case, the task's TCB is taken off the ready queue and put on the pending task queue in the event's semaphore. When the event occurs, the count is incremented. If the result is non-positive, the first TCB on the pending task queue is put back on the ready queue.

Semaphores can also be used to control resource availability. In this case, all tasks needing the resource use the same semaphore by specifying the same semaphore owner. The count indicates the number of resources available. When a resource becomes available, the count is incremented. When a task requires a resource, the count is decremented.

Messages can be looked at either way. The event is the arrival of a message; the resource is the message itself.

Examples of how the semaphore count is used

Completion Interrupt
  A count of
    +1 indicates the completion interrupt has come in, but the task is not yet waiting.
    0 is the initial value. The operation generating the interrupt has not been initiated.
    −1 indicates the task is waiting for the completion interrupt.
Common Resource
  A count of
    +n indicates that 'n' (usually 1) resources are available. For example, a count of 1 in the bus control semaphore means the bus is available. The count is initialized to 1.
    0 inidicates that no resource is available (eg. the bus is being used), but no task is waiting for it.
    −m indicates that 'm' tasks are waiting for a resource.
Messages
  A count of
    +n indicates that 'n' messages are queued on this semaphore.
    0 indicates that no messages are queued.
    −1 indicates that the task is waiting for a message.

Interrupt Support

The 1107/OS initializes the system and provides interrupt service routines for Timer interrupts.

Interval Timer Support

1107/OS allows tasks to set multiple interval timers. It does this by keeping a timer request queue and setting a 'system interval' timer whenever the queue is nonempty. The system interval timer is used to countdown the user task's interval timers. When a user timer expires, a message is sent to the task.

System/Loader Task

A special 'System/Loader Task' handles the 1107 initialization and any special-case processing needed during system operation, such as application task loading, exiting and error handling.

Once initialization is complete, the System/Loader Task display a menu for the application loading and error report. It then waits for one of four event occurs:
(1) User selected a task to load through the key board input. The associated task will be loaded and started up.
(2) If a task returns from its main-level procedure, the EndTask routine is automatically activated in order to send a 'task deletion request' to the System/Loader Task. The System/Loader Task calls a system routine to deallocate the task's TCB, stack and its own Node Space Pool and to delete the task.
(3) If a task sends a message to the System/Loader Task to indicate some of the error condition occurs. The System/Loader Task displays the error according to the error code sent and asks for certain response from the user.
(4) If a task send a message to the System/Loader Task to load another task, the System/Loader task will load the task into the memory and starts it up.

Event Processing

Previous versions of the 1107/OS always disabled interrupts inside OS primitives. This was necessary because interrupt service routines could issue OS primitives. Thus, enabling interrupts ensured that one OS primitive finished before another one (called by an ISR) started.

This version of 1107/OS keeps interrupts enabled all the time. ISRs may no longer issue any OS primitives. Instead, ISRs interface with the 1107/OS via the Event Mask and the Event Table. Each entry of the Event Table contains the address of an Event Handler routine.

At context switch time and at the beginning of certain primitives, 1107/OS processes the Event Mask from left to right. A bit on in the Event Mask activates the corresponding Event Handler found in the Event Table. Since these routines are activated at stable points in the 1107/OS, they can remain enabled.

If an ISR wishes to signal a task, it sets a predefined (application-dependent) bit in the Event Mask. This activates an Event Handler which signals the task on behalf of the ISR. Normally, Event Handles should turn off their corresponding bit in the Event Mask.

Event Handlers must not call WaitSemaphore, SignalSemaphore, SetPriority, Reschedule, or any other OS primitive which could context switch. See Appendix C for further discussion of Event Handlers and ISRs.

Dynamic Memory Management

1107/OS provides a facility for dynamically allocating and deallocating pieces of 1107 RAM. The memory pool is organized as a linked list of variable-length nodes (pieces of memory). A 'First Fit' allocation scheme is used; ie., the first available node at least as big as the size requested is chosen, and any additional bytes are returned to the memory pool.

The dynamic memory management routines should not be used excessively, since there is a certain amount of overhead. All the user tasks should allocate message nodes at initialization time and never deallocate them as possible as they can. Pointers to these nodes are kept so that they can be reused.

There are two Node Space Pools: the System Node Space Pool and the task's own Node Space Pool. GetNode/ReturnNode are used to retrieve or to return Nodes from the System Node Space Pool. GetMyNode/ReturnMyNode are used to retrieve or return Nodes from each task's own Node Space Pool. Each task's of Node Space Pool is created (from the System Node Space Pool) when the task is started up by the System/Loader Task. Size of it is stored in the header portion of the RUN file of the task. A task should utilize its own Node Space Pool. All the Nodes from its own Node Space Pool should be returned before the task exits and the whole own Node Space Pool will be returned to the System Node Space Pool (whether or not they are completely returned by the task) by the operating system. Should there be a need for the task to send a message other task before it exits, then the task should allocate this last Message Node from the System Node Space Pool (by calling GETNODE in stead of GETMYNODE).

Task Creation and Deletion

There are two permenant tasks on the 1107 system: the System/Loader task and the Clock Task. They are invoked at 1107 initialization, using information in the 1107 data base, and they never terminate. However, facilities are available for dynamically creating and deleting tasks. Creating a task consists of allocating and initializing its TCB, own Node Space Pool and stack, and then queuing the task to run. Any task can request termination and deletion by simply returning from its main-level procedure. 1107/OS will deallocate its TCB, own Node Space Pool and stack and delete the TCB pointer table entry.

Task Cancellation

1107/OS tries to protect itself against certain invalid requests from use tasks. For example, a message may not be sent to a non-existent task. When such error situations are encountered, the error type is stored in the status field in the TCB, and the Cancel routine is called. Appendix B contains a list of task status values. The system is designed such that the Cancel routine is part of the machine-specific OS portion, in this case the Cancel routine will display the appropriate error code and then 'crash the task'. This involves puttng the TCB at the head of a special crash queue. No resources are deallocated, so that the problem may be debugged.

System Routine Descriptions

This section describes the interface to all 1107/OS routines, given in terms of Large C function convention. The data type descriptions are given in Appendix A.

Scheduling Primitives

Reschedule

Call: Reschedule;
Inputs: None
Outputs: None
Function:
Reschedule is used to explicitly give other tasks a chance to run. The calling task is taken off the ready queue and re-queued at the end of the same queue. The OS then processes any events specified by the Event Mask and picks a task to run. Thus, a group of tasks which all issue Reschedule execute in 'round-robin' fashion.
Cancel Conditions: None

SetPriority

Call: SetPriority (Priority);
Inputs:
  Priority: Byte = The new task priority. 1 is the highest priority. The number of priorities is a system parameter, and is set to 4 for the 1107. If 0 is specified, the task's default priority is used.
Outputs: None
Function:
SetPriority is used to change the task's priority and explictly give other tasks a chance to run. SetPriority (0) should be used after initialization to ensure the task is running at its default priority. The calling task is taken off the ready queue and re-queued at the end of the new priority's ready queue. The OS then processes any events specified by the Event Mask and picks a task to run.
Cancel Conditions: Invalid Priority (higher than the maximum)

WaitSemaphore

Call: WaitSemaphore (SemNumber, TaskNumber);
Inputs:
  SemNumber: Byte = The number of the semaphore on which to wait.
  TaskNumber: Byte = The task number of the semaphore owner. −1 indicates the calling task.
Outputs: none
Function:
This routine operates on a simple semaphore. Any events specified the Event Mask are processed first. The semaphore count is decremented and checked. The routine returns immediately if the result is greater than or equal to 0. Otherwise, the calling task is queued on the semaphore's pending task queue and another task is scheduled. Eventually, the calling task will be requeued on the ready queue as the result of a SignalSemaphore being issued on the same Semaphore. When the calling task reaches the top of the ready queue, this routine will return to the caller.
Cancel Conditions:
  Invalid Semaphore Use (the semaphore specified is a message semaphore)
  Invalid Task Reference (non-existent task specified)

Semaphore Primitives

InitSemaphore

Call: InitSemaphore (SemNumber, SemCount, SemClass);
Inputs:
  SemNumber: Byte = the number of the semaphore to initialize
  SemCount: Byte = the initial count. Usually 0 for message or interrupt semaphores, and 1 for resourse semaphores.
  SemClass: SemClassType = SimpleClass or MessageClass.
Outputs: none
Function:
This routine initializes the specified semaphore using the supplied count and class. The queue pointers are set to nil. Noted that all the task's semaphores are preinitialized to message semaphores. The application task only needs to reinitialize all the semaphores used as the simple semaphores.
Cancel Conditions: none

SignalSemaphore

Call: SignalSemaphore (SemNumber, TaskNumber);
Inputs:
  SemNumber: Byte = The number of the semaphore to signal
  TaskNumber: Byte = The task number of the semaphore owner. −1 indicates the calling task.
Outputs: none
Function:
The routine operates on a simple semaphore. The semaphore count is incremented and checked. The routine returns immediately if the result is greater than 0. Otherwise, the task at the head of the semaphore's pending task queue is dequeued and then requeued on the ready queue. The routine then returns to the caller.
Cancel Conditions:
  Invalid Semaphore Use (the semaphore specified is a message semaphore)
  Invalid Task Reference (non-existent task specified)

Receive

Call: Receive (SemNumber, &MessagePointer);
Inputs:
  SemNumber: Byte = The number of the semaphore on which to wait for messages.
Outputs:
  MessagePointer: NodePtrType = The pointer to the 7th byte of the Message Node received.
Function:
The routine operates on a message buffer semaphore belonging to the calling task. Any events specified by the Event Mask are processed first. The semaphore count is decremented and checked. A message is extracted from the semaphore's pending message queue and the operation returns immediately if the new semaphore count is greater than or equal to 0. Otherwise, the semaphore's pending task pointer is set to point to the current task and another task is scheduled. When another task or an interrupt service routine issues a Send to the message semaphore, the waiting task will be revived. The Message Pointer points to the 7th byte of the actual Node (first 4 bytes are used as a Node Link and 4th and 5th bytes are used as the size of the Node.

These 6 bytes are used by the system and should not be touched by the application task).
Cancel Conditions: Invalid Semaphore Use (the semaphore specified in a simple semaphore)

Send

Call: Send (SemNumber, TaskNumber, MessagePointer);
Inputs:
 SemNumber: Byte = The number of the semaphore to which a message should be sent
 TaskNumber: Byte = The task number of the semaphore owner.
 MessagePointer: NodePtrType = The pointer to the 7th byte of the message Node to be sent
Outputs:
 None.
Function:
 This routine operates on a message buffer semaphore. The specified message is queued on the receiving semaphore's pending message queue according to its priority (as specified in the message header). Message priorities (as opposed to task priorities) go from 255 (highest) to 1 (lowest). After queueing the message, the semaphore count is incremented and checked. Send returns immediately if the result is greater than 0. Otherwise, the receiving task is queued on the ready queue, and the routine returns to the caller. The message pointer points to the 7th by of the Message Node to be sent (first 6 byte are used by the system and should not be touched by the application task).
Cancel Conditions:
 Invalid Semaphore Use (the semaphore specified is a simple semaphore)
 Invalid Task Reference (non-existent task specified)

Flushmessages

Call: FlushMessages (SemNumber);
Inputs:
 SemNumber: Byte = The number of a message semaphore owned to the caller.
Outputs: none
Function:
 This routine discards all messages on the specified semaphore's message queue by returning any such messages to the dynamic memory pool and then setting the count to zero. This routine should only be used in absolutely necessary, since important messages may be discarded. The senders of such messages are not notified that the messages were discarded.
Cancel Conditions: Invalid Semaphore Use (the semaphore specified is a simple semaphore)

SemaphoreCount

Call: Count: = SemaphoreCount (SemNumber, TaskNumber);
Inputs:
 SemNumber: Byte = The number of the semaphore to check.
 TaskNumber: Byte = The task number of the semaphore owner. −1 indicates the calling task.
Outputs:
 Count: Byte = The count field of the specified semaphore
Function:
 This function returns the count field of the specified semaphore. A positive count indicates an event has occurred or a resource or message is available. A count of zero indicates the event has not occurred. A negative count indicates the number of tasks waiting on the semaphore. The system processes events as specified in the Event Mask before accessing the count, to ensure it is up to date (since Event Handlers may issue Send or SignalSemaphore).
 This function can be used to receive a message if and only if one is available. For example:
 If SemaphoreCount (SemNumber, −1) is greater than 0 then Receive (SemNumber, MsgPtr);
Cancel Conditions: none

Dynamic Memory Pool Management

GetNode

Call: GetNode (NodeSize, &NodePtr, &Status);
Inputs:
 NodeSize: Integer = The size of the area needed. It must be between 2 and 32K. The 6 bytes overhead need by the system is added to this size before the node is actually allocated.
Outputs:
 NodePtr: NodePtrType = The pointer to the acquired node.
 Status: Integer = Zero means OK, otherwise, no more memory
Function:
 This routine allocates a node from the available system memory pool and returns it to the caller. The queue of available nodes is searched until one at least as large as the size requested is found. If the node is larger than requested, the extra bytes are returned to the available memory pool.
 GetNode and ReturnNode should not be used excessively. It is often possible to reuse already allocated nodes rather than to continually allocate and deallocated them.
Cancel Conditions: No More Memory (requested size unavailable)

ReturnNode

Call: ReturnNode (NodePtr);
Inputs:
 NodePtr: NodePtrType = The pointer to the acquired node.
Outputs: none
Function:
 This routine returns a node previously allocated via GetNode to the available memory pool. If possible, contiguous free nodes are combined into a bigger node.

GetMyNode

Call: GetMyNode (NodeSize, &NodePtr, &Status);
Inputs:
 Nodesize: Integer = The size of the area needed. It must be between 2 and 32K. The 6 bytes overhead need by the system is added to this size before the node is actually allocated.
Outputs:
 NodePtr: NodePtrType = The pointer to the acquired node.
 Status: Integer = Zero means OK, otherwise, no more memory
Function:
 This routine allocates a node from the task's own available memory pool and returns it to the caller. A task's own Node Space Pool is created when the task is started up. The queue of available nodes is searched until one at least as large as the size requested is found. If the node is larger than requested, the extra bytes are returned to the available memory pool.

GetMyNode and ReturnMyNode should not be used excessively. It is often possible to reuse already allocated nodes rather than to continually allocate and deallocated them.

One thing user has to keep in mind that the Nodes request through GETMYNODE routine are coming from the task's own Node Space Pool which will be returned as a whole Node to the System Node Pool upon the exit of the task. Any outstanding Node that is not return to the task's own Node Space Pool at this time will cause system problems. If there is a need use some Nodes after task exits, these Nodes should be requested from the System Node Pool (through GETNODE) instead of the task's own Node Space Pool.

Cancel Conditions: No More Memory (requested size unavailable)

ReturnMyNode

Call: ReturnMyNode (NodePtr);
Inputs:
  NodePtr: NodePtrType=The pointer to the 7th byte of the node.
Outputs: none
Function:

This routine returns a node previously allocated via GetMyNode to the task's own available memory pool. If possible, contiguous free nodes a combined into a bigger node. Please notes that a task should not return node which is not getting from its own Node Space Pool. When a task's one Node is used as a message sent to the other task, it should expect the same Node be returned by the other task as a acknowledge message. Then the Node can be return to the same task's own Node Space Pool if it is larger needed.

Dynamic Task Management

StartTask

Call: StartTask (NewTask, TaskNumber, InitPriority, DefaultPriority, &Status);
Inputs:
  NewTask: procedure with parameter VAR Tcb: TcbType=The main procedure of the task to be started.
  TaskNumber: Byte=The number of the new task.
  InitPriority: Byte=The initial priority of the new task.
  DefaultPriority: Byte=The default priority of the new task. The new task should issue SetPriority (0) after its initialization sequence to lower its priority to the default.
Outputs: Status: 0 for no error, otherwise return error codes to indicates either invalid task reference or no more memory.
Function:

This routine creates a task by allocating its TCB, own Node Space Pool and stack from the dynamic system memory pool and queueing the new task on the ready queue.

In the 1107 environment, StartTask is called only by the System/Loader Task and should not be called by any application task. The application task request the loading of another task through a request message to the System/Loader task and the same message will be returned by the System/Loader Task to inform the results of the operation. The format of the Node should be as follows:

NextNodeLink (4 bytes): link to next node, used by the system only.
NodeSize (2 bytes): total size of the message node, used by the system only.
MessagePriority (1 bytes): Priority of the message, should be set to 128 by the application task. Remember that this entry is address returned to the user task by the GETNODE or GETMYNODE primitives.
TaskNumber (1 bytes): Sender task number, set by the application task.
SemaphoreNumber (1 bytes): Semaphore number the application task to reive the acknowledge message from, set by the application task.
NodeId(1 bytes): NodeId to tell the System/Loader Task that this is a task loading request, should be set to 2 by the application task. When the message is returned, this NodeId will be set to 0 to indicating task loading is successful, 1 if file not found, 2 if no more memory available.
NameStringPtr(4 bytes): Pointer to the name string of the RUN file module to be loaded. The name string should following the legal name string convention of a RUN file defined in the FMS.

Cancel Conditions: Invalid Task (the task specified already exists)

EndTask

Call: (return from main procedure)
Inputs, Outputs: none
Function:

This routine is activated when a task's main procedure returns. The TCB status is marked as 'ended', and a message is sent to the System/Loader Task, which in turn issues DestroyTask to deallocate the TCB, task's own Node Space Pool and stack.

Cancel Conditions: none

SetVector

Call: SetVector(InterruptType, InterruptServiceEntry)
Input:
  Interrupt Type: Interrupt type number where the vector resides (0-FFH).
  InterruptServiceEntry: 4 bytes entry address of the interrupt service routine.
Outputs: none
Function:

This routine is called when the user task wants to set the Interrupt servide routine of its own.

Cancel Conditions: none

Set8274Adr

Call: Set8274Adr(InterruptIndex, InterruptServiceEntry)
Input:
  InterruptIndex: Interrupt index number corresponding to the 0 to 7 interrupts of the 8274 chip. (0-7).
  InterruptServiceEntry: 4 bytes entry address of the interrupt service routine.
Outputs: none
Function:

This routine is called when the user task wants to set one of the eight Interrupt service routines corresponding to the 8 interrupts of the 8274 chip. 0-3 is for A port, 4-7 is for B port.

The user provided interrupt service routine is called by the system Interrupts are disabled and all the registers are saved before the call User interrupt service routines should execute a long return when ended.

User routine should not exceed 250 us. This is the time required by the floppy driver to send out TC signal to the floppy drive when a DMA complete interrupt comes in. When user routine returns, the system will restore all the registers and reenable interrupts again.
Cancel Conditions: none

Interval Timer Support

SetTimer

Call: SetTimer (SemNumber, TimeDelay, ReturnNodeId, &Status);
Inputs:
  SemNumber: Byte=The number of the message semaphore to which the timer expiration message should be sent.
  TimeDelay: Integer=The time period in milliseconds. 0 may be specified to cancel a previous timer request.
  ReturnNodeId: Byte=The node ID to be filled into the timer expiration message.
Outputs:
  Status: Integer=Zero means OK, otherwise, No more memory.
Function:
  This routine sets a timer for the calling task. All timer requests are put on a system timer queue. The first such request from any task will activate the system timer. At each timer interrupt, an OS-maintained system clock is incremented and the timer queue is examined. If a user task timer has expired, the Timer Event Handler is activated to send a message to the specified message semaphore. This message will contain the specified ReturnNodeId for identification.

A TimeDelay of 0 may be specified to cancel a previous timer request. This will cause any timer request from the calling task with the specified ReturnNodeId to be taken off the timer queue. To cancel all timer requests from the calling task, specify 0ffh as the ReturnNodeId. Note that it is not possible to cancel a timer that has already expired; ie., a timer expiration message may still be received.

One important thing to remember is that when you get your Message Node from the system indicating timeout situation, this Message Node is taken out from the System Memory Pool, so, a RETURNNODE (not RETURNMYNODE) primitive call is needed to return such a Node to the System Memory Pool.
Cancel Conditions: none

1107-Specific Facilities

Cancel Conditions: none

Cancel

Call: Cancel;
Inputs: No direct inputs. A one-byte code explaining the fatal error should be stored in the Status field in the task's TCB before issuing this call. A list of status codes can be found in Appendix B.
Outputs: none
Function:
  This routine is called by 1107/OS whenever a task-related fatal error is encountered. A programming error is usually indicated. 80 h is added to the Status code in the TCB. Then the calling task is crashed. This means that it is put on a special crash queue and never again rescheduled. All resources owned by the task are left as is; they are not released.

OS primitives Update

We are providing some new primitives.
1. GetTaskNo: which will retuen the task number at run time by passing the task name string as the input.
Call: GetTaskNo(&TaskNo,&Taskname)
  You can find out your own task number or any other's task number using this primitive call. If the number returned is 0FFH (225), that means the task is not existing.
2. GetTime
Call: GetTime(&Time);

Input:
  Time: Address to receive 12 bytes ascii number as HH:MM:SS[ AM] formatted as indicated in the [ PM] configuration file.
  [    ]

Output: 12 bytes ascii time returned in the input pointer.

Function:
  This routine is to get Hour, Minute, Second and Hundred of second from primary time, then convert to ascii number and store in the input pointer with the following format:
  HH:MM:SS[ AM]
  [ PM]
  [    ]

3. GetDate
Call: GetDate(&Date);
Input: Date: Address to receive 12 bytes ascii number as XX:XX:XX:XX: formated according to the configuration filed
Output: 12 bytes ascii number of century, year, month and day were put in the input pointer.
Function:
  This routine is to retrieve primary date then convert to ascii number and stored in the input pointer with the following format: XX:XX:XX:XX: formated according to the confifuratin file 4. GetDatTim Call: GetDatTim(&DateTime);
Input: DateTime: Address to receive 8 bytes primary date & time.
Output: return 8 bytes of primary date and time to input pointer.
Function:
  Retrieve binary primary date and time and return. Sequence of datas are Century Year Month Day Hour Minute Second Hundred Second.
5. SetTime
Call: SetTime(&Time)
Input: Time: Address of time which contains 12 bytes of ascii number. The format refers to GetTime.
Output: None
Function:
  This routine is update the system time which passed from user.
6. SetDate
Call: SetDate(&Date);
Input: Date: Address of the 12 bytes ascii date. The format refers to GetDate.

Output: None
Function:
This routine is to update system date. Input datas format refer to GetDate.

7. SetDatTim
Call: SetDatTim(&DateTime);
Input: DateTime: Address of 8 bytes binary date and time. The format refers to GetDatTim.
Output: None
Function:
This routine is to update system date and time based on passed binary datas. The format of datas refer to GetDatTim.

8. SmallSend
Call: SmallSend_(SemNumber,TaskNumber: Byte; Msgptr: NodePtr; &Status: word)
Input:
SemNumber: Byte—The number of semaphore to which a message should be sent.
TaskNumber: Byte—The task number of the semaphore owner.
MsgPtr: word—Content of message pointer which the message will be sent.
Output: Status: Integer—Address to receive status. =0 means OK, otherwise error.
Function:
This routine is to be called from small mode user to send message to the requested task.

9. SmallReceive
Call: SmallReceive(SemNumber,&MsgPtr);
Input:
SemNumber: Byte—The number of semaphore from which a message should be received.
&MsgPtr: NodePtr—Address of msgptr variable which the message will be received.
Output: None
Function:
This routine is to be called from small mode user to receive cessage from other task.

10. SetTaskNo
Call: SetTaskNo(VsNo,TaskNo)
Input: VsNo: Word—Virtual screen number.
TaskNo: Word—Task number.
Output: this function returns the TaskNo current associated with the VsNo.
Function: this call is used to redirect your keyboard input from the old task number, which associated with the VsNo specified as argument 1, to the new task number specified as the argument 2. Through this call, the Virtual Screen created by one task can be passed to another task totally without having the problem that the keyboard input is still directed to the old task. The old task number is returned, as the function value, to you in case you want to redirect the keyboard input back to the old task.

11. FlushMyMessages
Call: FlushMyMessages(SemNo)
Input: SemNo: Word—Semaphore number
Output: None
Function: this call is used by the application task which queues messages using Nodes in its own Node space instead of the System Node space. This call will invoke ReturnMyNode to flush all the messages instead of ReturnNode.

APPENDIX B-MEMORY MANAGER

Dynamic Memory Pool Management

GetNode

Call: GetNode (NodeSize, &NodePtr, &Status);
Inputs:
NodeSize: Integer=The size of the area needed. It must be between 2 and 32K. The 6 bytes overhead need by the system is added to this size before the node is actually allocated.
Outputs:
NodePtr: NodePtrType=The pointer to the acquired node.
Status: Integer=Zero means OK, otherwise, no more memory.
Function:
This routine allocates a node from the available system memory pool and returns it to the caller. The queue of available nodes is searched until one at least as large as the size requested is found. If the node is larger than requested, the extra bytes are returned to the available memory pool.

GetNode and ReturnNode should not be used excessively. It is often possible to reuse already allocated nodes rather than to continually allocate and deallocate them.
Cancel Conditions: No More Memory (requested size unavailable)

ReturnNode

Call: ReturnNode (NodePtr);
Inputs:
NodePtr: NodePtrType=The pointer to the acquired node.
Outputs: none
Function:
This routine returns a node previously allocated via GetNode to the available memory pool. If possible, contiguous free nodes are combined into a bigger node.
Cancel Conditions: none

GetMyNode

Call: GetMyNode (NodeSize, &NodePtr, &Status);
Inputs:
NodeSize: Integer=The size of the area needed. It must be between 2 and 32K. The 6 bytes overhead need by the system is added to this size before the node is actually allocated.
Outputs:
NodePtr: NodePtrType=The pointer to the acquired node.
Status: Integer=Zero means OK, otherwise, no more memory.
Function:
This routine allocates a node from the task's own available memory pool and returns it to the caller. A task's own Node Space Pool is created when the task is started up. The queue of available nodes is searched until one at least as large as the size requested is found. If the node is larger than requested, the extra bytes are returned to the available memory pool.

GetMyNode and ReturnMyNode should not be used excessively. It is often possible to reuse already allocated nodes rather than to continually allocate and deallocated them.

One thing user has to keep in mind that the Nodes request through GETMYNODE routine are coming from the task's own Node Space Pool which will be returned as a whole Node to the System Node Pool upon the exit of the task. Any outstanding Node that is not return to the task's own Node Space Pool at this time will cause system problems. If there is a need to use some Nodes after task exits, these Nodes should be requested from the System Node Pool (through GET-NODE) instead of the task's own Node Space Pool.
Cancel Conditions: No More Memory (requested size unavailable)

ReturnMyNode

Call: ReturnMyNode (NodePtr);
Inputs:
   NodePtr: NodePtrType=The pointer to the 7th byte of the node.
Outputs: none
Function:
   This routine returns a node previously allocated via GetMyNode to the task's own available memory pool. If possible, contiguous free nodes are combined into a bigger node. Please notes that a task should not return a node which is not getting from its own Node Space Pool. When a task's own Node is used as a message sent to the other task, it should expect the same Node be returned by the other task as a acknowledge message. Then the Node can be return to the same task's own Node Space Pool if it is no longer needed.

APPENDIX C-DOCUMENT DATA STRUCTURE

DATA STRUCTURES

2.0 WP Data Structures

Data Structures are described as they exist in memory and on disk. Memory structures contain transient data, e.g. the displayable form of the document page or menu being processed. Disk Structures contain the permanent form of documents and menus.

2.1 Memory Data Structures

1107 WP components communicate through memory data structures. Data exists in blocks allocated by Memory Management (GetNode), linked together to reflect data relationships. The general block structure and linking conventions are shown in Figure 2.1.1.

The Page Descriptor (Figure 2.1.2) defines data as it is to be displayed. A page is a two-dimensional structure representing either a document page or a rectangular portion of the screen. All data, including status and error messages, screen titles, menus, etc. are represented by Page Descriptors. The Page Block contains information about the page as a whole, and links to blocks describing the division of the page into areas.

Dividing pages into areas provides a mechanism for organizing text into columns, placing pictures on the page with accompanying text, etc. The division is accomplished by successive horizontal and vertical cuts, so that there are no overlapping areas and no holes. Area Blocks are maintained in a sequence determined by the (X,Y) coordinates of the top left corner.

Area Blocks link to blocks containing the Text, Graphic, and/or Image data for the area. Each of these exists in a separate 'layer', and layers are overlaid to form the complete area contents.

The Text Descriptor (Figure 2.1.3) contains the text portion of a page area. The Column Block contains one entry per line, each pointing to a Line Block. The Line Block contains a number of text strings, each of which has a header describing screen-related attributes (pitch, underlining, etc.), non-screen-related attributes (Merge fields, Index fields, etc.), and references to text outside the main document flow (format lines, headers, footers, notes, etc.).

The Graphic Descriptor (Figure 2.1.4) describes the graphic portion of an area in terms of coordinates and shape/style primitives. It is a tree structure where a node block contains a list of its offspring, each either describing a shape contributing to the shape represented by the block as a whole or pointing to another node block for further breakdown of the graphic.

The Font Descriptor (Figure 2.1.6) describes the fonts for each of the alphabets supported. It contains the dimensions and configuration of each character in each Alphabet for each pitch and scale.

DATA STRUCTURES

2.2 Document Structure

The v4 Document structure will be used. This section contains notes on how some 1107-specific features will be represented.

1. Numeric Columns

In memory, a Numeric Column is introduced in the Format Line with Align instead of Indent. The Document Manager performs the conversion and also determines the type of alignment from the Format Line contents and sets the Horizontal Table Parameter accordingly.

DATA STRUCTURES
Figure 2.1.1: LINKED STRUCTURE CONVENTIONS

| Type + Blocksize | |
|---|---|
| 0000 | HEAD block shared between painter and screen manager. |
| 0001 | SCREEN descriptor block. |
| 0000 | VIRTUAL SCREEN descriptor block - vertical divisions. |
| 0001 | VIRTUAL SCREEN descriptor block - horizontal divisions. |
| 0010 | PAGE block - head block of each page. |
| 0011 | PATHS block. |
| 0100 | AREA block |
| 0101 | LAYER block. |
| 0110 | Text COLUMN block. |
| 0111 | Text LINE block. |
| 1000 | Reserved |
| 1001 | Reserved |
| 1010 | Graphic layer ROOT block. |
| 1011 | Graphic DATA block. |
| 1100 | Reserved for Ideographic text. |
| 1101 | Reserved for Ideographic text. |
| 1110 | Reserved. |
| 1111 | Reserved. |
| ....xxxxxxxxxxxx | Blocksize in 2-byte units (1..4095) |

DATA STRUCTURES
FIG. 2.1.2: PAGE DESCRIPTOR

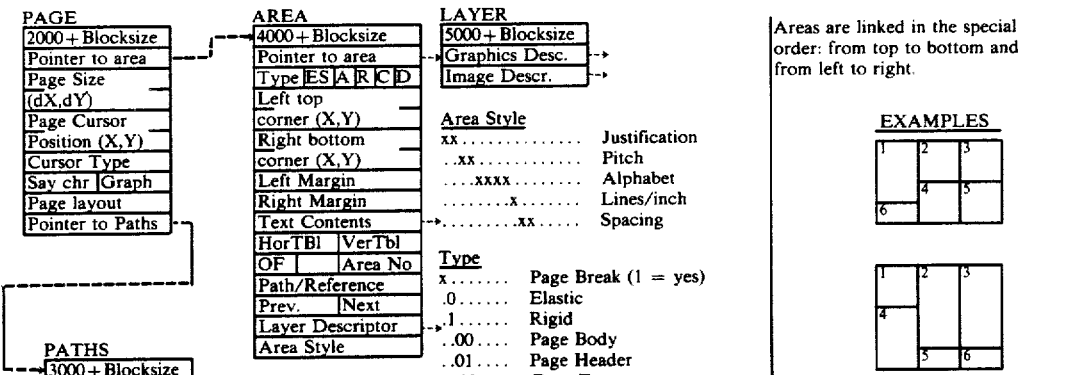

```
PAGE                    AREA                    LAYER
2000+Blocksize          4000+Blocksize          5000+Blocksize
Pointer to area         Pointer to area         Graphics Desc.  →
Page Size               Type|ES|A|R|C|D         Image Descr.    →
(dX,dY)                 Left top
Page Cursor             corner (X,Y)            Area Style
Position (X,Y)          Right bottom            xx..............  Justification
Cursor Type             corner (X,Y)            ..xx............  Pitch
Say chr |Graph          Left Margin             ....xxxx........  Alphabet
Page layout             Right Margin            ........x.......  Lines/inch
Pointer to Paths        Text Contents           →.........xx.....  Spacing
                        HorTbl   |VerTbl
                        OF       |Area No       Type
                        Path/Reference          x.......  Page Break (1 = yes)
                        Prev.    |Next          .0......  Elastic
                        Layer Descriptor    →   ..1.....  Rigid
PATHS                   Area Style              ..00....  Page Body
3000+Blocksize                                  ..01....  Page Header
Number of paths         A: 1 = Area added       ..10....  Page Footer
Path number             R: 1 = Area removed     ..11....  Footnotes
Path number             C: 1 = Area changed     ....0...  Floating top edge
..........              D: 1 = Dummy Area       ....1...  Fixed top edge
                                                .....0..  Breakable
                                                .....1..  Unbreakable
                                                ......0.  Intentional top edge
                                                ......1.  Nonintentional top edge
                                                .......0  Visible area
                                                .......1  Invisible area
```

Areas are linked in the special order: from top to bottom and from left to right.

Page Layout

| | |
|---|---|
| .......xxxxxxxx | Number of areas on the page (default – 1) |
| 0............... | Page with wrapped text (default) |
| 1............... | Page w/o wrapped text |
| .0.............. | Page with unused areas (default) |
| .1.............. | Page w/o unused areas |
| ..1............. | Overflowed page |
| ..0............. | Nonoverflowed page (default) |
| ...1............ | Page was edited after last pagination |
| ...0............ | Page wasn't edited . . . (default) |
| ....1........... | "Hard" (required) page break |
| ....0........... | "Soft" page break (default) |
| .....0.......... | Portrait (default) |
| .....1.......... | Landscape |
| ......0......... | Paint standard size (default) |
| ......1......... | Paint ½ size |
| .......0........ | Te xt Page |
| .......1........ | Format Page |

ES—Edge specifications

1xxx - top edge of area can be moved up and down together with top edge of left neighbor only
0xxx - top edge of area can be moved up and down independently of top edge of left neighbor
x1xx - top edge of area can be moved up and down together with top edge of right neighbor only
x0xx - top edge of area can be moved up and down independently of top edge of right neighbor
xx1x - bottom edge of area can be moved up and down together with bottom edge of left neighbor only
xx0x - bottom edge of area can be moved up and down independently of bottom edge of left neighbor
xxx1 - bottom edge of area can be moved up and down together with bottom edge of right neighbor only
xxx0 - bottom edge of area can be moved up and down independently of bottom edge of right neighbor

Text Contents

Pointer to Text Descriptor

Margins: Width (dX)

OF—Overflow
(for wrapped text areas)
10 - text overflow in the area
00 - text fitted in the area
01 - free space in area
11 - unknown

HorTbl - Horizontal table parameters

| | |
|---|---|
| xxxx.... | L—left, M—middle, R—right |
| ....xxxx | 0100: Numeric Column, left aligned |
| | 0101: Numeric Column, right aligned |
| | 0110: Numeric Column, decimal aligned |
| | 0111: Numeric Column, comma aligned |
| | 0110: Numeric Column, decimal aligned |

VerTbl - Vertical table parameters

H—header, T—top, M—middle,
B—bottom, S—single, C—clmn header

Area No.: in area link order

Path number

−1 - graphic, free text, etc
0 - default path for all nonassigned by user wrapped text areas (no text flows between these areas)
1:M - Logical paths for wrapped text through whole document Prev, area & Next area - path sequence (area numbers)

−1.(11 . . . 1) - out of range

0 - start or end of a path

DATA STRUCTURES

FIG. 2.1.3: TEXT DESCRIPTOR

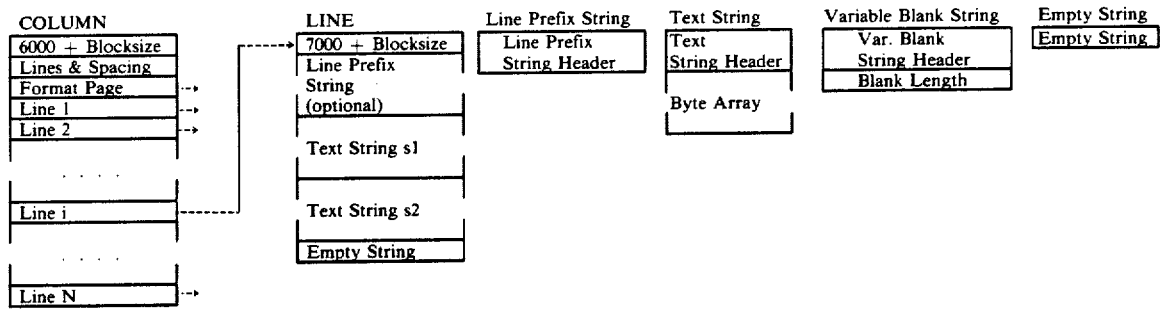

| | String Header (1-n words long) | | | |
|---|---|---|---|---|
| Lines & Spacing | x............... | ............... | ............... | Second Attribute Word follows |
| | .x.............. | ............... | ............... | Variable Blank |
| | ..00............ | ............... | ............... | Proportional Spacing |
| xxxxxxxx........ Lines in Column | ..01............ | ............... | ............... | 1/10 inch (10 pitch) |
| ........xxxxxxxx Vertical spacing | ..10............ | ............... | ............... | 1/12 inch (12 pitch) |
| (x .01 in) | ..11............ | ............... | ............... | 1/15 inch (15 pitch) |
| | ....xxxx........ | ............... | ............... | Text Style |
| | ........xxxxxxxx | ............... | ............... | String Length (bytes) |
| TEXT | ............... | x............... | ............... | Third Attribute Word follows |
| 1 | ............... | .x.............. | ............... | Subscript |
| 2 | ............... | ..x............. | ............... | Superscript |
| | ............... | ...x............ | ............... | Double height |
| | ............... | ....x........... | ............... | Double width |
| | ............... | .....x.......... | ............... | Bold |
| i  prefix  s1  s2 | ............... | ......x......... | ............... | Italic |
| | ............... | .......x........ | ............... | Underscore |
| | ............... | ........x....... | ............... | Double Underscore |
| N | ............... | .........x...... | ............... | Strikethrough |
| | ............... | ..........x..... | ............... | Highlight |
| | ............... | ...........x.... | ............... | Non-Display Attribute |
| | ............... | ............xxx. | ............... | Reserved (= 0) |
| | ............... | ...............x | ............... | Reverse Video |
| | ............... | ............... | x............... | More Attribute Word(s) follow |
| Menu Peon Attributes | ............... | ............... | .xxx............ | Attribute Type (words are ordered by type) |
| | ............... | ............... | .000............ | Formatter Attribute |
| 0010000000000: Display Field | ............... | ............... | .001............ | Menu Peon Attribute |
| 00100000000001: Edit Field | ............... | ............... | .010............ | Forms Attribute |
| 00100000000010: Pick 1 Field | ............... | ............... | .011............ | Footnote Attribute |
| 00100000000011: Pick n Field | ............... | ............... | ....xxxxxxxxxxxx | Attribute (depending on type) |
| | Line Prefix String | | | |
| | 1000000000000000 | 1000000000000000 | .000xxxxxxxxxxxx | String Length = 0, Formatter Attributes |
| Blank Length | Variable Blank String | | | |
| | .1......00000010 | ............... | ............... | String Length = 2, Variable Blank, Attributes |
| xxxxxxxxxxxxxxxx ( x .01 in.) | Empty String | | | String Length = 0, no |
| | 0000000000000000 | | | attributes |

DATA STRUCTURES
FIG. 2.1.4: GRAPHIC DESCRIPTOR

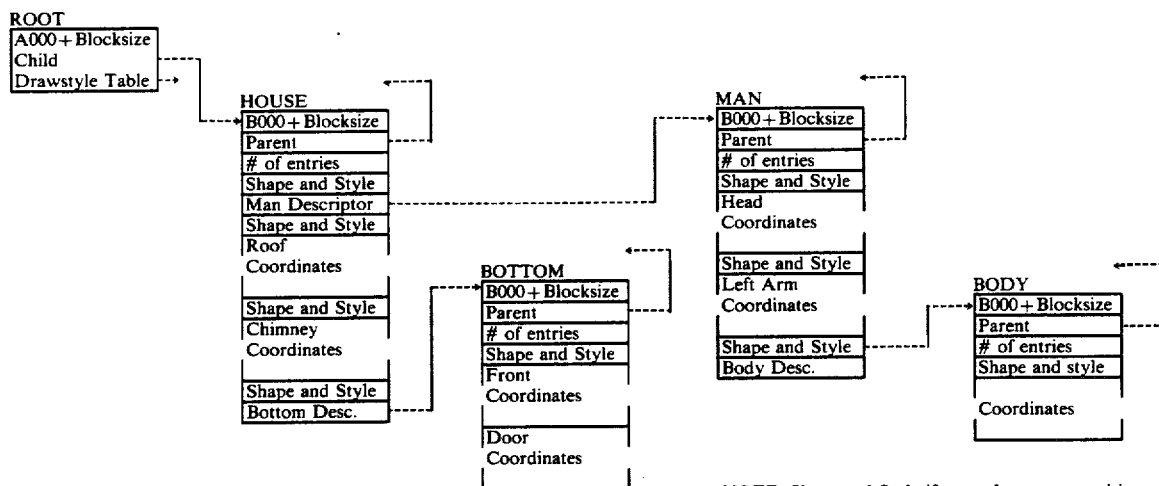

Shape and Style

| | | | |
|---|---|---|---|
| 0001.....0000010 | Rectangle | (Coordinates are position X,Y size dX,dY) |
| 0010.....0000010 | Circle | (Coordinates are center X,Y radius dX,0) |
| 0011.....xxxxxxx | Polygon | (Coordinates are 3 ... 127 vertices X,Y) |
| 0100.....xxxxxxx | Polyline | (Coordinates are 1 ... 127 line segments, start X,Y stop dX,dY) |
| 0101.....0000011 | Arc | (Coordinates are center X,Y start X,Y stop X,Y) |
| 0110.....0000100 | Pie Slice | (Coordinates are center X,Y start X,Y stop X,Y pie tip X,Y) |
| 0111.....0000011 | Chord | (Coordinates are center X,Y start X,Y stop X,Y) |
| ....xxxxx....... | | Drawstyle table index (0 ... 32) |
| .........xxxxxxx | | Coordinate list length (2 ... 127 coordinate pairs) |

Drawstyle Table Entry

| | | |
|---|---|---|
| xxxx............ | ................ | Reserved for Line color index |
| ....xxxx........ | ................ | Reserved for Interior color index |
| ................ | xxxx............ | Line width in pixels (0 ... 15) |
| ................ | ....0.......- | Line overwrites what it covers |
| ................ | ..... | Line complements what it covers |
| ................ | ....1.......... | Line style is invisible |
| ................ | .....000....... | Line style is solid |
| ................ | .....001....... | Line style is dashed with pattern index (2 ... 4) |
| ................ | ....xxx........ | Interior style is hollow |
| ................ | ..........00000 | Interior style is solid |
| ................ | ..........00001 | Interior style is hatch pattern with index (2 ... 31) |
| ................ | ..........xxxxx | |

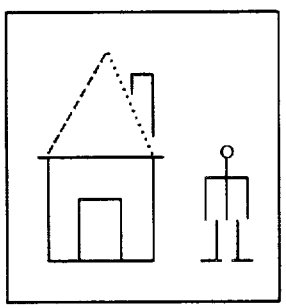

DATA STRUCTURES
FIG. 2.1.5: FONT DESCRIPTOR

ALPHABET INDEX
| Latin Alpha |
| Latin Common |
| Greek Alpha |
| Greek Common |
| Cyrillic Alpha |
| Cyrillic Common |
| Katakana Alpha |
| Katakana Common |
| Hebrew Alpha |
| Hebrew Common |
| Arabic Alpha |
| Arabic Common |
| WISCII 00 ... 7F |
| WISCII 80 ... FF |

Support of different typefaces would result in more SIZE INDEX

SIZE INDEX
| 10 Pitch |
| 12 Pitch |
| 15 Pitch |
| PS |
| Stroke |
| 10Pdim. | 12Pdim. |
| 15Pdim. | PS dim. |

Font dimensions
Maximum Y and dY values for each supported alphabet and pitch for 100ppi.
xxxx.... Ypixels
....xxx. dYpixels Character Code Conventions (except WISCII)

00 ... 7F  Common Set
80 ... EF  Alphabetic Characters

SCALE INDEX
| 100 Pixels/Inch |
| 50 Pixels/Inch |

Support of printer fonts would result in more SCALE INDEX entries.

FONT INDEX
| .... |
| Character 1 |
| .... |

FONT
| Char Dimensions |
| Font Storage |

Char Dimensions
xxxx............
....xxxx........  Y pixels

NOTE: Shape and Style if zero, then next word is a pointer to the next set of graphic primitives.

-continued
DATA STRUCTURES
FIG. 2.1.5: FONT DESCRIPTOR

| entries | F0...FF | Diacritics for Alphabetic Chars | ......xx...... | dX pixels (integer part) |
| | | | .........xxx... | dX pixels (fraction part) |
| | | | ............xxx | dY pixels |

High-Performance Painter Font Storage

Font Storage is Y bit strings of length X packed into memory without regard to word alignment.

Low-Performance Painter Font Storage

Font Storage is Y bytes or words.
If X > 8 then storage is in words.
Otherwise it is in bytes.

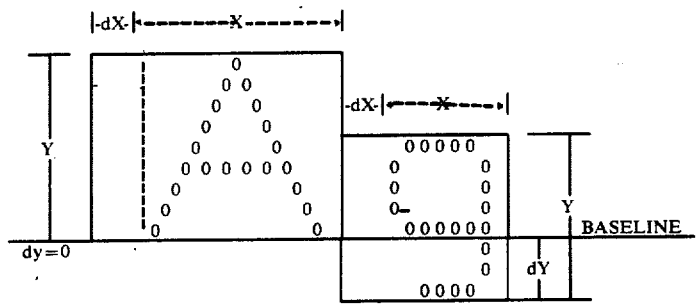

APPENDIX D-FILE MANAGEMENT SYSTEM

3.1 Introduction

The File Management System (FMS) is the 1107 system facility responsible for processing 1107 files. With the exception of the screen, all devices (including the keyboard, disks, printers, and telecommunications facilities) that are associated with the 1107 are treated by the operating system as files. The FMS provides a means to process both application files and devices on the 1107.

Because the FMS must be flexible in order to accomodate the different types of 1107 (application and device) files, it is designed to be able to process both delimited records and stream records. In this case, a delimited record is defined as being a record whose length is set by a delimiter. A stream record is defined as a record whose length is determined by the calling application.

NOTE:

The 1107 FMS does not include attach/mount facilities and type configuration for system devices (e.g. printers) and volumes (e.g. diskettes); this is more properly handled by a general configuration facility, which will be described in a separate chapter. Device configuration information is maintained within a separate CONFIG file on the 1107 system disk; a copy of the information in this file is placed in memory at IPL-time, so that FMS need not read the system disk each time a file is opened in order to determine where various physical/logical devices are.

3.2 FMS CLASSES

The FMS is composed of a number of routines, or primitives, that can be divided into two classes: File Access Routines and VTOC (Volume Table of Contents) Access Routines. File access routines can be used with all file types (with exceptions noted later in this chapter). VTOC access routines are used only for files on structured devices, such as diskettes.

FMS file access routines permit read/write access to 1107 file data. Files on the 1107 may be treated as stream files, which consist of a static or dynamic string of characters, or record files, which consist of delimited records of variable length. Prefixed variable length records are not supported on the 1107.

FMS VTOC access routines permit examination and update of the VTOC of an 1107 disk(ette).

Specific file access routines and VTOC access routines are described in detail later in this chapter.

3.3 FILE PROCESSING ON THE 1107

Because of the presence of different device types on the 1107 (each of which may be accessed in a completely different way) the FMS provides several options for processing a file when it is opened. This section describes these different options.

3.3.1 Open Mode

The open modes available on the 1107 are Read-Only, Read/Write, and Write-Only. The three open modes may be speicified for New and Old files.

The three open modes determine the operations that may be done on a file. They also are used to limit or allow simultaneous opens by two or more tasks. For example, multiple users may open the same file only if each has the file open in Read-Only mode. (Note that future extensions will support Shared files, an alternative to New/Old/Work, which will allow more general multi-user access to the same file.)

3.3.2 File Organization

In general, files on the 1107 are not bound by "file type" information (although such information is provided on an application-dependent attribute basis in the VTOC, to be used as a "guideline" in processing files). This means that the way a file is to be accessed must be specified at open-time. Following is a list of different ways that a file may be accessed.

3.3.2.1 Sequential Fixed-Length

Use the sequential fixed-length file organization typically only for disk files (although it may also be used for other devices). If this type of file organization is used, the user must supply a record size, which will be assumed for all subsequent reads and writes to the file.

Note that fixed-length record access is not available in the first FMS release. However, it may be available in a future release, and is noted here for completeness only.

3.3.2.2 Sequential Delimited

Use the sequential delimited file organization for files containing delimited records, such as text files (disk/printer) or TC files. For files of this type, the user must supply a maximum record size, which will be assumed for all subsequent reads and writes. The record size that is specified must also include the delimiter itself, which will always be appended to any record read from or written to the file.

Note that the (maximum) size of the user's read/write record cannot be changed with each read and write, although a shorter record area may be supplied if the application knows that a shorter record is coming up (but the FMS won't check for this!).

3.3.2.3 Stream

A stream file is a generalized form of a fixed-length file. It logically consists of a string of individual characters (i.e., single byte records, one or more of which may be read/written in each request to FMS).

Use this type of file organization for keyboards and TC devices. It can also be used for any file when unstructured byte-level access is desired. Since stream files are byte oriented, record size is not required by OPEN, but is required for subsequent read/write requests.

3.3.2.4 Other File Processing Options

In addition to the access mode and file organization options already described, several other options are available at open-time. Following are two additional file processing options that can also be used. Note that both of these options are for disk files only, and are ignored for other types of (device) files.

AutoDelete/AutoCreate Option

When opening a new or work file, use the autodelete/autocreate option to automatically delete and then recreate the file if it already exists (i.e., mode=new or work). When opening an old or shared file, use this option to automatically create the file if it does not already exist (i.e., mode=old or shared—when implemented). In either case, a returned error code will then be avoided.

Physical I/O Option

File processing in the FMS is normally done using an intermediate buffer. The intermediate buffer is supplied by the application and is controlled by the FMS and/or the associated device drivers. The intermediate buffer is used to manipulate the data that is to be passed to the application.

In the special case of disk files (or DEVICE's) that are opened for stream access and for requesting records which are block-aligned, the physical I/O option allows direct I/O to and/or from the application record, instead of through the intermediate buffer.

Use of the physical I/O option has two major advantages:
1—elimination of the buffer improves performance and frees data space to be used for other activities
2—use of physical I/O permits the application to have 2 or more I/O operations pending (i.e., No-Wait) at the same time, which is not the case when using standard disk I/O. (This is discussed further in the NoWait option later in this chapter.)

3.3.3 Buffering

The buffering scheme that is used in the 1107 requires that the user supply any buffers that may be needed for processing (except in the case of physical I/O). This eliminates the problem of the FMS having to allocate excessive space for all the files to be opened. At the same time, it also gives the application a certain amount of buffering control without actually having to do all the internal buffer processing.

When a file is opened in standard (record I/O) mode, a buffer pointer and buffer size (in bytes) must be provided by the caller. It need not be supplied, and will always be ignored, if the physical I/O option flag is set, In all cases, the user program should never access the buffer directly, since its contents are known only to FMS and/or the corresponding device driver at any given time.

3.3.3.1 Buffer Size Requirements

The buffer that is supplied by the application must be of a certain minimum size, depending upon the record size and type specified at open-time (or, for stream files, at read-time). There are two rules which must be observed for allocation of buffer size. These are:
1. The buffer allocated to a file must be large enough to accomodate, at any one time, a single record of the specified type, including any allowance for (disk) block-spanning.
2. In addition to the above rule, disk files (or DEVICEs) have the additional restriction that the buffer size be a multiple of 512, rounded up from computation (1) if necessary.

3.3.3.1 Buffer Size Requirements (Cont.)

Implementation of these rules avoids the need for the FMS to perform two or more separate I/O's, thus requiring it to empty the buffer in between, to complete a single function request. If the FMS were required to do this, it would cause problems with applications performing "nowait" read/write requests. (Note that physical I/O, on the other hand, has no such problems since the application does all of the required buffer coordination.)

There are two types of files to consider when allocating buffer size. These are:

Disk files—the required buffer size is computed as 1+BUF, where BUF is the nearest multiple of 512 greater than or equal to the specified record size. Note that this computation allows for block spanning, even if the application does not require it. (For full-block I/O, use of physical I/O is rcommended.)

Non-disk files (such as the keyboard, a printer, etc.)—the required buffer size must be at least as large as any single record. (Note that any future exceptions to this rule will be documented for specific device types, such as tapes, TC, etc.).

3.3.4 File Control Block Structure

All file access subroutines take as input an 128-byte File Control Block (FCB). The FCB is structured as shown in Figure 3-1

| \multicolumn{3}{l}{FIG. 3-1. File Control Block Structure} |||
|---|---|---|
| Byte (s) | Type | Contents |
| 1-4 | addr | Namestring pointer (OPEN) |

-continued

| FIG. 3-1. File Control Block Structure | | |
|---|---|---|
| Byte (s) | Type | Contents |
| 5 | byte | File status flag byte (must be zero before OPEN): X'80' = File is open (reset at CLOSE-time) other bits reserved for use by FMS |
| 6 | byte | Return code from FMS function |
| 7 | byte | Error code from FMS function |
| 8 | byte | Reserved (must be 0) |
| 9–12 | addr | Buffer Area address (to be used internally by FMS) |
| 13–16 | long | Buffer size in bytes (0 if no buffer to be used) |
| 17–20 | addr | Record Area address (Read/Write) |
| 21–24 | long | Requested record size in bytes (Open/Read/Write) |
| 25–28 | long | Actual record size in bytes (Read/Write) |
| 29–32 | long | Relative/Absolute record or byte number (used for Point/Read/Write operations) |
| 33 | byte | Open mode: X'01' = read-only X'02' = write-only - low nibble X'03' = read/write X'10' = old file X'20' = new file -- high nibble X'30' = work file (not implemented) X'40' = shared file (not implemented) |
| 34 | byte | File type: X'00' = sequential fixed-length (not yet implemented) X'01' = sequential delimited X'02' = stream (character) |
| 35 | byte | Open Options: X'80' = AutoDelete/-AutoCreate X'40' = Physical I/O (disk only) X'20' = EOF-enable (non-disk only) |
| 36 | byte | I/O Options: X'80' = NoWait option (Read/Write) X'60' = Point flags (Read/Write) (see next page for interpretation) X'08' = Priority Request flag |
| 37 | byte | Delimiter flag (must be 0 for first release) |
| 38 | byte | Delimiter to be used for sequential delimited files |
| 39–40 | char-2 | ASCII file type (e.g., WP) |
| 41–52 | char-2 | Reserved (must be 0 at Open) |
| 53–60 | char-8 | Device specific status bytes |
| 61–128 | — | Reserved (must be 0 at Open) |

The following section defines the fields shown in Figure 3-1.

Namestring Pointer—A pointer to the null-terminated filename, to be specified at Open-time.

File Status Byte (file-open flag)—This flag will always be set after a successful open and is used internally by FMS. It is also available to applications that aren't sure of the file's open/closed state.

Return/Error Codes—These receive the return code and/or error code after any FMS operation. (Note: a list of the currently generated codes will be made available at the end of this document).

3.3.4.1 Interpretation of I/O-Specific Fields

Several fields in the FCB are used at Read/Write/Point time to specify record size, to control position within the file, and to determine the action to be taken at end-of-file. These are as follows:

Requested/Actual Record Size—This field is used only by the application, either at Open time or at Read/Write time. Stream files do not set a record size at Open; consequently, this field is set at Read/Write to indicate the size of the record to be read or written.

Sequential delimited files use this field only at Open-time to specify the maximum record size that will be encountered within the file. The field is not used for Read/Write operations, since record size is controlled by the presence of the delimiter.

The Actual Record Size field is used only by the FMS and/or the event handlers, and is used in all cases to indicate to the application the actual size of the record that was read or written. Note that this field may not be the same as Requested Record Size, since delimited files may be variable-length, and an error for either file type can result in a short (or 0 length) actual record.

Point Flags—The second and third bits of the I/O option byte are used to control positioning in the file for Read, Write, and Point operations. If both the Point and Relative Point flags are 0 (i.e., not set) for any of these operations, the operation proceeds at the current position in the file. The current position is defined as just after the last record that is read or written. The current position is at the beginning of the file immediately after the Open.

The various combinations of these flag bits are interpreted as follows:

X'40' the value in the Relative/Absolute field is an absolute byte number, from 0, from the start of the file X'20' the value in the Relative/Absolute field is an absolute byte number, from 0, from EOF (1=last byte in file)

X'60' the value in the Relative/Absolute field is a relative byte number from the current file position (0=no change)

NOTES:

The EOF-relative option (X'20') is not currently supported in this release of the system.

Positioning to beyond either SOF or EOF will return an end-of-file error. Avoid this operation, since future releases of the FMS may permit such operations.

Enable EOF Flag—This flag, typically specified once at Open but also available as an option for individual reads, and used only for Read operations on non-disk files, determines what should happen if an end-of-file condition is reached for the particular file. If not set (which is the default), EOF will cause FMS and/or the associated event handler to wait until the required data appears; if set, an end-of-file error will be returned, along with whatever data was available.

NoWait Option Flag—The NoWait option, available at Read/Write time for any type of file and any open mode, is a special feature which allows the application to initiate an I/O operation without having to wait around for FMS to complete the operation. It is intended for use by applications that have other things that they could be doing while the I/O is taking place.

For applications that require frequent I/O, the NoWait Option eliminates the need for the application to access the device drivers directly in order to assure reasonably efficient processing. Use of this option implies use of the Check function, which is described later in this chapter. In general, an I/O operation initiated via NoWait requires that a successful Check be performed later before FMS can mark the operation as "completed" and the application can access the record area. An example follows:

1. Application issues a Read and NoWait to get a block of data.

2. FMS initiates the operation, including any I/O that must be performed to get the requested record in the buffer, and then returns to the application with return code of 0.
3. The application continues with other activities, and later issues a Check to complete the operation. (Note that there may be more than one Check if it is not completed yet.)

Some general rules on using the NoWait option include the following:
1. For non-physical disk I/O, only one (NoWait) I/O operation may be outstanding at any time; attempting to initiate a second operation on the same file before completing the first will cause the request to be rejected with an "invalid function sequence" error. Note, however, that there is no restriction on multiple NoWait operations performed on separate files (i.e., different FCB's), including the case of the same file opened more than once by the application (currently, this would have to be input mode only).
2. Physical I/O mode (disk only) is considerably more flexible. Since the application is supposedly coordinating its own buffers, the FMS will allow any number of NoWait operations to be pending for a particular file at any given time. Performing Checks on the file will always complete the operations in the order that they were initiated (i.e., if two operations are pending, Check will return "not ready" until the first has finished, whether or not the second has completed.
3. Non-disk devices (such as keyboard, printer, TC) also allow more than one pending operation, subject to specific restrictions imposed by event handlers of the devices. This feature is automatic; the Physical I/O option is ignored for non-disk devices.
4. In all cases, if a NoWait operation is pending, Wait operations are not allowed until all Checks have been performed. Attempting to perform such a Wait operation will result in an "invalid function sequence" error.

3.3.5 Namestring Usage

The OPEN file access routine and all of the VTOC access routines take one or more pointers to terminal (i.e., file) or nonterminal (i.e., directory) namestrings. These namestrings are in the form of character strings that are terminated by a null (i.e., X'00') value (for "C" string usage). The text of a namestring must be as follows:

[System;][Volume:]node[.node] . . .

—or—

[System;]DEVICE:Pathname where:
System equals the system name containing the volume or device. (Note the the default is the local system and need not be specified.)
Volume equals the volume name for disk files only. (Note that the default is the first drive in the system—Drive 0.)
Node equals the directory or file name for disk files.
Pathname equals the device (i.e., logical) pathname, as defined in @CONFIG@ (see Volume Structure documentation for details).

There is a fixed limit of 32 characters on the length of each node in the namestring, and no practical limit on the number of nodes. Note, however, that DEVICE pathnames may be subject to additional CONFIG utility limits, which will be documented elsewhere.

Namestrings may consist of any characters except the following:
Delimiters—(.) (;) (:) (null)
Wildcards—(#) ( ) (−) (+) (*)
Other potentially special characters—(,) (/) (?)
NOTE:
The above list is subject to change.

Note that the 1107 FMS does not support fixed reserved words for device identification, other than the fixed identifier "DEVICE." Instead, the configuration utility/subroutines permit dynamic generation of symbolic device identification, which is more flexible and relatively immune to problems with adding new devices in the future. ??? The ability to reference a physical device rather than a Pathname may also be provided, but will not be discussed here (see configuration documentation).

Note also that the FMS currently does not support "wildcard" characters. There may be some level of support for wildcards in a future releases.

Currently available DEVICE pathnames are shown in the following chart.

| Device | Pathname |
|---|---|
| keyboard | K |
| 1st floppy drive | floppy0 |
| 2nd floppy drive | floppy1 |
| first Winchester | winch0 |
| second Winchester | winch1 |
| printer | printer |
| Wang Systems Networking | wangnet |
| 2780/3780 | 273780 |
| async channel 1 | asynch1A or asynclB |
| async channel 2 | async2A or async2B |

3.3.6 FCB (File Control Block) Structure

Following is the a "C" representation of the FCB structure.

```
typedef  struct
         §union       §char       (*filptr)[ ];  int filint[2];é filunion;
                  char     filestat;         /* file status flags byte */
                  char     retcode;          /* return code */
                  char     errcode;          /* error code */
                  char     version;          /* FCB version (must be 0!) */
         union        §char       (*bufptr)[ ];  int bufint[2];é bufunion;
                  long     bufsize;          /* buffer size */
                  union    §char   (*recptr)[ ]; int recint[2];é recunion;
                  long     reqrsize;         /* requested record size */
                  long     actrsize;         /* actual record size */
                  long     recnum;           /* record number/offset */
```

-continued

```
        char    openmode;       /* open mode indicators */
        char    rectype;        /* record type indicators */
        char    openflag;       /* open flags */
        char    ioflag;         /* I/O flags */
        char    dlimflag;       /* delimiter flags (must be 0) */
        char    dlimchar;       /* delimiter character */
        char    fileorg[2];     /* file organization (ASCII) */
        char    spare1[12];     /* reserved bytes (must be 0) */
        char    devstat[8];     /* device-specific status bytes */
        char    fmsarea[96];    /* FMS-only area */
    é FCB;
#define filename    filunion.filptr     /* simplified file pointer */
#define bufarea     bufunion.bufptr     /* simplified buffer pointer */
#define recarea     recunion.recptr     /* simplified record pointer */
#define extsize     bufsize             /* additional extent size (bytes) */
#define fmsstat(x)  ((x.retcode 8)+(x.errcode&0x00FF))  /* Word status */
```

3.3.6 FCB (File Control Block) Constants

Following are "C" definitions of FCB constants.

3.3.6 FCB (File Control Block) Flag Usage

The following table identifies and defines FCB flag usage.

```
File Status Byte (FMS use only) */
#define     fstatopen       0x80    /* Indicates file has been opened */
                                    /* Application should avoid its use */
* Open Mode */
/* Work and Shared files have not yet been implemented */
#define     fopenread       0x01    /* Open for read-only access */
#define     fopenwrite      0x02    /* Open for write-only access */
#define     fopenrdwt       0x03    /* Open for read/write access */
#define     fopenold        0x10    /* Old (existing) file */
#define     fopennew        0x20    /* New (nonexistent) file */
#define     fopenwork       0x30    /* Work file (must be new disk file) */
#define     fopenshared     0x40    /* New or old file open for shared access */
/* Record Types */
/* Sequential Fixed-Length records are not supported */
#define     rtypefixed      0x00    /* Sequential fixed-length records */
#define     ftypedelim      0x01    /* Sequential delimited records */
#define     ftypestream     0x02    /* Stream (variable-length) records */
/* Open Flags */
#define     fopflagauto     0x80    /* Autocreate/Autodelete (disk only) */
#define     fopflagphys     0x40    /* Physical I/O (disk only) */
#define     fopflageof      0x20    /* EOF-enable (non-disk only) */
/* I/O Flags */
/* Absolute point-from-EOF has not been implemented */
#define     fioflagnowait   0x80    /* NoWait option (Read/Write/Control) */
#define     fioflagendpnt   0x20    /* Absolute Point from logical EOF */
#define     fioflagrelpnt   0x60    /* Relative Point from current position */
#define     fioflagbegpnt   0x40    /* Absolute Point from logical SOF */
```

| Flag | Usage |
| --- | --- |
| fstatopen | This bit is set by FmsOpen and reset by FmsClose; it should not be modified by the caller (but may be checked). The remaining bits of the status byte are reserved for FMS use. |
| fopenread fopenwrite fopenrdwt | Read operations may be performed on a file open in read or read/write mode, and write operations in write or read/write. Control is always valid, subject to event handler checking |
| fopenold fopennew fopenwork fopenshared | Currently, only "old" and "new" files are supported. DEVICE files may be opened in either mode. Non-DEVICE disk files open as "old" & "read only" may be simultaneously opened by more than one task or more than once in a task. |
| ftypefixed ftypedelim ftypestream | "Fixed-length" records are not currently supported. Stream records are variable-length, settable by the caller at each I/O operation. Delimited files are also variable-length, but use a record delimiter to determine record size. |
| fopflagauto | This flag is for disk only, and causes automatic creation of a nonexisting file open as "old", and automatic deletion of an existing file open as "new". |
| fopflagphys | This flag is for disk only, and indicates use of "physical I/O" mode, in which there is no FMS buffer. All I/O is done directly to/from the application-specified record area. All read/write operations must be at block boundaries, but may be of any (nonzero) length, including non-block lengths Delimited records are not allowed in physical I/O mode. |
| fopflageof | This flag is used only for non-disk files, and specifies that an end-of-data condition on a read should cause an EOB or short-record error rather than cause the event handler to wait for additional data. It is primarily intended for devices under some external control, such as TC or keyboard |
| fioflagnowait | The NoWait flag is allowed for Read/Write/Control operation and specifies that FMS will simply initiate the operation and return to the caller, who must then use FmsCheck to was for completion of the operation. Any number of NoWait operations may be pending at any time, except for disk file not using physical I/O (where only 1 is allowed). All NoWait's must be completed (via Check) before any operation without the NoWait flag may be performed ("invalid function sequence" error) |

| Flag | Usage |
|---|---|
| fioflagendpnt | These are the three point options available with either an explicit point (FmsPoint) command or with Read/Write. |
| fioflagrelpnt | "Begpnt" indicates that the specified point value, placed in the "recnum" field, is an absolute byte number, from 0, |
| fioflagbegpnt | from the start of the file. "Relpnt" specifies a relative byte number (positive or negative) from the current position |
| | in the file. "Endpnt" specifies an absolute byte, from 0, from the end of the file. (Note that this option is not |
| | yet implemented.) |

3.4 FILE ACCESS ROUTINES

This section describes the calling sequences, argument structures, and return/error status information for each of the available FMS file access routines. Calling sequences are described using "C" syntax. Note that LARGE and SMALL mode usage is identical except as follows:

1. SMALL mode use of FMS functions, as well as other operating system primitives, requires inclusion of the "osmac.h" macro file, which substitutes SMALL entry points for the LARGE subroutine names specified in the "C" program. Because of this, SMALL mode calls are case-sensitive; use of incorrect case in the function names will produce incorrect (and possibly disastrous) results.
2. All direct pointer arguments in SMALL mode are automatically changed to LARGE form by the aforementioned macros, and thus need not be a user concern. However, contained pointers, such as those within the FCB, must be explicitly constructed as 4-byte values by the caller; the base portions will be filled in by FMS. Currently, there are three such pointer fields in the FCB and one each in the request array arguments to FmsCheck, FmsReadAttr, and FmsUPdateAttr. These will be noted in the documentation of the respective functions.

3.4.1 Opening a File

Use the FMS primitive "FmsOpen" to open a file to be processed by the file management read/write routines. The file can be a new or existing disk or DEVICE file.

Note that the application is expected to set the filename pointer and open options in the FCB. Note also that ReadVtoc and ReadAttr VTOC access routines are available for obtaining the names and attributes of existing files.

Definition:
  FmsOpen(fcbptr)
  FCB *fcbptr
Input Definition:
  fcbptr: A pointer to a properly-constructed FCB.
Output:
  none.
Error Codes:
  see Section 3.6.

3.4.3 Reading a File

Use the FMS primitive "FmsRead" to read data from a file that is open for read-only or read/write access. The following fields in the FCB are looked at when the FmsRead is called:
  Record Area address
  Requested record size
  I/O option flags and values
Definition:
  FmsRead(fcbptr)
  FCB *fcbptr
Input Definition:
  fcbptr: A pointer to a properly-constructed FCB.
Output (of write routines):
  actual record size
  return/error codes
Error Codes:
  see Section 3.6.

3.4.2 Closing a File

Use the FMS primitive "FmsClose" to close a file that is currently open for processing. All resources associated with a file are released when it is closed.

When a dynamic stream input file (such as a keyboard) is closed, any input data remaining in the buffer is then discarded. When a dynamic stream output file (such as a printer) is closed, any output data remaining in the buffer is saved for output (to the device). When a disk file that was opened in other than read-only mode is closed, any new or modified data in the buffer is updated on the disk.

Definition:
  FmsClose(fcbptr)
  FCB *fcbptr
Input Definition:
  fcbptr: A pointer to a properly-constructed FCB.
Output:

3.4.4 Writing to a File

Use the FMS primitive "FmsWrite" to write data to a file that is open for write or read/write access. The following fields in the FCB are looked at when the FmsRead is called:
  Record Area address
  Requested record size
  I/O option flags and values
Definition:
  FmsWrite(fcbptr)
  FCB *fcbptr
Input Definition:
  fcbptr: A pointer to a properly-constructed FCB.
Output:
  actual record size
  return/error codes
Error Codes:
  see Section 3.6.

3.4.5 Repositioning a File

Use the FMS primitive "FMsPoint" to reposition the current file to a specified record or byte, indicated by either an absolute or relative value. Note that point operations are currently legal only for storage files, such as local and remote cataloged disk files and disk DEVICE files.

Note also that the point function can also be done with read/write requests with the same results, except that the internal buffering strategy of the FMS may differ depending on the way in which repositioning is done.

See Section 3.3.4.1 for a discussion of point options.
Definition:
    FmsPoint(fcbptr)
    FCB *fcbptr
Input Definition:
    fcbpter: A pointer to a properly-constructed FCB.
Output:
    none
Error Codes:

3.4.6 Clearing Data in a File

Use the FMS primitive "FmsTruncate" to clear all remaining records in a disk file that has been opened for write or read/write operations. The records are cleared starting from the current file position to the end of the file.

Note that there is no equivalent primitive for dynamic output files. However, use of Read with the EOF option will perform the equivalent function.
Definition:
    FmsTruncate(fcbptr)
    FCB *fcbptr
Input Definition:
    fcbptr: A pointer to a properly-constructed FCB.
Output:
    none
Error Codes:
    see Section 3.6.

3.4.7 Passing Control to a Device Event Handler

Use the FMS primitive "FmsControl" to pass device-specific control information to the device event handler, with no processing by the FMS. Control information is supplied in the data area of the Control request. The structure of the Control data area is request-specific.
Definition:
    FmsControl(fcbptr)
    FCB *fcbptr
Input Definition:
    fcbptr: A pointer to a properly-constructed FCB.
Output:
    none
Error Codes:
    see Section 3.6.

3.4.8 Checking I/O Operations

Use the FMS primitive "FMsCheck" to check the ready status of one or more FMS NoWait operations, signal semaphores, or message semaphores. The check may be performed with or without a wait.

This primitive uses a data structure as outlined in the Input Definitions section below. Note that it processes active items in the array (as described below) in ascending array element order. This permits prioritizing of items within the array so that completion and readiness status can be detected first for higher priority items.

Note also that, upon completion of an event, FmsCheck will automatically set the "inactive" status in the corresponding array entry. Therefore, the calling task need only reset these at startup time.
Definition:
    FmsCheck(count, flags, array)
    int count;
    char flags,
    CHK array [];
Input Definition:
    count: states the number of items in the Check array.

flags: option bit flags, used as following:

| bit no. | |
|---|---|
| 7 | Wait/NoWait option. If not set, Check will wait until one of the events has completed, returning an explicit return code equal to the item number (starting at 1). If set (i.e., X'80'), FmsCheck will always return immediately with the return code set to 0 if none of the requested events is in a "ready" state. |
| 6 | Receive/NoReceive option. If not set, the appropriate Receive or Wait (Semaphore) will be done on a completed Message or Signal semaphore before returning to the caller. If set (i.e., X'40'), Receive/Wait will not be performed. It will be the task's responsibility to call the respective semaphore update primitive. |
| 5-0 | Reserved, and must be set to 0. | array[]: an array of event descriptors, each defined as having the following 8-byte structure:

| Byte(s) | Contents |
|---|---|
| 0 | 0 = FMS completion (FCB passed)<br>1 = Signal (signal semaphore)<br>2 = Message (message semaphore) |
| *1 | Task number (for signal/message items only). (Default value of 255 equals the current task.) |
| 2 | Semaphore number (for signal/message items only) |
| 3 | Active/inactive flag, where:<br>0 = active check item (so process it)<br>−1 = inactive check item (so ignore it) |
| 4-7 | A pointer for FMS and message types<br>FMS = pointer to the FCB for the operation<br>Message = pointer to message receiver<br>Signal = 0 (reserved) |

*Currently, the task number is required to be that of the current task, either explicitly or through the default of 255.

Output:
    none
Error Codes:
    See Section 3.6. In addition, the detection of an invalid item in the FmsCheck array results in an immediate return to the caller with a return code that is equal to the negative of the number of the item in error (see the description of byte 1 of array[] below).
NOTE:
    Small mode "C" uses 2-byte pointers and thus must allocate an additional "int" for the base portion of the address field. The FMS will take care of filling in the base value from register DS.

3.5 VTOC ACCESS ROUTINES

This section describes the calling sequences, argument structures, and return/error status information for each of the available FMS VTOC access routines. Calling sequences are described using "C" syntax. Note that LARGE and SMALL mode usage is identical except as follows:

1. SMALL mode use of FMS functions, as well as other operating system primitives, requires inclusion of the "osmac.h" macro file, which substitutes SMALL entry points for the LARGE subroutine names specified in the "C" program. Because of this, SMALL mode calls are case-sensitive; use of incorrect case in the function names will produce incorrect (and possibly disastrous) results.
2. All direct pointer arguments in SMALL mode are automatically changed to LARGE form by the aforementioned macros, and thus need not be a user concern. However, contained pointers, such as those within the FCB, must be explicitly constructed as 4-byte values by the caller; the base portions will be filled in by FMS. Currently, there are three such pointer fields in the FCB and one each in the request array arguments to FmsCheck, FmsReadAttr, and FmsUpdateAttr. These will be noted in the documentation of the respective functions.

Note that VTOC access routines have both update functions and inquiry functions. Primitives used for update functions are presented first, with primitives for inquiry functions presented last.

3.5.1 Deleting a Disk Volume File or Directory

Use the FMS primitive "FmsDelete" to delete a file or directory from a disk volume. This primitive will detete any file, and any empty directory. on a disk. (DEVICE files (e.g., printers) cannot be deleted using this primitive.)
Definition:
　FmsDelete(name, flags)
　char *name;
　char flags;
Input Definitions:
　name: a pointer to a file or directory name.
　flags: this field is not currently used, and must remain 0.
Output:
　none
Error Codes:
　See Section 3.6.

3.5.2 Renaming a Disk Volume File or Directory

Use the FMS primitive "FmsRename" to rename a file or directory on a disk volume. Currently, any file or directory can be renamed to a new file or directory. This means that two existing files or directories can not be merged into one.
Definition:
　FmsRename(oldname, newname, flags)
　char *oldname;
　char *newname;
　char flags;
Input Definitions:
　oldname: a pointer to the old file or directory name.
　newname: a pointer to the new file or directory name.
　flags: this field is not currently used, and must remain 0.
Output:
　none
Error Codes:
　See Section 3.6.

3.5.3 Creating a New Directory

Use the FMS primitive "FmsMakeDir" to create a new directory on a disk volume. The new directory must be in a containing directory that already exists, or off the root directory.
Definition:
　FmsMakeDir(name, flags)
　char *name;
　char flags;
Input Definitions:
　name: a pointer to the full pathname of the new directory name.
　flags: this field is not currently used, and must remain 0.
Output:
　none

3.5.4 Updating a Disk File's or Directory's Attributes

Use the FMS primitive "FmsUpdateAttr" to update the attributes of a disk file or directory.
Definition:
　FmsUpdateAttr(name, count, array)
　char *name;
　int count;
　ATTR array[];
Input Definitions:
　name: a pointer to the new directory name.
　count: a count of the number of items in the attribute array (below).
　array[]: an attribute array (ATTR) having the following fields in an 8-byte data structure:

| "C" Type | Contents |
|---|---|
| int | attribute number |
| char* | pointer to a new attribute value |
| int | return code (that is set by FmsUpdateAttr) |

| Attribute | ID | Format | Contents |
|---|---|---|---|
| File and Directory Attributes (all ID values are decimal) | | | |
| CREATOR | 00 | char[8] | Name of the file/directory creator (user ID) |
| FILECLASS | 01 | char[8] | Protection class for the file/directory (TBD) |
| CREDATE | 02 | char[4] | Creation date (Packed YYYYMMDD) |
| REFDATE | 03 | char[4] | Reference date (Packed YYYYMMDD) |
| MODDATE | 04 | char[4] | Modification date (Packed YYYYMMDD) |
| BAKDATE | 05 | char[4] | Backup date (Packed YYYYMMDD) |
| File-only Attributes | | | |
| BLOKCNT | 06 | long | Count of blocks currently used for file data |
| EXTCNT | 07 | int | Count of extents allocated to the file |
| EXTSIZE | 08 | long | Default blocks-in-extent for allocation |
| BYTESLAST | 10 | int | Byte count in last used block |
| FILETYPE | 11 | char(2) | File type (ASCII, "WP", etc.) |
| Directory-only Attributes | | | |
| MEMBERS | 09 | int | Current count of members in the directory |

Error/Return Codes:
　See Section 3.6. Note that a specific return code is used to indicate one or more non-zero return codes within the attribute array.
NOTE:
　Currently, function FmsUpdateAttr has been removed (due to space considerations) from the application calling level. Any attempt to call it will result in a return code of X'FFFF'.

3.5.5 Reading a Disk File's or Directory's Name

Use the FMS primitive "FmsReadVtoc" to reach the name of a file or directory from a disk volume.
Definition:
　FmsReadVtoc(path, element, flags, typptr)
　char *path;
　char *element;
　char flags;
　char *typptr;

Input Definitions:

path: a pointer to a pathname. To read a file or directory on a disk volume, this must be set by the application to the name of the containing directory (with null equal to the root directory). This primitive will return only members of that directory, based on the input value of "element" and on the flags byte. To read volumes on the system, this field must be set to a ";" character, followed by a null.

element:

a pointer to the element-on-path name. This argument is the "base" element name, which is used to find the "equal", "next", or "previous" element as specified by the flags byte (see below). The value of the argument is replaced by the located element upon successful return from the FmsReadVtoc call.

This argument is also used to read volumes on the system, except that its first byte is always used for the device number. This means that the volume ordering is by device number, whereas files and directories are ordered alphabetically. In either case, note that the base element need not itself exist. Thus, a null (X'00' can be used to locate the first item in a directory or the first volume in the system.

flags: event flags. Note that only the high two bits of this byte are used. The remaining bits must remain 0. The values for the two high bits are as follows:

X'00'—find (or verify) the element that is equal to the base element.

X'80'—find the next element in relation to the base element.

X'40'—find the previous element in relation to the base element.

typptr: a pointer to a 1 byte element-type field to be filled in by ReadVTOC. Element types are 0 (for directory) and 1 (for file). The value of this argument is ignored on input. Also, it is current not used for reads to a volume.

Error/Return Codes:

See Section 3.6.

3.6 RETURN/ERROR CODES

This section presents lists of return and error codes for FMS primitives. FMS file access routines are presented first. Next, FMS VTOC access routines are presented.

3.6.1 Return/Error Codes for File Access Routines

Return codes from the FMS File Access Routines are always placed in the return and error code bytes in the FCB. Note that the return code is an indicator of the seriousness of the error and/or of the source of the error (user, application, I/O, etc.).

| RtnCode | ErrCode | Significance |
|---|---|---|
| Return code X'00' | '00' X'00' | Successful Completion Requested operation successafully completed |
| Return code X'01' | '01' X'01' | Read/Write Warnings Missing delimiter (delimited record Read/Write) |
| X'01' | X'02' | EOF detected on Read (no data returned) |
| X'01' | X'04' | EOF detected on Read (short record returned) |
| Return code X'02' | '02' X'01' | Open Errors (correctible) File being opened "new"already exists (and no AutoDelete) |
| X'02' | X'02' | File being opened "old" was not found (and no AutoCreate) |
| X'02' | X'03' | Nonexistent directory was specified in file namestring The file is already opened elsewhere in an exclusive mode |
| X'02' | X'05' | Invalid file namestring (bad character(s) or node length) |
| X'02' | X'06' | Specified (or default) volume is not mounted |
| Return code X'03' | '03' X'01' | Open Errors (application-caused) FCB already in use w/previously opened file |
| X'03' | X'02' | Invalid Open Mode specified |
| X'03' | X'03' | Invalid buffer size specified |
| X'03' | X'04' | Insufficient buffer size for specified record size |
| X'03' | X'05' | Invalid file (record) type specified |
| X'03' | X'06' | Invalid Open options flag(s) selected |
| X'03' | X'07' | FCB already in use or damaged ("open" status bit set) |
| X'03' | X'08' | Invalid record size specified |
| Return code X'04' | '04' X'01' | Configuration-specific errors Specified system name is not configured |
| X'04' | X'02' | Unrecoverable (probably system) error |
| X'04' | X'03' | Device is in exclusive use elsewhere |
| X'04' | X'FF' | Device pathname is not configured |
| X'05' | | Non-Open errors (probably application-caused) |
| | X'01' | Attempting to request operation on unopened file (FCB) |
| | X'02' | Invalid device for operation (Point/Truncate) |
| | X'03' | Invalid or damaged FCB detected |
| | X'04' | Invalid function request sequence |
| | X'05' | Invalid open mode for requested function |
| | X'06' | Invalid parameter (currently, indicates recsize = 0) |
| | X'07' | Invalid record size for specified buffer size |
| | X'08' | Attempting to do physical I/O on non-block-boundary |
| | X'09' | Attempted to truncate past EOF (after Point) |
| | X'0A' | Close attempted with outstanding I/O pending |
| | X'0B' | Attempted to write beyond EOF (after Point) |
| X'06 | | I/O from device |
| | X'01' | Device error status is in the FCB Device Status bytes |
| X'07' | | Unexpected errors (internal FMS routines) |
| | X'01' | Error attempting to extend (disk) file |
| | X'02' | Unexpecjed internal error (RecallNode) |
| X'08' | | VTOC error (returned by CBAM processor) |
| | X'hh' | A list of possible VTOC error codes (hh) may be found on the next page (VTOC Access Routine error X'hh00') |

3.6.2 Return/Error Codes for VTOC Access Routines

Return codes from the VTOC routines may be either in AX, for most errors, or in the appropriate argument array entry, for FmsReadAttr/FmsUpdateAttr and FmsReadExtent. Code '18' can occur only in AX (description below).

| Return Code | Significance |
|---|---|
| X'hh00' | VTOC error occurred during processing (hh nonzero):<br>01 = I/O error in the VTOC<br>02 = VTOC full<br>03 = invalid VTOC contents detected<br>04 = invalid arguments passed to VTOC routines<br>Errors 3 and 4 are particularly serious and should be reported to FMS personnel immediately |
| X'0010' | Invalid input namestring format (see file naming rules) |
| X'0011' | Invalid/nonexistent attribute ID (for FmsReadAttr/UpdateAttr)<br>Invalid/nonexistent extent number (FmsReadExtent) |
| X'0012' | Nonempty directory cannot be deleted (FmsDelete) |
| X'0013' | Specified volume is not mounted |
| X'0014' | Requested element not found (FmsReadVtoc) |
| X'0015' | File/directory already exists (FmsMake Dir/FmsRename) |
| X'0016' | Internal VTOC error (notify FMS personnel!) |
| X'0017' | Specified File/Directory not found |
| X'0018' | One or more nonzero return codes in argument array (used for FmsReadAttr, FmsUpdateAttr, FmsReadExtent) |
| X'FFF' | Requested function is not available or not implemented |

NOTE:

Currently, functions FmsReadExtent and FmsUpdateAttr have been removed (due to space considerations) from the application calling level. Any attempt to call them will result in a return code of X'FFFF'.

APPENDIX E—DOCUMENT MANAGER

6.1 INTRODUCTION

The 1107 Document Manager (DM) is a shared facility that provides primitives that allow applications to access disk-resident 1107 documents. Using DM primitives, applications do not need specific knowledge of operating system dependent access methods or disk storage format. These primitives provide a uniform interface to open, close, read, write, delete, and (re)order documents.

Since most data on the 1107 uses the 1107 document structure (see Appendix A), the document manager is a facility that can be used for most 1107 activities. Use DM primitives whenever you want to use the 1107 page structures. For example, the DM is typically used for creating the data structure for use in displaying information, through the screen manager, to the screen.

The 1107 Document Manager can be used as an alternative to using the File Management System (FMS) since it is an indexed-file mechanism that allows logical access to records. In fact, the DM can be considered as an actual interface to the FMS.

6.2 DOCUMENT CONTROL BLOCK

Document access requires file system specific data structures, document indices (to order the document) and state data (to define current access parameters). These three data types are combined to form a Document Control Block (DCB).

The DCB is built by the DM as part of the document open process. Indices are included into the index buffer section of the DBC as required to serve the access privileges granted.

The DCB is maintained by the Document Manager and should not be accessed by an application. A pointer to the DCB is passed as a parameter to document management service routines. This is how the calling routine specifies the document that is to be operated upon.

The DM maintains sole responsibility for the contents of the DCB.

6.3 DOCUMENT ACCESS

The 1107 document file is a page oriented structure as opposed to a line or character oriented structure. Access to a specific location within the document is therefore page oriented.

Document Manager service routines operate upon a specified page or range of pages. Page number specifications are interpreted as follows:

| page number parameter | Resulting page reference |
|---|---|
| valid page number (1-255) | specification as given |
| greatest page number | for input operations, last page;<br>for output operations, last page + 1 |

The document to be operated upon is in the form of a character string that is terminated by a null (i.e., X'00') value (for "C" string usage). The text of a namestring must be as follows:

[System;][Volume:]node[.node] . . .

where:

System equals the system name containing the volume or device. (Note that the default is the local system and need not be specified.)

Volume equals the volume name for disk files only. (Note that the default is the first drive in the system—Drive 0.)

Node equals the directory or file name for disk files.

Pathname equals the device (i.e., logical) pathname, as defined in @CONFIG@ (See Volume Structure documentation for details).

Namestrings may consist of any characters except the following:

Delimiters—(.) (;) (:) (null)
Wildcards—(#) () () (−) (+) (*)
Other potentially special characters—(,) (/) (?)
NOTE:
The above list is subject to change.

6.4 DOCUMENT MANAGER PRIMITIVES

Document manager primitives are functions that are called by an application program to the document manager to open, to close, and to manipulate 1107 documents. There are also Document Manager primitives to copy, to read, and to insert document pages viewports within a virtual screen.

A description of these and other Document Manager primitives appear in the following subsections. Descriptions of document manager primitives include the primitive statement, definitions of all of its parameters and values, return values, and error codes. Additonal information is provided as required.

6.4.1 Creating a Document Control Block

Use the document manager primitive "doccreate" to create a DCB for a new document. File administration data is implicitly written to disk and the current page is initialized to page 0 (the summary page). Memory for the DCB will be acquired by this routine.

Note that this primitive calls another primtive, "docopen" (see Section 6.4.2), with the access mode of the document of update. Note also that the primitive, "docclose", will return this memory implicitly (see Section 6.4.3).

Usage:
U16
doccreate (documentname, password, dcbptr)
TEXT—*documentname, *password;
U8 —**dcbptr;
Input Definitions:
documentname: A pointer to the namestring of the document.
password: A pointer to the document password (a null terminated string). This is a a NULL pointer if no password is to be specified.
dcbptr: The location where a pointer is to be returned to the newly generated DCB.
Output Definitions:
dcbptr: Gets a pointer to a DCB block used to access the requested document.
Return/Error Codes:
This primitive returns an unsigned 16-bit return code. See Section 6.5 for more details.

6.4.2 Opening a Document

Use the document manager primitive "docopen" to open an 1107 document. A document must be opened before any manipulations can be performed on it. The primitive will acquire memory for a DCB and subsequently build it. File administration data is implicitly written to disk and the current page is initialized to 0 (i.e., a WP summary page).

Usage:
U16
docopen (document name, access, password, dcbptr)
TEXT—*documentname
COUNT—access;
TEXT—*password;
U8—**dcbptr;
Input Definitions:
documentname: A pointer to the namestring of the document.
access: Access mode of the document to be opened.
1 = read
2 = write
3 = update
password: A pointer to the document password (a null terminated string). This is a NULL pointer if no password is specified.
dcbptr: The location where a pointer is to be returned to the DCB that is generated in this routine.
Output Definitions:
dcbptr: Gets a pointer to an DCB block used to access the requested document.
Return/Error Codes:
This primitive returns an unsigned 16-bit return code. See Section 6.5 for more details.

6.4.3 Closing a Document

Use the document manager primitive "docclose" to close an 1107 document. A document must be closed as a last step after all manipulations on it have been performed. All memory acquired for the DCB is returned. Memory acquired either by "pagread" or by the calling routine to store text and formatting data is not returned.

Usage:
U16
docclose (dcbptr)
U8—**dcbptr;
Input Definitions:
dcbptr: A pointer to the address of the DCB for the document.
Output Definitions:
dcbptr: The address of the DCB is reinitialized to NULL.
Return/Error Codes:
This primitive returns an unsigned 16-bit return code. See Section 6.5 for more details.

6.4.4 Removing a Document from the Currently Mounted Volume

Use the document manager primitive "docremove" to delete a document, specified by its namestring, from the currently mounted volume. The operation is not permitted if the document is open.

Usage:
U16
docremove (documentname, password)
TEXT—*documentname, *password;
Input Definitions:
documentname: A pointer to the namestring of the document.
password: A pointer to the document password. This is a NULL pointer if no password exists.
Output Definitions:
none
Return/Error Codes:
This primitive returns an unsigned 16-bit return code. See Section 6.5

6.4.5 Accessing Data Within a Document

Use the document manager primitive "itemget" to access individual data items within a document and to reserve disk space. Data items that can be accessed include format, header, and footer definitions as well as administrative data. "itemclass" and "itemid" (see Section 6.6) define the data item that is to be accessed. The structure of the data item will vary with individual items.

Note that memory for the data item that is returned will be acquired dynamically through GetMyNode (see Chapter 2). It is the responsibility of the calling routine to return memory thus acquired to the system (see Section 6.4.12).

Usage:
    U16
    itemget (dcbptr, itemclass, Itemid, itemptr)
    U8—*dcbptr;
    U16—itemclass, itemid;
    U8—*itemptr;
Input Definitions:
    dcbptr: A pointer to a DCB block used to access the document requested.
    itemclass: The data item class that is referenced. Literal definitions are provided in header file "docitem.h". (See Section 6.6 for a description and use of "itemclass" codes.)
    itemid: The data item ID within the item class that is referenced. Literal definitions are provided in header file "docitem.h". (See Section 6.6 for a description of "itemid" codes.)
    itemptr: The address to which the data item referenced by "itemclass" or "itemid" is to be returned.
Output Definitions:
    itemptr: Data item referenced by itemclass/itemid is returned to buffer referenced by itemptr.
Return/Error Codes:
    This primitive returns an unsigned 16-bit return code. See Section 6.5 for more details.

6.4.6 Putting Information Into a Document

Use the document manager primitive "itemput" to access individual data items within the document such as format, header, footer definitions and administrative data. Itemclass and itemid define the data item to be accessed. Structure of the data item will vary with individual items.

Usage:
    U16
    itemput (dcbptr, itemclass, itemid, itemptr)
    U8—*dcbptr;
    U16—itemclass;
    U16—itemid;
    U8—*itemptr;
Input Definitions:
    dcbptr: A pointer to a DCB block that is used to access the requested document.
    itemclass: The data item class that is referenced. Literal definitions are provided in header file "docitem.h". (See Section 6.6 for a description and use of "itemclass" codes.)
    itemid: The data item ID within the item class that is referenced. Literal definitions are provided in header file "docitem.h". (See Section 6.6 for a description and use of "itemclass" codes.)
    itemptr: A pointer to the data item that is referenced.
Output Definitions:
    none
Return/Error Codes:
    This primitive returns an unsigned 16-bit return code. See Section 6.5 for more details.

6.4.7 Copying Pages in a Document

Use the document manager primitive "pagcopy" to copy a range of pages within a document, or from a source document to a destination document, before the page number specified by "pageno". If "despage" is greater than the last page, the page(s) will be appended to the end of the document. If "endpage" is set equal to "startpage", only a single page will be copied. The page index will be rearranged accordingly.

Usage:
    U16
    pagcopy (dcbptrsrc, startpage, endpage, dcbptdest, despage)
    U8—*dcbptrsrc;
    COUNT—startpage, endpage;
    U8—*dcbptrdest;
    COUNT—despage;
Input Definitions:
    dcbptrsrc: A pointer to a DCB block defining the source document.
    startpage: The starting page number to be copied.
    endpage: The ending page number to be copied.
    dcbptrdest: A pointer to a DCB block defining the destination document.
    despage: The page number before which to insert the specified page(s).
Output Definitions:
    none
Return/Error Codes:
    This primitive returns an unsigned 16-bit return code. See Section 6.5 for more details.

6.4.8 Deleting Pages in a Document

Use the document manager primitive "pagdelete" to delete a range of pages from a document. If "endpage" is equal to "startpage", only a single page will be deleted. Document access must be at update level (see Section 6.4.2). The page index will be rearranged accordingly.

Usage:
    U16
    pagdelete (dcbptr, startpage, endpage)
    U8—*dcbptr;
    COUNT—startpage, endpage;
Input Definitions:
    dcbptr: A pointer to a DCB block that is used to access the requested document.
    startpage: The starting page number that is to be deleted.
    endpage: The ending page number that is to be deleted.
Output Definitions:
    none
Return/Error Codes:
    This primitive returns an unsigned 16-bit return code. See Section 6.5 for more details.

6.4.9 Inserting Pages in a Document

Use the document manager primitive "paginsert" to insert a document page, referenced by "pagept", before the page number specified by "pageno". If "pageno" is greater than the first page, the page(s) will be appended to the end of the document.

The document page is converted from memory format to disk format before the insertion.

Usage:
    U16
    paginsert (dcbptr, pageptr, pageno)
    U8—*dcbptr;
    U8—*pageptr;
    COUNT—pageno;
Input Definitions:
    dcbptr: A pointer to a DCB block used to access the requested document.
    pageptr: A pointer to the page structure to be written.
    pageno: The page number before which to insert the page.
Output Definitions:

6.4.10 Moving Pages

Use the document manager primitive "pagmove" to move a page or range of pages within a source document or from one document to another. The page(s) are moved before the page number specified by "despage" in the source document. If "despage" is greater than the last page of the document, the page(s) will be appended to the end of the document. if "endpage" is equal to "startpage", only a single page will be moved.

Note that moving implicitly deletes the page(s) from the source location after they have been moved to the destination location. The page index will be rearranged accordingly.

Usage:
 U16
 pagmove (dcbptrsrc, startpage, endpage, dcbptrdest, despage)
 U8—*dcbptrsrc;
 COUNT—startpage, endpage;
 U8—*dcbptrdest;
 COUNT—despage;
Input Definitions:
 dcbptrsrc: A pointer to a DCB block that defines the source document.
 startpage: The starting page number to be moved.
 endpage: The ending page number to be moved.
 dcbptrdest: A pointer to a DCB block that defines the destination document.
 despage: The page number before which to insert the specified page or pages.
Output Definitions:
 none
Return/Error Codes:
 This primitive returns an unsigned 16-bit return code. See Section 6.5 for more details.

6.4.11 Determining the Current Page Number

Use the document manager primitive "pagnumber" to determine the current page number for the document referenced by the DCB. The current page is defined as the page involved in the last I/O operation utilizing that DCB. The page number is updated to reflect delete page and insert page operations.

Operations only involving index manipulations will affect only the original page number of the current page and not the page referenced. For example, if the current page is page 3 and a page is inserted before page 3, the current page becomes page 4, thus referencing the same page as before the insert.

Usage:
 U16
 pagnumber (dcbptr; pageno)
 U8—*dcbptr;
 COUNT—*pageno;
Input Definitions:
 dcbptr: A pointer to a DCB block used to access the requested document.
 pageno: A pointer to a location to which this routine is to return the current page for the referenced document.
Output Definitions:
 pageno: Gets the value of the current page number.
Return/Error Codes:
 This primitive returns an unsigned 16-bit return code. See Section 6.5 for more details.

6.4.13 Reading a Page

Use the document manager primitive "pagread" to read a full page from the currently opened document and to build an 1107 memory format page. Memory is acquired by this routine for each block in the data structure (see Appendix A for a description of the 1107 memory data structure).

Memory acquired by this call and allocated to storage of text or formatting data will not be returned to the system by any Document Manager routine.

Usage
 U16
 pagread (dcbptr, pageno, pageptr)
 U8—*dcbptr;
 COUNT—pageno;
 U8—**pageptr;
Input Definitions
 dcbptr: A pointer to a DCB block used to access the requested document.
 pageno: The page number that is to be read in.
 pageptr: The location where a pointer is to be returned to the page structure generated in this routine.
Output Definitions
 pageptr: Gets a pointer to a page structure built by this routine containing page data to be edited.
Return/Error Codes
 This primitive returns an unsigned 16-bit return code. See Section 6.5 for more details.

6.4.12 Returning Memory

Use the document manager primitive "pagpurge" to return memory acquired dynamically for 1107 page structure to the task's memory pool.

Usage
 U16
 pagpurge (pageptr)
 U8—*pageptr;
Input Definitions
 pageptr: A pointer to the page structure to be purged.
Output Definitions
 none
Return/Error Codes
 This primitive returns an unsigned 16-bit return code. See Section 6.5 for more details.

6.4.14 Writing to a Page

Use the document manager primitive "pagwrite" to write text starting at "pageptr" to the page specified by "pageno". If "pageno" is greater than the last page, the page(s) will be appended to the end of the document.

Note that the document page is converted from memory format to disk format as it is written to the disk.

Usage
 U16
 pagwrite (dcbptr, pageno, pageptr)
 U8—*dcbptr;
 COUNT—pageno;
 U8—*pageptr;
Input Definitions
 dcbptr: A pointer to a DCB block used to access the requested document.
 pageno: The page number to be written.
 pageptr: A pointer to the page structure to be written.
Output Definitions none
Return/Error Codes
This primitive returns an unsigned 16-bit return code. See Section 6.5 for more details.

6.5 RETURN CODES

A set of uniform return codes is used inorder to maintain a consistent interface to the Document Manger. Wherever possible, return codes confirm to the standards set by 1107 FMS (see Chapter 3). Codes are defined within the header file "docreturn.h". This allows mnemonics to be used by the application when interpreting error codes. Mnemonics map 16 bit, unsigned (i.e., U16), fully formed codes. Mnemonics and corresponding conditions are:

| Mnemonic | Return Condition |
| --- | --- |
| DMSUCCESS | succes condition |
| DMFILENF | file (document) not found |
| DMFILEEX | file (document) exists |
| DMNAMEIV | namestring invalid |
| DMVOLNM | volume not mounted |
| DMDEVNF | device not found |
| DMACCIV | access rights invalid |
| DMACCINSF | access rights insufficient |
| DMACCCON | access conflict |
| DMWRITEPRO | write protected disk |
| DDMNOMEM | no memory available |
| DMVOLFULL | volume (disk) full |
| DMDCBIV | DCB (document control block) invalid |
| DMPAGIV | page invalid |
| DMPAGNMIV | page number invalid |
| DMPAGSPCIVSR | page specification invalid for source page |
| DMPAGSPCIVDS | page specification invalid for destination page |
| DMPAGDCBIVSR | page DCB invalid for source page |
| DMPAGDCBIVDS | page DCB invalid for destination page |
| DMPAGRNGIV | page range specification invalid |
| DMREOIV | function request invalid or function not yet implemented. |

6.6 ITEM CLASS/ID ACCESS CODES

The routines, "itemget" and "itemput", provide a general interface to access data contained within a document file. The data to be accessed is mapped by item class and item ID within item class. Access codes are defined within a header file "docitem.h".

Note the following:
String data is returned to the buffer provided with the number of significant bytes returned in the location referenced by "itemlng".
1107 editor format is the 1107 editable data structure (see Appendix A) Mnemonic codes defined in docitem.h are listed in the following table:

| Item Class: | Item Ia: | Data Returnd(itemget)/Put(itemput): |
| --- | --- | --- |
| DMCDSKALOC | (block #) | A 2-byte block number field For "itemget", the item ID contains the block number to which the allocated block will be chained. "itemptr" will contain the allocated block number For "itemput", the item ID contains the block number to be released for reuse. |
| DMCDSKIO | (block #) | A pointer to a 512-byte buffer For "itemget", the item ID contains the block number to be read. "itemptr" references the address of a buffer acquired by the Document Manager to receive the contents of the block referenced. (Note: It is the responsibility of the calling routine to return this buffer via ReturnMyNode.) For "itemput", the item ID contains the block number to be written. "itemptr" contains the address of a buffer (direct) containing the data to be written. |

APPENDIX F—SCREEN MANAGER

4.3 SCREEN MANAGER PRIMITIVES

Screen manager primitives are functions that are called by an application program to the screen manager to create and to manipulate a virtual screen. For example, there are primitives to create a virtual screen, to delete it, to update it, and to display (or paint) it. There are also screen manager primitives to create and to merge viewports within a virtual screen.

A description of these and other screen manager primitives appear in the following subsections. Descriptions of screen manager primitives include the primitive statement, definitions of all of its parameters and values, return values, and error codes. Additional information is provided as required.

4.3.1 Creating a Virtual Screen

Use the screen manager primitive "createvs" to create a virtual screen. When the screen manager receives this request, it creates the virtual screen descriptor block and assigns a virtual screen number to the block. The virtual screen number is returned to the calling application task.

Note that when the specified parameters passed to the screen manager from the application task exceed the physical screen size the virtual screen that is created may be smaller than its requested size. However, the position of the virtual screen will still be at the requested position.

Definition:
createvs(vsno, taskno, vswid, vshgt, xpos, ypos, errorp, name, page)
int *vsno, taskno, vswid, vshgt, xpos, ypos, *errorp;
char *name;
PDSC *page;

Input Definition:
vsno: A pointer to the location where the virtual screen number is returned.
taskno: The task number of the calling application task.
vswid: The width of the virtual screen to be created.
vshgt: The height of the virtual screen to be created.
xpos: The horizontal position of the left top corner of the virtual screen.
ypos: The vertical position of the left top corner of the virtual screen.
errorp: A pointer to the location where the error code is returned. If errorp has a value of 0, then there was no error code generated.
name: A pointer to a SIX-character string that identifies the virtual screen. This character string is actually the icon that displays when more than one virtual screen exists (512k version only). The user can then display the virtual screen by pressing a program function key on the keyboard.

page: A pointer to the page descriptor, to be assigned to the root viewport of the newly created virtual screen. A NULL pointer makes the screen manager leave the current screen contents unmodified.

Output:
vsno
errorp

Output Definition:
vsno: This is the number of the newly created virtual screen (in the upper byte, 0 in the lower byte).
errorp: A pointer to the location where the error code is returned. If errorp has a value of 0, then there was no error code generated.

Error Conditions:
The virtual screen cannot be created.

4.3.2 Deleting a Virtual Screen

Use the screen manager primitive "deletevs" to delete a virtual screen. When the screen manager receives this request, it deletes the virtual screen descriptor block and frees its virtual screen number for reuse.

Note that an application task must delete all of the virtual screens that it created before it terminates.

Definition:
deletevs(vsno)
int vsno;

Definition:
vsno: The number of the virtual screen to be deleted (in the upper byte, 0 in the lower byte).

Output:
None

Error Conditions:
The specified virtual screen does not exist.

4.3.3 Assigning a Page to a Viewport

Use the screen manager primitive "assign" to set the correspondence between the virtual screen (or a viewport in the virtual screen) and the data to be displayed. As a result of this call, the screen manager also fills in the viewport by updating it will the newly assigned data.

When the screen manager receives this request, it sets the cursor in the virtual screen (or viewport, if that is the case) to its top left corner. The window on the virtual screen is also set to the top left corner.

Definition:
assign(vs_vp, page_ptr)
int vs_vp;
PDSC *page_ptr;

Input Definition:
vs_vp: The number of the viewport that is to be opened for displaying data. This number consists of the virtual screen number plus the viewport number. (The high-order eight bits is the virtual screen number and the low-order eight bits is the viewport number. If no viewports have been created in a virtual screen, the viewport number is 0.)
page_ptr: A pointer to the page descriptor and the data associated with the viewport.

Output:
none

Error Conditions:
The specified virtual screen/viewport does not exist.

4.3.4 Setting the Cursor

Use the screen manager primitive "setcur" to set the cursor position within a specified viewport. The setcur function will automatically do the necessary mapping from the logical page size to the viewport size. If the specified cursor position is outside the current page mapping, the function will also move the window over to the specified cursor position.

Note that only one cursor can be displayed at any one time. The cursor will not display if the specified virtual screen is not currently being displayed.

Definition:
setcur(vs_vp, xpos, ypos, ctype)
int vs_vp, xpos, ypos, ctype;

Input Definitions:
vs_vp: The number of the viewport in which the cursor is to be set. This number consists of the virtual screen number plus the viewport number. (The high-order eight bits is the virtual screen number and the low-order eight bits is the viewport number. If no viewports have been created in a virtual screen, the viewport number is 0.)
xpos: The horizontal position of the left top corner of the virtual screen, stated in pixels.
ypos: The vertical position of the left top corner of the virtual screen, stated in pixels.
cursor_type: Identifies the cursor type and its size. Note that all cursor types on the 1107 must have a rectangular shape, even if one of the sides has a depth of 1 pixel.

Output:
none

Error Conditions:
The specified virtual screen/viewport does not exist.

4.3.5 Creating a Viewport

Use the screen manager primitive "createvp" to create a new viewport. As a result of calling this primitive, the screen manager takes an existing viewport and divides it into two viewports. Depending upon the parameters that are passed to the screen manager, the viewport is subdivided into two viewports of fixed size, or it is subdivided into two viewports of proportional size (e.g., 1:3).

The topmost, or leftmost, viewport (as the case may be) retains the original viewport number. The bottom, or rightmost, viewport is assigned a new viewport number. This new number is returned to the application task when it make a createvp request to the screen manager.

Definition:
createvp(vs_vp, pos, type, size, nvsnop, errorp)
int vs_vp, pos, type, size, *nvsnop, *errorp;

Input Definitions:
vs_vp: The number of the viewport that is to be subdivided. The viewport number consists of the virtual screen number plus the viewport number. (The high-order eight bits is the virtual screen number and the low-order eight bits is the viewport number. If no viewports have been created in a virtual screen, the viewport number is 0.)
pos: Used to indicate if the subdivision on the existing viewport is to be horizontal or vertical. The viewport is to subdivided horizontally if pos=0. Otherwise, the viewport is to subdivided vertically.
type: Used to indicate if the subdivision on the existing viewport is to be of fixed dimensions or is to be of proportional dimensions. If type=0, then the viewport is to be subdivided in fixed dimensions. Otherwise, the viewport is to be subdivided proportionally. If the subdivision is to be proportional, the appropriate values (i.e., the ratio) in subsequent parameters must also be provided.

size: Used to indicate the size (stated in 1/100's of an inch) of a viewport subdivided into fixed dimensions. For proportional subdivisions, the size determines the ratio of the subdivision.

Output:
  nvsnop: Pointer to location where the viewport number of the newly created viewport is stored (virtual screen number in the upper byte, viewport number in the lower byte).
  errorp: Pointer to location where any error code that was generated as a result of a call to this function is stored. No error code was generated if the value at this location is 0.

Error Conditions:
  1. The specified virtual screen/viewport does not exist.
  2. The size of the subdivision is larger than the viewport size.

4.3.6 Updating a Virtual Screen

Use the screen manager primitive "updatevs" to update (i.e., repaint) all or a portion of a specified virtual screen.

Definition:
  updatevs(display_request_blk_ptr)
  APREQ *display_request_blk_ptr;

Input Definitions:
  display_request_blk_ptr: This is a pointer to the paint request block, as discussed in section 4.4. Note that the second entry can have 5 different values. They are:
    1. update entire virtual screen
    2. update a viewport
    3. update area of a viewport
    4. update partial area of a viewport
    5. update multiple areas (from specified point downwards)

Output:
  none

Error Conditions:
  The specified virtual screen/viewport number in the display request block is invalid.

4.3.6 Determining the Size of a Viewport

Use the screen manager primitive "getvsz" to determine the size and page window position of a specified viewport.

Definition:
  getvsz(vs_vp, pptr)
  unsigned int vs_vp, *pptr;

Input Definitions:
  vs_vp: The number of the viewport whose size will be returned to the application task. (The high-order eight bits is the virtual screen number and the low-order eight bits is the viewport number. If no viewports have been created in a virtual screen, the viewport number is 0.)
  pptr: This is a pointer to the data area where the current size of the designated viewport, and its current page window position, is stored. Note that this area is in the application task space.

Output:
  Stores the width, height, and the horizontal and vertical positions of the specified viewport on the page consecutive locations pointed to by the pointer, pptr.

Error Conditions:
  The specified virtual screen/viewport does not exist.

4.3.7 Merging Two Existing Viewports

Use the screen manager primitive "mergevp". to merge two existing viewports into one viewport. The number of the newly created merged viewport is the number of the leftmost, or uppermost, viewport (as the case may be) of the two viewports. This is the number of the original viewport before it was subdivided.

Definition:
  mergevp(vsno)
  int vsno;

Input:
  vsno: The number of the original viewport. (The high-order eight bits is the virtual screen number and the low-order eight bits is the viewport number. If no viewports have been created in a virtual screen, the viewport number is 0.)

Output:
  none

Error Conditions:
  1. The specified virtual screen/viewport does not exist.
  2. The two viewports cannot be merged (the rightmost, or lowermost, viewport is subdivided).

4.3.8 Setting the Page Window Position

Use the screen manager primitive "setpwpos" to modify the page window position either relative to its current position or set at some absolute position of the page.

Definition:
  setpwpos(vs_vp, type, xoffset, yoffset)
  COUNT vs_vp, type, xoffset, yoffset;

Input Definitions:
  vs_vp: The viewport number, consisting of the virtual screen number plus the viewport number. (The high-order eight bits is the virtual screen number and the low-order eight bits is the viewport number. If no viewports have been created in a virtual screen, the viewport number is 0.)
  type: Use this value to specify a relative or fixed position for the page window. If type=0, then the page window position is set at the specified offsets. If type=1, then the page window position is set by adding the specified offsets to the current page window position. If type=2, then the page window position is set by subtracting the specified offsets from the current page window position.
  xoffset: Used to indicate
  yoffset: Used to indicate Output:
  none Error Conditions:
  The specified virtual screen/viewport does not exist.

4.3.9 Updating the Cursor

Use the screen manager primitive "updatcur" to update the current cursor position in a specified viewport.

Definition:
  updatcur(vs_vp, char, attr)
  int vs_vp;
  U8 char, attr;

Input Definitions:
  vs_vp: The viewport number, consisting of the virtual screen number plus the viewport number. (The high-order eight bits is the virtual screen number and the low-order eight bits is the viewport number. If no viewports have been created in a virtual screen, the viewport number is 0.)
attr: Character's attribute
char: WISCII character to be painted Output:
none Error Conditions:
Virtual screen/viewport does not exist.

4.3.10 Updating a Location Within a Viewport

Use the screen manager primitive "updatloc" to update a given location in a specified viewport.

Definition:
updatloc(vs_vp, char, attr, xpos, ypos)
int vs_vp;
U8 char, attr, xpos, ypos;

Input Definitions:
vs_vp: The viewport number, consisting of the virtual screen number plus the viewport number. (The high-order eight bits is the virtual screen number and the low-order eight bits is the viewport number. If no viewports have been created in a virtual screen, the viewport number is 0.)
attr: WISCII character to be painted
char: Character's attribute
xpos: The horizontal position of the left top corner of the virtual screen, stated in 1/100 of an inch.
ypos: The vertical position of the left top corner of the virtual screen, stated in 1/100 of an inch.

Output:
none

Error Conditions:
Virtual screen/viewport does not exist.

4.3.11 Setting the Task Number

Use the screen manager primitive "settaskno" to associate a virtual screen to an application task. You can also use this primitive to direct the operating system to redirect all keyboard input to this task.

Definition:
settaskno(vs_vp, taskno)
int vs_vp, taskno;

Input Definitions:
vs_vp: The viewport number, consisting of the virtual screen number plus the viewport number. (The high-order eight bits is the virtual screen number and the low-order eight bits is the viewport number. If no viewports have been created in a virtual screen, the viewport number is 0.)
taskno: The task number of the calling application task.

Output:
none

Error Conditions:
Virtual screen number is an invalid number.

4.3.12 Changing the Icon Number

Use the screen manager primitive "vs_edit_icon" to change the name of an icon that is displayed on the screen. An icon name can be a maximum of six characters.

Definition:
vs_edit_icon(icon_number, name, exception_word)
U8 icon_number
char *name, exception_word;

Input Definitions:
icon_number: A variable indicating the name of the icon to be changed.
name: A pointer to a six-byte long character string that indentifies the new name of the icon.
exception_word: A pointer to the location where the status condition will be returned.

Error & Status Conditions:
Condition codes found at the location & exception_word:
0: operation successfully completed
1: icon number greater than 6
2: the virtual screen number corresponding to the given icon number has not been created.

4.3.13 Highlighting an Icon Name

Use the screen manager primitive "vs_bold_icon" to highlight the name of an icon. This primitive should be used only with the 256/512k version of the screen manager. A maximum of six icons can be maintained by the screen manager.

Definition:
vs_bold_icon(icon_number, exception_word)
U8 icon_number
char exception_word;

Input Definitions:
icon_number: A variable indicating the icon to be highlighted.
exception_word: A pointer to the location where the status condition will be returned.

Error & Status Conditions:
Condition codes found at the location & exception_word:
0: operation successfully completed
1: icon number greater than 6
2: the virtual screen number corresponding to the given icon number was not created.

4.3.14 Getting a Page Pointer

Use the screen manager primitive "vs_get_page_ptr" to get the page pointer of a specified viewport. Note that a null pointer will be returned by this function if a page has not previously been assigned to the specified viewport.

Definition:
vs_get_page_ptr(vs_vp_number, page_ptr, exception_word)
int vs_vp_number, exception_word;
PPSC **page_ptr;

Input Definitions:
vs_vp_number: indicates the virtual screen number (high byte) and the viewport number (low byte).
page_ptr: indicates the location where the corresponding page pointer should be returned.
exception_word: a pointer to the location where the condition code will be returned.

Error & Status Conditions:
Condition codes found at the location & exception_word:
0: operation successfully completed
1: icon number greater than 6
2: the virtual screen number corresponding to the given icon number was not created.

4.3.14 Writing IBM-Formatted Characters

Use the screen manager primitive "vs_IBM_paint" to write IBM-formatted characters directly on the 1107 screen. The (user-defined) IBM character table must be located at paragraph boundaries. This means that the last significant four bits of the physical table address must be 0.

Note that the 1107 font table has been augmented by the first 32 IBM characters. Note also that no painting of the screen is done if the virtual screen where the IBM characters are written to is not the currently active virtual screen.

Definition:
vs_IBM_paint (vs_no, table_base, table_offset, no_of_char, & exception_word);
char vs_no;
int table_base, table_offset, no_of_char, exception_word;

Input Definitions:
vs_no_: indicates the virtual screen number that is to be updated.
table_base: indicates the segment address of the memory table to be referenced by the IBM rasterizer.
table_offset: indicates the offset into the table from where the painting should start. Note that this offset, when divided by 2, is equal to the byte offset on the screen. (Byte offset of the character on the top left corner of the screen is 0; byte offset of the character on the bottom right corner of the screen is 780H—80*24=1920.
no_of_char: indicates the number of characters to be painted on the screen.
& exception_word: a pointer to the location where the condition code will be returned.

Error & Status Conditions:
Condition codes found at the location & exception_word:
0: operation successfully completed
1: icon number greater than 6
2: the virtual screen number corresponding to the given icon number was not created.
3: the table_offset value was out-of-bounds (i.e., greater than 780H).
4: the number of bytes requested to be painted can not fit on the screen.

4.4 PAINT REQUEST BLOCK

The application task request that the screen manager update the screen by providing the appropriate values in a paint request block. The paint request block allows the task to specify one or several available options. Basically, the task will request that the viewport be updated or cleared. If the viewport is to be updated (i.e., repainted), then the data type (either text, graphic, or ideographic data), the scope of the data, and other information must be supplied.

The paint request block has the following bock format:

```
!   Next Request    !
!   Paint Request   !
!   Viewport ID     !
!   Data Pointer    !
!   Starting Text   !
!   Paint Position  !
!   Ending Text     !
!   Paint Position  !
!   Page Area       !
!   Position (X,Y)  !
!   Area Size       !
```

```
!      (dX,dY)      !
```

4.4.1 Next Request

This is a pointer to the next request block. By using this field, the application task can issue multiple request blocks in a single update request to the screen manager. This field is null there are no other paint request blocks following it.

4.4.2 Paint Request

The paint request field has imbedded bit values that are used to indicate the desired operation. These are as follows:

```
x . . . . . . . . . . . . . . . . Paint/Clear
. x . . . . . . . . . . . . . . Scale Factor (0=full size, 1=half size
. . . . . . . . x x x x . . . . Data type
. . . . . . . . . . . . . x x x x Scope
```

Paint/Clear

If this bit is set to 1 then the screen manager will issue a request to the rasterizer to update the viewport with the specified data. If the bit is 0 the screen manager will request to the rasterizer to clear the specified area. Note that if the application task wants to clear the viewport and it specifies partial area (see Scope), the data to be cleared on the screen must be in the data pointer structure.

Scale Factor

If this bit is set to 1, the screen manager will issue a request to the rasterizer to paint (or clear, as the case may be) the viewpoint in half size mode. If the bit is 0, then the screen manager will request the rasterizer to paint (or clear) the viewport in full size.

Data Type

These four bits identify the type of data to be cleared or painted. The four data types that are supported are:
1. Text (0001)
2. Graphic (0010)
3. Ideographic (0011)
4. Image (0100)
5. Areas (0101)

A data type must be specified for both an area and a partial area update (see Scope). Note that this field is not used if the scope field identifies either virtual screen or viewport.

Scope

This field defines the scope of the update in the virtual screen. By selecting the appropriate values, an application task can update: the entire virtual screen; a viewport within the virtual screen; an area within the page descriptor; a partial area within the page descriptor.

The four scope values that can be defined are:
1. Virtual Screen (0001)
2. Viewport (0010)
3. Area (0011)
4. Partial Area (0100)
5. Multiple Areas (0101)

4.4.3 Viewport ID

The viewport ID field identifies the viewport that is to be updated. The viewport ID consists of the virtual screen number and the viewport number. The high-order eight bits of the viewport ID is the virtual screen number and the low-order eight bits is the viewport number. If no viewports have been created in a virtual screen, the viewport number is 0.

4.4.4 Data Pointer

The data pointer field points to the area that is to painted or cleared, as the case may be. This field is relevant only if the update is to be for an area or partial area (see Scope). The contents of this field are ignored if the update is to be for a virtual screen or for a viewport.

Note the pointer in this field points to an area descriptor if text has been specified in the data type field (see Data Type). If graphics has been specified in the data type field, this pointer points to a graphic primitive.

4.4.5 Starting Text Position

In the case of a partial area update, this field specifies the starting line number "string" and the "character" position of the first character in the text column to be updated on the screen (see Scope). The contents of this field are ignored by the screen manger if the scope of update is for a virtual screen, viewport, or area.

4.4.6 Ending Text Position

In the case of a partial area update, this field specifies the ending line number "string" and the "character" position of the last character in the text column to be updated on the screen (see Scope). The contents of this field are ignored by the screen manger if the scope of update is either virtual screen, viewport, or area.

4.4.7 Page Area Position

In the case of an area or partial area update, this field specifies the position of the area to be updated. The page area position is relative to the top left corner of the page. The contents of this field are ignored by the screen manger if the scope of update is either a virtual screen or a viewport.

4.4.8 Area Size

In the case of an area or partial area update, this field specifies the size of the area to be updated. The contents of this field are ignored by the screen manger if the scope of update is either a virtual screen or a viewport.

APPENDIX G—MENU

VIII. MENU PEON

3.0 OVERVIEW

The menu peon does the dirty work for the menu driver. It provides basic functions to the menu driver to select fields in a menu page, enter data in a menu edit field, provide character validation for data entered in a menu field, set the value of a field(s) and return the value of a field(s).

A menu page may be subdivided into multiple areas. Each area is indpendent of other areas. A line in an area may consist of multiple fields. A field may consist of multiple strings. The first string in the menu field has the "first attributed string" bit set in the string header. The last string in a menu field has the "last attributed string" bit set in the string header.

The menu peon supports the following field types:
Variable Display Field: This field type is for display purposes only.
Pick-1 field: Only one of a set of these field types may be selected by the menu driver. If a pick-1 field is already selected within an area, selection of another pick-1 field within the same area will cause the menu peon to deselect the previously selected pick-1 field and select the new pick-1 field.
Pick-n field: A subset of this field type may be selected from the set of pick-n fields in an area.
Edit field: The menu driver may have data entered in an edit field. Each character is validated as it is entered in the edit field.

An area within the menu page may consist of zero or more of these field types. These field types may be mixed in any order within an area. For pick-1 and pick-n field types, selected fields and the current field are displayed in reverse video. For an edit field, underscore is used as the cursor indicator for the position in the edit field.

The value of all fields in a menu page may be set by the menu driver. Conversely, the menu driver may get the value of all fields in a menu page. Each field in the menu page is numbered sequentially in the order in which they are defined in the menu page. This field number will be used by the menu driver to set field values or to get field values.

MENU SYSTEM STRUCTURE

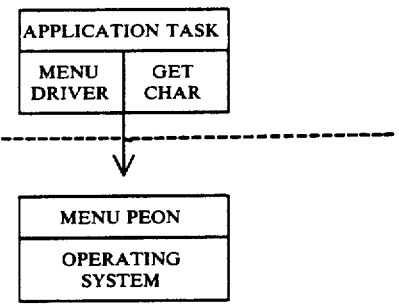

3.1 MENU PEON FEATURES 3.1.1 Provide a facility to edit a menu page. The menu peon will enable the application software to edit variable edit fields in a menu page and also select items from the menu page.

3.1.2 Provide basic character validation for variable edit fields. Characters entered in a variable edit field may be checked for either alphabetic characters, alpha-numeric characters, numeric characters only, all graphic characters etc. The type of character validation will be specified in the string header for that edit field.

3.1.3 Provide support of multiple areas within a menu page. Each area will be independent of other areas on the menu page.

3.1.4 Provide support of multiple strings in a text line. Each string may be defined as a pick item within the text line. Item selection within a area will move across each string in a text line before moving to the next line in the area.

3.1.5 Provide scrolling of the menu page. The user may scroll the menu page by viewport size increments either left, right, up or down.

3.1.6 Provide support to move cursor from one area to the next in a menu page.

3.1.7 Provide basic editing capabilities within a variable edit field, allow cursor movement within the edit line, erase the edit line, insert a character, delete a character from the edit line etc.

3.2 MENU FIELD TYPES

The Menu file contains a set of menu pages similar to document pages. Within a menu page, fields are associated with user manipulations and program variables. The types of menu fields defined are as follows:

Variable Display field
Edit field
Pick-1 field
Pick-n field

3.2.1 MENU FIELD TYPE DEFINITIONS

3.2.1.1 VARIABLE DISPLAY FIELD

A Variable Display field is a menu field whose content is supplied by the program at run time There are no user manipuations of Variable Display fields. They are used for the variable display of messages and prompts and are defined by the constantt VDISP that is located in the "stdwp.h" file.

3.2.1.2 EDIT FIELD

An Edit field provides the ability to display default values and receive data from an operator. Edit fields can be created by the Document Editor using the template symbol, (-UNDERSCORE-), and are defined by the constant EDIT that is located in the "stdwp.h" file.

3.2.1.3 PICK-1 FIELD

A Pick-1 field is a vertically left-aligned sequence of pick items. The Pick-1 field can be created by the Document Editor using the template symbol for all pick items and is defined by the constant PICK1 that is located in the "stdwp.h" file. A template symbol should be added for each item to receive the selection flag.

The item chosen is defined by the presence of a BLOB character as the first character of that text string

3.2.1.4 PICK-N FIELD

A Pick-n field is a vertically left-aligned sequence of pick items each of which contains constant text strings. The Pick-n field can be created using the Document Editor by adding a template symbol in front of each text string and are defined by the constant PICKN that is located in the "stdwp.h" file.

3.3 KEY HANDLING

The following describes the functionality of the keys used by the Menu Driver.

3.3.1 EDIT FIELDS

In an edit field, the following key usage is defined:
SPACE BAR—moves similarly to the GRAPHIC CHARACTERS.
BACK SPACE—deletes a character at the previous cursor position and moves the cursor to that position.
RIGHT ARROW—moves from current cursor position to the next character position.
LEFT ARROW—moves from current cursor position to the previous character position.
RETURN—moves the cursor position to the first position of the next edit field within an area, with multiple strings taking precedence over column movement.
INSERT—inserts a character at the current cursor position and advances the cursor one character position.
DELETE—deletes a character at the current cursor position.
ERASE—clears the text string from cursor position to the end of the edit field.
GRAPHIC CHARACTERS—placed in current position of cursor and advances the cursor one character position.

3.3.2 MENU PAGE

Across the menu page the following key usage is defined:
SPACE BAR—moves the blob from current pick position to next pick position.
RETURN—moves the blob from current pick position to next pick position.
BACK SPACE—moves the blob from current pick position to the previous pick position.
TAB—moves blob to next area.
BACK TAB—moves blob to previous area.
GRAPHIC CHARACTERS—moves blob from current field to next field beginning with that character. Version History Log
Version—1.0.0 Mar. 2nd, 1983. Initial Draft.
Version—1.0.1 Mar. 28th, 1983 Revised version for internal release.
Version—1.0 2 Apr. 19th, 1983
 (a) Format of Indexing Changes.
 (b) More comments added from review meeting.
 (c) Mistakes corrected.
 (d) Screen Manager portion expanded to include definitions of the primitive calls.
 (d) Takes out AndInteger, XorInteger, OrInteger, and ExTractField primitives.
 (e) Add SetVector and CBAM access primitives.
 (f) All error codes defined.
Version 1.0.3
 (a) Add Status return to StartTask primitive.
 (b) Add view port operation to Screen Manager.
 (c) Takes out AndInteger, XorInteger, OrInteg and ExTractField primtives.
 (d) Add SetVector, Set8274, Beep, GetMyNode, ReturnMyNode primitives.
 (e) Add Menu Driver Primitives. 3.3.3 SCROLL KEYS
The following keys are defined for scrolling:
SHIFT RIGHT—Scroll right n spaces.
SHIFT LEFT—Scroll left n spaces.
SHIFT UP—Scroll up n lines.
SHIFT DOWN—Scroll down n lines.
NEXT—Scroll to next screen.
PREVIOUS—Scroll to previous screen.
HOME—Reset to top left corner of page.

3.4 MENU PEON FUNCTIONS

The menu peon will provide the following primitives to the menu driver. The primitives allow the menu driver to initialize a menu page, get edit field and pick values, associate a menu page with a menu number, dissociate a menu page, display a menu page and enter data in a menu page.

The menu driver will initially call the associate menu primitive, passing the pointer to menu page descriptor and optionally a virtual screen number. The associate menu primitive will build a data structure and return a menu number to the menu driver. This menu number will then be used by the menu driver for all subsequent primitive calls to the menu peon. It is the responsibility of the menu driver to create a virtual screen for displaying the menu. If the menu driver provides the virtual screen number, the associate menu primitive will call the screen manager to display the menu page.

The dissociate menu page primitive must be called by the menu driver at the end of menu processing or before tthe task terminates to free the menu number and the associated data structures.

Once a menu page has been associated by the menu driver, the menu driver can then call the other menu peon primitives. Each primitive call will contain the menu number that was returned by the associate menu primitive.

The set field primitive allows the menu driver to initialize one or more fields in the menu page. This primitive will copy the data supplied for a field into the menu page structure and then call the screen manager to update the menu display. The menu driver calls this primitive with the menu number and a variable length parameter block which is composed of field numbers of the fields that need to be updated and a pointer to the data field. This primitive will copy the string attributes as well as the string value into the menu page field. It will return the number of bytes copied into the menu field. The set primitive may be called by the menu driver at any time to change the value of the menu field.

The get field primitive is the converse of the set field primitive. This primitive copies the requested fields to be copied into the location specified by the menu driver.

The menu display primitive allows the menu driver to associate the menu page to a virtual screen or viewport. This will cause the menu page to be displayed by the menu driver and the virtual screen number to be stored in the data structure for the specified menu number.

The enter data primitive gets a character value from the menu driver and based on the character value, performs the edit functions for the specified keys. The effects of the various keys are specified in the key handling section of the document.

3.4.1 ASSOCIATE MENU

Call:
 menu_assoc(menu_no_ptr, menu_page_ptr, vs_no)
 UTINY *menu_no_ptr;
 UCOUNT vs_no;
 PDSC *menu_page_ptr;
Input:
 menu_no_ptr—Pointer to location's where the menu number and the field number are returned.
 menu_page_ptr—Pointer to the menu page descriptor.
 vs_no—The number of the viewpoint in which the menu page will be displayed. The viewport number consists of the virtual screen number and the viewport number. If the vs_no is zero, the menu page will not be displayed.
Output:
 Returns the value of the menu number in the first byte and the field number on which the cursor is set in the second byte of the location's pointed to by the menu_no_ptr.
Function:
 This function causes the menu page to be associated with a menu number and the menu page to be displayed if the virtual screen number is non zero. If the virtual screen number is zero, this function will not issue the assignvs call to the screen manager.

3.4.2 DISSOCIATE MENU

Call:
 menu_dissoc(menu_no)
 UCOUNT menu_no
Input:
 menu_no—The number of the menu to be dissociated.
Output:
 None.
Function:
 This function causes the specified menu to be dissociated. The associated data structures and the menu number assigned to the menu are freed.

3.4.3 SET MENU FIELD

Call:
 menu_set_field(menu_no, menu_fld_tptr)
 UCOUNT menu_no, *menu_fld_tptr;
Input:
 menu_no—The number of the menu to be initialized.
 menu_fld_tptr—Pointer to the table of field numbers and pointers to the initialization fields. The table consists of a count of the number of entries in the table and an entry for each field to be initialized. The field entry consists of a field number and a pointer to the field contents.
Output:
 None
Function:
 This function causes the menu page fields to be initialized by the specified values in the menu field table. The maximum number of fields in a menu page is limited to 255. Each field in the menu page is numbered sequentially in the order of occurence in the menu page. A field number of zero will be used to iniatilize a menu page with the specified pick selections. In this case, the pointer to the field value points to a sixteen word array, each bit in the array corresponds to field. If a bit in the array is set, the corresponding field number is selected. For non zero field numbers, the pointer points to the location which contains the value by which the field is initialized. If the pointer is NULL, then that field is not initialized.

3.4.4 GET MENU FIELD

Call:
 menu_get_field (menu_no, menu_fld_tptr)
 UCOUNT menu_no, menu_fld_tptr;
Input:
 menu_no—The number of the menu to be initialized.
 menu_fld_tptr—Pointer to the table of field numbers and pointers to the location where field values are returned. The table consists of a count of the number of entries in the table and an entry for each field whose value is to be returned. The field entry consists of a field number and a pointer to the location where the value of a field is returned.
Output:

None
Function:

This function causes the value of the specified menu page fields in the menu field table to be returned. The maximum number of fields in a menu page is limited to 255. Each field in the menu page is numbered sequentially in the order of occurence in the menu page. A field number of zero will be used to return the value of picked fields. In this case, the pointer to the field value points to a sixteen word array, each bit in the array corresponds to a field. If a bit in the array is set, the corresponding field number is selected.

For non zero field number, the pointer points to the location where the field value is returned. If the pointer is Null, no value is returned.

3.4.5 DISPLAY MENU

Call:
menu_disp(menu_no, vs_no)
UCOUNT menu_no, vs_no;
Input:
menu_no—The number of the menu to be displayed.
vs_no—The number of the viewport in which the menu page will be displayed. The viewport number consists of the virtual screen number and the viewport number. If the vs_no is zero, the menu page will not be dispalyed.
Output:
None.
Function:

This function causes the menu page associated with a menu number to be displayed if the virtual screen number is non zero. If the virtual screen number is zero, this function will not issue the assignvs call to the screen manager.

3.4.6 EDIT MENU

Call:
menu_edit(& menu_edit_req)
MRQBLK *menu_edit_req;
Input:
menu_edit_req—Pointer to menu edit request block. The request block consists of the menu number, field number, the input key code, and the error return location. The field number is updated as the cursor moves from field to field. If a valid key is encountered, the error location is zero, else it contains the error code.
Output:
None.
Function:

This function provides the key handling facilities to the menu driver. The input keycode is processed according to the specifications in the key handling section (3.3). If an invalid key is encountered an error code is returned.

3.5 MENU INTERFACE DATA STRUCTURES

Data structures used by the applications to interface with the Menu Peon consist of the field table list and the menu request-block.

3.5.1 FIELD TABLE LIST

The field table list is a variable length list of field entries. Each entry consists of a field number, a pointer to the data location, the field length and a reserved word.

| Type & Block Size |
|---|
| Number of Fields |
| Field Number — 1 |
| Field Length |
| Field Type - Resv. |
| Field Data Pointer |

Byte - 0 to 255
Byte - 0 to 255
Reserved location (16 Bits)
Pointer

| |
|---|
| |

| Field Number — n |
|---|
| Field Length |
| Field Type - Resv. |
| Field Data Pointer |

Field numbers are assigned sequentially as they occur within a menu page from 1 to 255. The pointer points to a variable length text line. The defintion of the text line is the same as that in the word processing software architecture manual.

For the get field primitive, field length denotes the length of the data area where the field value is returned. If the length of the data area is smaller that the actual field in the menu page, the field is truncated to the length of the data area.

For the set field primitive, the field length consists of the length of the text line including the terminating null string. If the specified field length is larger than the menu page field, the field is truncated to the length of the menu page field.

Field data pointer is a pointer to the location where the value of a field is retrieved from for the set field primitive or it is the location where the value of a menu page field is returned. The field value is a text line consisting of one or more strings terminated by the null string. The field length should be large enough for the largest vield value including all headers and the terminating null string.

Field type is reserved for future use.

3.5.2 MENU REQUEST BLOCK

The menu request block consists of a number of fields which define the input character string, string length, field number, error return etc. for the menu edit primitive.

| Menu Number | Byte |
|---|---|
| Menu Field Number | Byte |
| Character Code | Two Byte Key Code |
| Error Return | Byte |

Menu Number is the number of the menu that is returned by the menu associate primitive.

Menu field number is the number of the field in the menu page at which the cursor is currently set. The cursor is set at either a pick type field or an edit field. This location is updated to the correct value of the field number if the character code causes the cursor to move to another field. If the menu does not contain any pick or edit fields the menu field number returned is zero.

Character code is the two byte key code. The menu edit primitive performs the menu edit function's based on this character code and the field type at which the cursor is currently active.

Error return contains the error code based on the validity of the character code and the field type.

APPENDIX H—TEXT MODE/FORMATTING

COMMON FUNCTIONS

FORMAT MODE OPERATIONS

3.4. Text Formatting Functions

3.4.1 pgecre

Call:
U16
pgecre (pgetyp, crsptr1, crsptr2)
U16 pgetyp
PGPDSC *crsptr1, *crsptr2
Input:
pgetyp
    PGECOPY—copy layout of example page.
    PGECONT—continue layout of example page.
crsptr1—Pointer to the cursor block of example page.
Output: crsptr2—cursor block of page D.S. (It is the responsibility of calling function to arrange memory for this cursor block).
Return: This function returns a flag indicating whether the creation is successful or not. The returned values may be the following:
    SUCCEED—Page created successfuly.
    MEMERROR—Not enough space.
Function: This function creates new page using existing page as an example. All areas will contain one line with ETX symbol.

COMMON FUNCTIONS

FORMAT MODE OPERATIONS

3.4.2 pgedel

Call:
VOID
pgedel (crsptr)
PGPDSC *crsptr
Input: crsptr pointer to page D.S.
    Output: none
    Return: none
    Function: This function deletes pointed page D.S. and releases its memory.

COMMON FUNCTIONS

FORMAT MODE OPERATIONS

3.4.3 pgecrscpy

Call:
U16
pgecrscpy (crsptr, newcrsptr, type)
PGPDSC *crsptr
PGPDSC *newcrsptr
U16 type
Input:
crsptr—pointer to cursor block of page to be copied
type
    PGECPYWHL—Copy whole page.
    PGECPYGEO—Copy layout only.
Output: newcrsptr—filled cursor block of new page (same x,y coordinates as old page)
Return: This function returns a flag indicating whether the creation is successful or not. The returned values may be the following:
    SUCCEED—Page created successfully.
    MEMERROR—Not enough space.
Function: This function copies the cursor block and page pointed to in the block. It allocates memory for the new page and copies format pages associated with the page to be copied. If type 0 is chosen the entire page is copied, including all the lines. If type 1 is chosen, the page is copied through the column block. However, there is only space for 1 line pointer allocated and the line pointer is NULL.

COMMON FUNCTIONS

FORMAT MODE OPERATIONS

3.4.4 pgecpy

Call:
U16
pgecpy (ppge, ppnewpge, type)
PDSC *ppge
PDSC **ppnewpge
U16 type
Input:
ppge—pointer to page to be copied
type
    PGECPYWHL—Copy whole page
    PGECPYGEO—Copy layout only.
Output: ppnewpge—contains pointer to new page
Return: This function returns a flag indicating whether the creation is successful or not. The returned values may be the following:
    SUCCEED—Page created successfuly.
    MEMERROR—Not enough space.
Function: This function copies the page pointed to. It allocates memory for the new page and copies format pages associated with the page to be copied. If type b 0 is chosen the entire page is copied, including all the lines. If type 1 is chosen, the page is copied through the column block. However, there is only space for 1 line pointer allocated and the line pointer is NULL.

COMMON FUNCTIONS

FORMAT MODE OPERATIONS

3.4.5 pgerfm

Call:
U16
pgerfm (fmtcrsptr, txtcrsptr, type)
PGPDSC *fmtcrsptr, *txtcrsptr
U16 type
Input:
fmtcrsptr—Pointer to cursor block of format page D.S.
txtcrsptr—Pointer to cursor block of text page D.S.
type
    OLDFMT—format page is a modification of existing format line for the area pointed by txtcrsptr
    NEWFMT—format page is a new format line for Y-coord specified by txtcrsptr
    DELFMT—delete format line for the area pointed by txtcrsptr
output: none
Return: This function returns a flag indicating whether the operation is successful or not. The returned values may be the following:
    SUCCEED—Page created successfuly.
    MEMERROR—Not enough space.
    FMTERROR—Illegal format line.
Function:
    This function rearranges the page on the base of the new or modified format line.
    This function should be called when user types 'Execute' after Format operation.

When FMTERROR is returned, fmtcrsptr block will point to first error in format line.

COMMON FUNCTIONS
FORMAT MODE OPERATIONS
3.4.6 fmtpge

Call:
 U16
 fmtpge (fmtcrsptr, txtcrsptr)
 PGPDSC *fmtcrsptr, *txtcrsptr
Input: txtcrsptr—Pointer to cursor block of text page D.S.
Output: fmtcrsptr—Cursor block of format page D.S.
Return: This function returns a flag indicating whether the operation is successful or not. The returned values may be the following:
 SUCCEED—Page created successfuly.
 MEMERROR—Not enough space.
Function: This function creates the format page D.S. for current cursor position in text D.S.

COMMON FUNCTIONS
FORMAT MODE OPERATIONS
3.4.7 numnei

Call:
 U16
 numnei (txtcrsptr, direction, number, neighb-array)
 PGPDSC *txtcrsptr
 U16 direction, number
 U16 neighb-array[]
Input:
 txtcrsptr—pointer to cursor block of text page D.S.
 direction—direction in which data about neighbors is asked for: DIRSOUTH or DIRNORTH or DIREAST or DIRWEST.
 number—Number of the area for which data about neighbors is asked.
Output: neigh-array—Array with area numbers.
Return: number of neighbors
Function: This function returns number of neighbors and their area numbers in requested direction. Neighbors are sorted from west to east or from north to south. If there isn't neighbors returned number is zero.

COMMON FUNCTIONS
TEXT MODE OPERATIONS
3.4.8 putchr

Call:
 U16
 putchr (txtcrsptr, txtatt, character, type-of-char, paint-chain, shrt)
 PGPDSC *txtcrsptr
 U16 *txtatt
 char character
 U16 type-of-char
 APREQ *paint-chain
 WWSAV shrt
Input:
 txtcrsptr—Pointer to cursor block of text page D.S.
 txtatt—Pointer to two word string header with text attributes.
 character—Character or part of character to be written to the data structure.
 type-of-char
  SNGCHR—single character.
  DIACR1—1-st half of character (diacritic).
  DIACR2—2-nd half of character (diacritic).
 shrt—pointer to short word wrapping flag.
Output:
 paint-chain—Chain of paint requests (Calling subroutine supplies 'putchr' with one paint request—other are created by 'putchr').
 shrt—pointer to short paint flag.
Return: This function returns a flag indicating whether the operation is successful or not. The returned values may be the following:
 SUCCEED—Page created successfuly.
 MEMERROR—Not enough space.
Function:
 This function adds or overstrikes one character. (No operations with cursor or blob).
 During overstriking attributes are not changed.
 During entering or insertion current attributes are used.

COMMON FUNCTIONS
TEXT MODE OPERATIONS
3.4.9 getchr

Call:
 VOID
 getchr (txtcrsptr, txtatt, character)
 TEXT **character
 PGPDSC *txtcrsptr
 U16 **txtatt
Input: txtcrsptr—Pointer to cursor block of text page D.S.
Output:
 txtatt—Pointer to text attributes.
 character—Pointer to character within the data structure.
Return: none.
Function: This function outputs two pointers pointing to a character and its attributes within a line data structure. The character is specified by the cursor block's area, line, string and byte members.

COMMON FUNCTIONS
TEXT MODE OPERATIONS
3.4.10 delchr

Call:
 VOID
 delchr (txtcrsptr, paint-chain)
 PGPDSC *txtcrsptr
 APREQ *paint-chain
Input: txtcrsptr—Pointer to cursor block of text page D.S.
Output: paint-chain—Chain of paint requests (See 'putchr' subroutine).
Return: none
Function: This function deletes one character.
Internal description:
 delete one character from the current string.
 word wrapping if it is word wrapped area
 change Page D.S. if vertical size of area was changed (line(s) was deleted as a result of word wrapping)

COMMON FUNCTIONS
TEXT MODE OPERATIONS
3.4.11 pgebrk

Call:

U16
pgebrk (txtcrsptr, breake-type)
PGPDSC *txtcrsptr
U16 breake-type
Input:
 txtcrsptr—Pointer to cursor block of text page D.S.
 breake-type
SFTBRK—soft, HRDBRK—hard.
Output: txtcrsptr—Cursor block of text page D.S.
Return: This function returns a flag indicating whether the creation is successful or not. The returned values may be the following:
 SUCCEED—Page created successfuly.
 MEMERROR—Not enough space.
Function:
 This function splits page into two sequential pages at the point marked by cursor.
 Writes first page to the disc.
 Creates text and format D.S. for second page.

COMMON FUNCTIONS

TEXT MODE OPERATIONS

3.4.12 delpgebrk

Call:
 U16
 delpgebrk (txtcrsptr)
 PGPDSC *txtcrsptr
Input: txtcrsptr—Pointer to cursor block of text page D.S.
Output: txtcrsptr—Cursor block of text page D.S.
Return: This function returns a flag indicating whether the creation is successful or not. The returned values may be the following:
 SUCCEED—Page created successfuly.
 MEMERROR—Not enough space.
Function: This function concatanates two pages: current from memory and next from the disc.

COMMON FUNCTIONS

TEXT MODE OPERATIONS

3.4.13 setareatt

Call:
 VOID
 setareatt (txtcrsptr, number, attribute, value)
 PGPDSC *txtcrsptr
 U16 number, attribute, value
Input:
 txtpgeptr—pointer to cursor block of text page D.S.
 number—Number of the area for which attributes are being set.
 attribute—new attribute of area (type of area):
  0—word wrapped—not word wrapped
  1—elastic—rigid
  2—page body—page header—page footer—footnote
  3—floating top edge—fixed top edge
  4—breakable—unbreakable
  5—intentional top edge—nonintentional top edge
  6—visible area—invisible area
  7, . . . —reserved
 value—value of attribute (previous parameter):
  0—word wrapped or elastic or page body or . . .
  1—not word wrapped or rigid or . . .
  2—page footer or . . .
  3—footnote or . . .

Return: This function returns a flag indicating whether the creation is successful or not. The returned values may be the following:
 SUCCEED—Page created successfuly.
 MEMERROR—Not enough space.
Return: none
Function: This function sets attributes of area (fills type of area and path (−1 or 0 only) fields of data structure.

COMMON FUNCTIONS

TEXT MODE OPERATIONS

3.4.14 getareatt

Call:
 VOID
 getareatt (txtcrsptr, number, attribute)
 PGPDSC *txtcrsptr
 U16 number, attributre
Input:
 txtpgeptr—pointer to cursor block of text page D.S.
 number—Number of the area for which data about attributes is asked.
 attribute—new attribute of area (type of area):
  0—word wrapped—not word wrapped
  1—elastic—rigid
  2—page body—page header—page footer—footnote
  3—floating top edge—fixed top edge
  4—breakable—unbreakable
  5—intentional top edge—nonintentional top edge
  6—visible area—invisible area
  7, . . . —reserved
Output: none
Return: value—value of attribute (previous parameter):
  0—word wrapped or elastic or page body or . . .
  1—not word wrapped or rigid or . . .
  2—page footer or . . .
  3—footnote or . . .
Function: This function reads attributes of area (see above) from data structure.

What is claimed is:

1. In a data processing system including memory means for storing data and active tasks, CPU means responsive to active tasks for operating on the data, mass storage means for storing inactive tasks, and keyboard means for entering user commands for interactively controlling execution of the active tasks, task control means for controlling the interactive, concurrent execution of a plurality of tasks, comprising:
 task loader means responsive to a task load request resulting from user commands or the execution of presently active tasks for transferring a corresponding inactive task from the storage means to the memory means to become an active task to be executed,
 memory manager means responsive to operation of the task loader means for assigning a corresponding task node space in the memory means for storing the task to be transferred into the memory means,
 task manager means, including
 task control block means responsive to the task load request for
 creating a task control block corresponding to the task to be transferred from the storage means to the memory means to become an active task, each task control block containing information used by the task manager means in controlling execution of the corresponding active task, and generating a corresponding task control block identification and writing the task control block identification into the corresponding task node space in the memory means, each task control block identification linking the task to the corresponding task control block, and task queue means for ordering the sequence of execution of the active tasks wherein each active task is a member of one of a plurality of priority levels, including a task queue for each priority level, wherein the task control block of each active task resides in the task queue corresponding to the priority level of the task, and the task control blocks reside in each task queue in a sequence determined by the status of execution of the corresponding active tasks, and wherein the task manager means is responsive to the priority level and status of each active task to write the corresponding task control block into the corresponding sequential location in the task queue corresponding to the priority level of the task.

2. The task control means of claim 1, wherein each task control block comprises;

an identification field for storing information identifying the corresponding task, a status field for storing information identifying the status of execution of the corresponding task, and a priority field for storing information identifying the relative priority of execution of the corresponding task.

3. The task control means of claim 2, wherein each task control block further includes:

sequence pointers linking together the task control blocks residing in each task queue in the preferred sequence of execution of the tasks, and wherein the task manager means is responsive to the conclusion of execution of a presently executing active task for reading the task control blocks of the active task residing in the task queues to determine a next active task to be executed, the task manager means being responsive to the sequence of task control blocks in each task queue and to the relative priorities of the task queues for executing the active tasks in order of priority as determined by the task queues in which they reside and in the sequence in which the task control blocks reside in the task queues.

4. The task control means of claim 2, wherein the task manager means further comprises:

stack means for storing information regarding the execution of presently active tasks, the stack means including a task stack mechanism for each active task, and wherein each task control block further includes a stack pointer field for storing information identifying the location of the corresponding task stack mechanism.

5. The task control means of claim 1, wherein the memory management means is further responsive to active tasks to assign additional space in the memory means to the task node spaces of the active tasks as requested by the tasks.

6. The task control means of claim 1, wherein the task manager means further comprises:

stack means for storing information regarding the execution of presently active tasks, the stack means including a task stack mechanism for each active task.

7. In a data processing system including memory means for storing data and active tasks, CPU means responsive to active tasks for operating on the data, mass storage means for storing inactive tasks, and keyboard means for entering user commands for interactively controlling execution of the active tasks, a method for controlling the interactive, concurrent execution of a plurality of tasks, comprising the steps of:

responsive to a task load request resulting from user commands or the execution of presently active tasks, transferring a corresponding inactive task from the storage means to the memory means to become an active task to be executed, responsive loading of the task, assigning a corresponding task node space in the memory means for storing the task to be transferred into the memory means, creating a task control block corresponding to the task to be transferred from the storage means to the memory means to become an active task, each task control block containing information used by the task manager means in controlling execution of the corresponding active task, generating a corresponding task control block identification and writing the task control block identification into the corresponding task node space in the memory means, each task control block identification linking the task to the corresponding task control block, and writing the task control block into a task queue means for ordering the sequence of execution of the active tasks, wherein each active task is a member of one of a plurality of priority levels, there is a task queue for each priority level, the task control block for each active task resides in the task queue corresponding to the priority level of the task, and the task control blocks reside in each task queue in a sequence determined by the status of execution of the corresponding active task, and responsive to execution of the tasks and the information contained in the corresponding task control blocks, executing the active tasks in the order determined by the relative priorities of the task queues in which the task control blocks reside and in the order determined by the sequence of the task control blocks in the task queues.

8. The method of claim 7, wherein each task control block comprises:

an identification field for storing information identifying the corresponding task, a status field for storing information identifying the status of execution of the corresponding task, and a priority field for storing information identifying the relative priority of execution of the corresponding task.

9. The method of claim 8, further comprising the steps of:

responsive to the relative priority of execution of active tasks and the status of each task providing in each task control block sequence pointers linking together the task control blocks residing in each task queue in the preferred sequence of execution of the tasks, and responsive to the sequence of task control blocks in each task queue and to the relative priorities of the task queues, executing the active tasks in order of priority as determined by the task queues in which they reside and in the sequence in which the task control blocks reside in the task queues.

10. The method of claim 8, further comprising the steps of: p1 providing a stack means for storing information regarding the execution of presently active tasks, and during the step of creating a task control block for a task which is to become an active task, generating a task stack mechanism for the task, so that the stack means includes a task stack mechanism for each active task, and wherein each task control block further includes a stack pointer field for storing information identifying the location of the corresponding task stack mechanism.

11. The method of claim 7, further comprising the step of:

responsive to the execution of active tasks, assigning additional space in the memory means to the task node spaces of the active tasks as requested by the tasks.

12. The method of claim 7, further comprising the steps of:

providing a stack means for storing information regarding the execution of presently active tasks, and during the step of creating a task control block for a task which is to become an active task, generating a task stack mechanism for the task, so that the stack means includes a task stack mechanism for each active task.

* * * * *